United States Patent
Page et al.

(10) Patent No.: US 8,922,558 B2
(45) Date of Patent: Dec. 30, 2014

(54) DRAWING GRAPHICAL OBJECTS IN A 3D SUBSURFACE ENVIRONMENT

(75) Inventors: Alexander G. Page, Littleton, CO (US);
William B. Simons, Denver, CO (US);
William C. Ross, Littleton, CO (US);
Robert E. Howard, Denver, CO (US)

(73) Assignee: Landmark Graphics Corporation, Houston, TX (US)

( * ) Notice: Subject to any disclaimer, the term of this patent is extended or adjusted under 35 U.S.C. 154(b) by 1049 days.

(21) Appl. No.: 12/567,215

(22) Filed: Sep. 25, 2009

(65) Prior Publication Data

US 2011/0074766 A1    Mar. 31, 2011

(51) Int. Cl.
*G06T 15/10* (2011.01)
*G06T 17/05* (2011.01)
*G06T 11/20* (2006.01)
*G06T 19/00* (2011.01)

(52) U.S. Cl.
CPC .............. *G06T 17/05* (2013.01); *G06T 11/203* (2013.01); *G06T 19/00* (2013.01)
USPC ........... 345/427; 345/419; 345/422; 345/582; 345/423; 345/440

(58) Field of Classification Search
USPC .................. 345/427, 419, 422, 582, 423, 440
See application file for complete search history.

(56) References Cited

U.S. PATENT DOCUMENTS

| | | | |
|---|---|---|---|
| 5,671,344 A | 9/1997 | Stark | |
| 6,373,486 B1 * | 4/2002 | Simpson | 345/423 |
| 6,545,680 B1 * | 4/2003 | Delas et al. | 345/427 |
| 6,690,820 B2 | 2/2004 | Lees et al. | |
| 6,765,570 B1 | 7/2004 | Cheung et al. | |
| 6,850,845 B2 | 2/2005 | Stark | |
| 6,853,922 B2 | 2/2005 | Stark | |
| 6,987,878 B2 | 1/2006 | Lees et al. | |
| 7,002,576 B2 | 2/2006 | Sheffield et al. | |
| 7,006,085 B1 | 2/2006 | Acosta et al. | |
| 8,437,962 B2 * | 5/2013 | Craig | 702/11 |
| 2002/0140696 A1 * | 10/2002 | Futamura et al. | 345/419 |
| 2005/0030317 A1 * | 2/2005 | Spicer | 345/582 |
| 2005/0110795 A1 | 5/2005 | Sheffield et al. | |
| 2005/0151751 A1 * | 7/2005 | Hong et al. | 345/582 |
| 2005/0168461 A1 * | 8/2005 | Acosta et al. | 345/419 |
| 2005/0237334 A1 | 10/2005 | Chuter | |

(Continued)

OTHER PUBLICATIONS

"Paradigm SeisEarth"; Accessed Jun. 1, 2010; 1 page; <http://www.pdgm.com/products/interpretation-modeling/seisearth.aspx>.

(Continued)

*Primary Examiner* — Abderrahim Merouan
(74) *Attorney, Agent, or Firm* — Chamberlain Hrdlicka

(57) ABSTRACT

A system and method for drawing in a three-dimensional space. The drawings may include dots, line segments, arrows, polylines (open and closed), polygons, surfaces and 3D volumes. The method may include receiving user input that specifies a drawing in a displayed window and mapping the drawing into the 3D space. The mapping process may involve mapping the drawing onto a surface of an existing graphical object in the 3D space, or, mapping the drawing onto a user-specified plane in the 3D space. The drawing may represent a user's interpretation of a geological feature present on the graphical object surface. The graphical object may represent an object of significance in hydrocarbon exploration and production, e.g., an interpreted section or horizon in the earth's subsurface.

26 Claims, 34 Drawing Sheets

(56) References Cited

U.S. PATENT DOCUMENTS

| | | | |
|---|---|---|---|
| 2005/0259101 A1* | 11/2005 | Westgaard et al. | 345/420 |
| 2006/0164429 A1* | 7/2006 | Mantor et al. | 345/582 |
| 2007/0076011 A1* | 4/2007 | Spicer | 345/582 |
| 2007/0083383 A1* | 4/2007 | Van Bael et al. | 705/1 |
| 2007/0291845 A1* | 12/2007 | Cammas et al. | 375/240.16 |
| 2008/0079723 A1 | 4/2008 | Hanson et al. | |
| 2008/0165186 A1* | 7/2008 | Lin | 345/419 |
| 2008/0291201 A1* | 11/2008 | Lafon | 345/427 |
| 2008/0292213 A1* | 11/2008 | Chau | 382/294 |
| 2008/0297510 A1* | 12/2008 | Callegari | 345/424 |
| 2008/0319723 A1* | 12/2008 | Smith et al. | 703/2 |
| 2009/0102842 A1* | 4/2009 | Li | 345/422 |
| 2009/0295792 A1* | 12/2009 | Liu et al. | 345/419 |
| 2011/0115787 A1* | 5/2011 | Kadlec | 345/419 |

OTHER PUBLICATIONS

Rohit Sud and Abhishek Venkatesh; "A Tool for Quick Freehand Drawing of 3D Shapes on the Computer"; Accessed Jun. 1, 2010; 9 pages; <http://www.cc.gatech.edu/grads/v/venky/Graphics-6491-P2/3DSketch.pdf>.

Alistair R. Brown; "Interpretation of Three-Dimensional Seismic Data"; AAPG Memoir 42, SEG Investigations in Geophysics No. 9, Fifth Edition; 2004; 3 pages.

James D. Foley, Andries Van Dam, Steven K. Feiner, and John F. Hughes; "Computer Graphics: Principles and Practice. Second Edition in C"; Addison-Wesley; 1995; 12 pages.

Invitation to Pay Additional Fees and, Where Applicable, Protest Fee in Application No. PCT/US2010/050187 dated Mar. 31, 2011, 10 pages.

Kaufmann, et al., "Reprint of '3D geological modelling from boreholes, cross-sections and geological maps, application over former natural gas storages in coal mines' [Comput. Geosci. 34 (2008) 278-290," Elsevier, Computers and Geosciences, vol. 35, No. 1, 2009, pp. 70-82.

Arnaud, Berlioux, "Building models with GOCAD," Stanford Exploration Project Report, 80, May 15, 2001, pp. 1-20.

Song, et al., "The Design and Implementation of a 3-D Orebody Wire-frame Modeling Prototype System," Second International Conference on Information and Computing Science, vol. 2, 2009, pp. 357-360.

Mei Li, et al., "Research and implement of mining GIS Software for unstratified mineral deposit," Geoinformatics 2006: GNSS and Integrated Geospatial Applications, Proceedings of SPIE, vol. 6418, 2006, 10 pages.

Jonathan Raper, "Three dimensional Applications inGeographic Information Systems," Chapter 1: Three dimensional display of geological data, Taylor and Francis, 1990, pp. 1-9.

International Search Report in Application No. PCT/US2010/050187 dated Jun. 15, 2011, 8 pages.

* cited by examiner

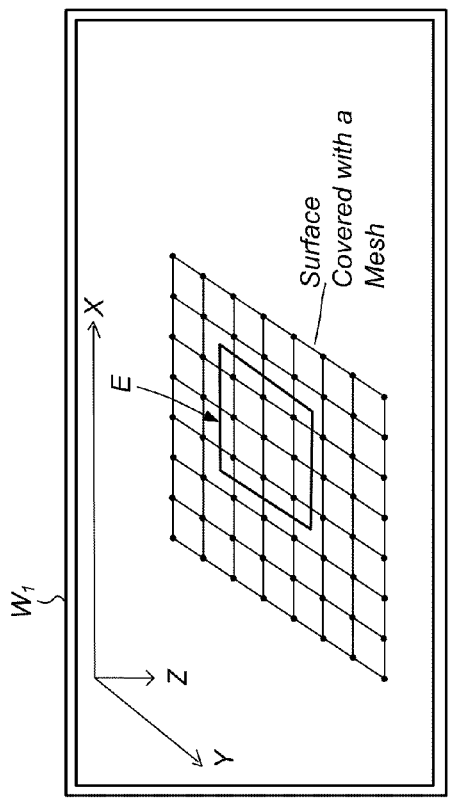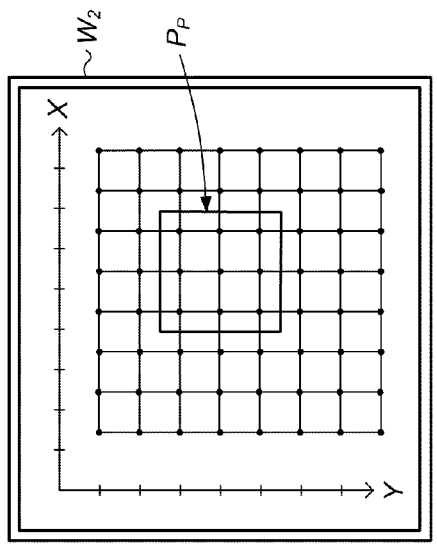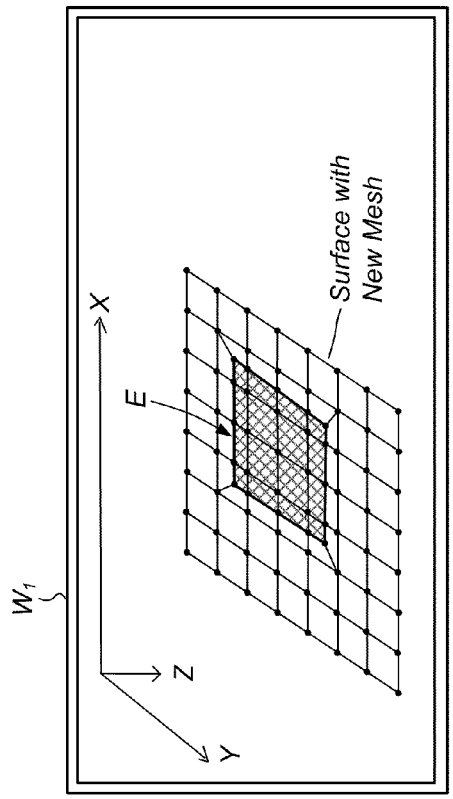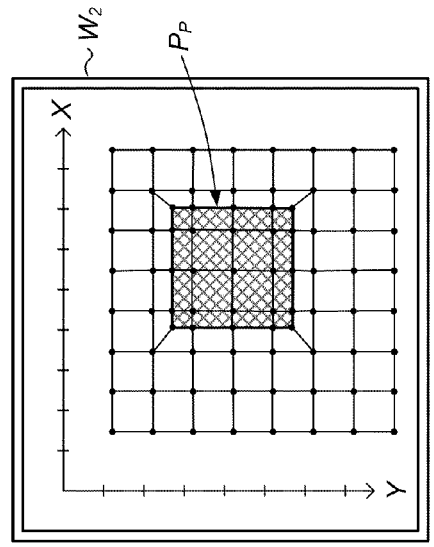
FIG. 17A
FIG. 17B

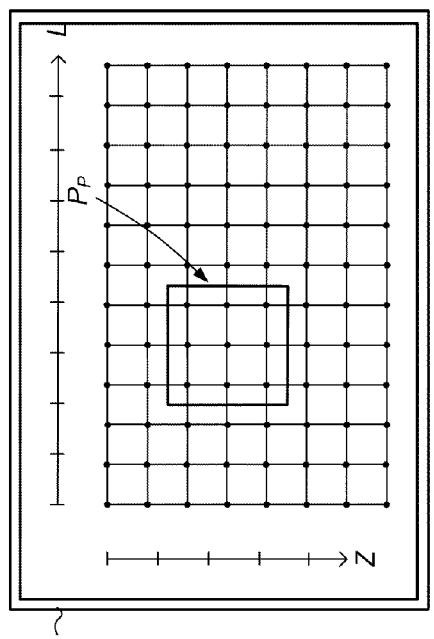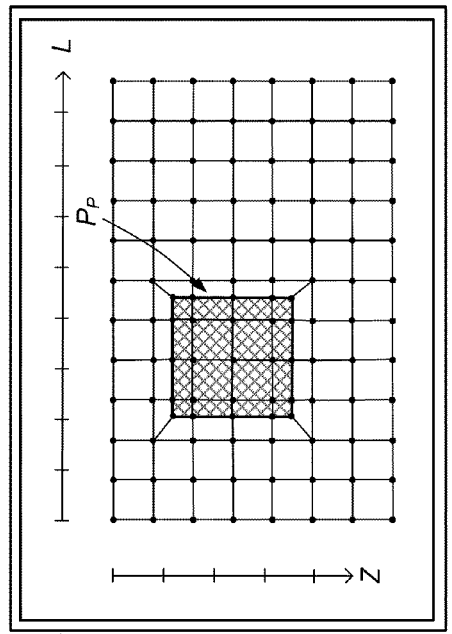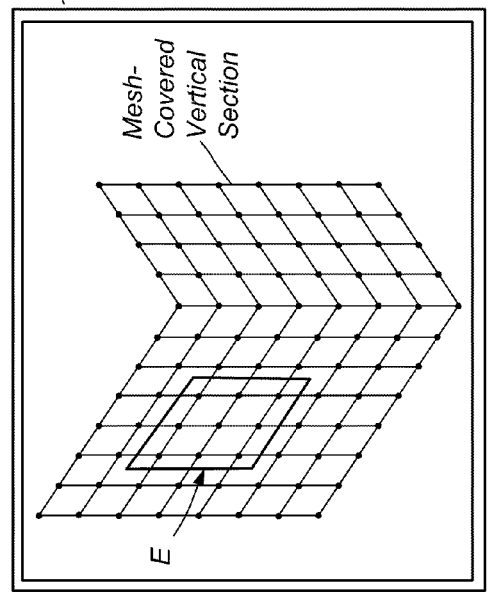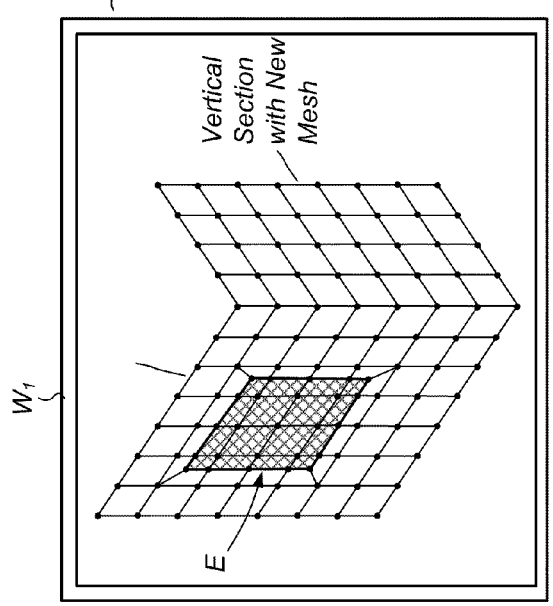
FIG. 21A
FIG. 21B

DRAWING GRAPHICAL OBJECTS IN A 3D SUBSURFACE ENVIRONMENT

FIELD OF THE INVENTION

The present invention generally relates to the field of computer graphics, and more particularly, to a system, method and memory medium for drawing objects in a 3D subsurface environment.

DESCRIPTION OF THE RELATED ART

The art of computer graphics has developed to the point where complex three-dimensional scenes can be created and visualized using software tools such as OpenGL, Java3D and Direct3D. However, such tools may be difficult to use since they require a high level of programming sophistication. For those interested in hydrocarbon exploration and production, there exists a need for tools capable of presenting visualizations of subsurface structures in a 3D environment. Furthermore, there exists a need for tools that allow users to draw within the 3D environment, e.g., to generate graphical objects such as dots, lines, polylines, polygons and surfaces.

SUMMARY

In one set of embodiments, a system for visualizing and interpreting structures in the earth's subsurface may provide the following features. A user may view a set of one or more graphical objects in a 3D scene. The graphical objects may represent any of various things of interest in the field of hydrocarbon exploration and production, e.g., things such as seismic lines or volumes, interpreted seismic horizons, geocellular reservoir models, well bores, seismic cables, etc. The graphical objects may be viewed in a number of different ways. For example, the system provides a 3D window (as part of a graphical user interface) that allows the user to view the graphical objects in a 3D fashion. In another window, the user may view a planar slice through one or more of the graphical objects in the 3D environment, where the slicing plane is specified by the user. In yet another window, the user may view a flattened representation of one or more graphical objects in the 3D environment. (For example, a graphical object representing a 2D seismic line with a linear or curved surface track is a likely candidate for such flattened viewing.) The number of views and their properties may be under user control, e.g., may be dynamically controllable by the user.

In addition to viewing, the user may draw within the 3D environment. For example, the user may draw on a graphical object to interpret/outline some feature of interest on that object. As another example, the user may draw on an arbitrary plane that he/she has specified in the 3D environment. Once created, a drawing becomes a graphical object in its own right, i.e., one that can be moved, edited or deleted, as the user deems appropriate. The user may control the visual properties of each drawing, e.g., properties such as color, texture, line thickness, fill pattern, and opacity.

Any of various types of drawings are contemplated. In some embodiments, the following types of drawings are supported: a dot, a line segment, an arrow, a polyline (open and closed), a smooth curve, a polygon and a surface. The drawings may be used for various kinds of interpretative tasks. For instance, the user may draw a polyline to indicate his/her interpretation of a facies boundary or a fault line in a 2D section, to suggest a proposal for a well trajectory, to recommend the acquisition of more seismic data, etc. The user may draw a polygon to highlight a certain rock layer (or portion thereof), to indicate a hypothesized region of hydrocarbon deposit, to outline regions in a reservoir that are significantly depleted, etc.

In some embodiments, the system allows a number of users to collaborate. The drawings generated by one user may be viewed and/or edited by other users, provided those other users are granted the appropriate permissions. The effort of building and interpreting the set of graphical objects in the 3D environment may be partitioned among a plurality of users.

In some embodiments, the user may draw on existing objects in the 3D space. Thus, a drawing object may live on the surface of an existing object. Alternatively, the user may draw on a temporary drawing surface, e.g., an arbitrary user-specified plane in the 3D space. Thus, a drawing object may float freely in the 3D space, unattached to any of the previously existing objects.

In some embodiments, the user may define a drawing object (such as a polyline or polygon) in the 3D space by specifying 2D vertices in one of the displayed windows. The system maps or projects the 2D vertices into the 3D space (e.g., a 3D virtual world) to obtain 3D vertices. The 3D vertices are used to define (or specify) the drawing object. The 2D vertices may be mapped onto the surface of a graphical object that already exists in the 3D space. Alternatively, the 2D vertices may be mapped into the 3D space by appending a pre-selected vertical coordinate value to each of the 2D vertices.

In some embodiments, the user is allowed to supply drawing inputs via one or more (or all) of the displayed windows. Furthermore, drawing input supplied in one window may be used to dynamically update the state of a drawing object, so the changes become immediately visible in that window and other windows.

In some embodiments, the user may draw a polyline on a gridded surface in the 3D environment, assign a constant value to the polyline, and then instruct the system to compute (or recompute) attribute values for the gridded surface using the constant value on the polyline as a constraint along with other pre-existing constraints. For example, the user may wish to force grid points along a linear path on the surface to have a certain porosity value. Similarly, the user may draw a surface in a 3D gridded volume, assign a constant value to the surface, and then instruct the system to compute (or recompute) attribute values for the gridded volume using the constant value on the surface as a constraint along with other pre-existing constraints.

In some embodiments, the user may draw a polygon on a surface, where the polygon indicates (or represents) one facies being enclosed by another. Thus, the user may instruct the system to automatically construct a mesh for the surface, where the mesh has properties consistent with one facies interior to the polygon and properties consistent with a second facies exterior to the polygon. The mesh may be constructed so as to respect the polyline boundary of the polygon. For example, the mesh may be constructed so that none of its edges cut across the polyline boundary. Similarly, in some embodiments, the user may draw a closed surface within a 3D region, where the closed surface indicates (or represents) one facies being enclosed by another. Thus, the user may instruct the system to automatically construct a 3D mesh for the 3D region, where the mesh has properties consistent with one facies interior to the closed surface and properties consistent with the second facies exterior to the closed surface. The 3D mesh may be constructed so as to respect the closed surface.

For example, the 3D mesh may be constructed so that none of its edges or faces cut across the closed surface.

BRIEF DESCRIPTION OF THE DRAWINGS

FIGS. 17A and 17B illustrate a process of generating a new mesh for a surface in response user input specifying a polygon on that surface.

FIGS. 21A and 21B illustrate one embodiment of a method of generating a new mesh for a vertical section surface in response user input specifying a polygon on that vertical section.

Figure 1:
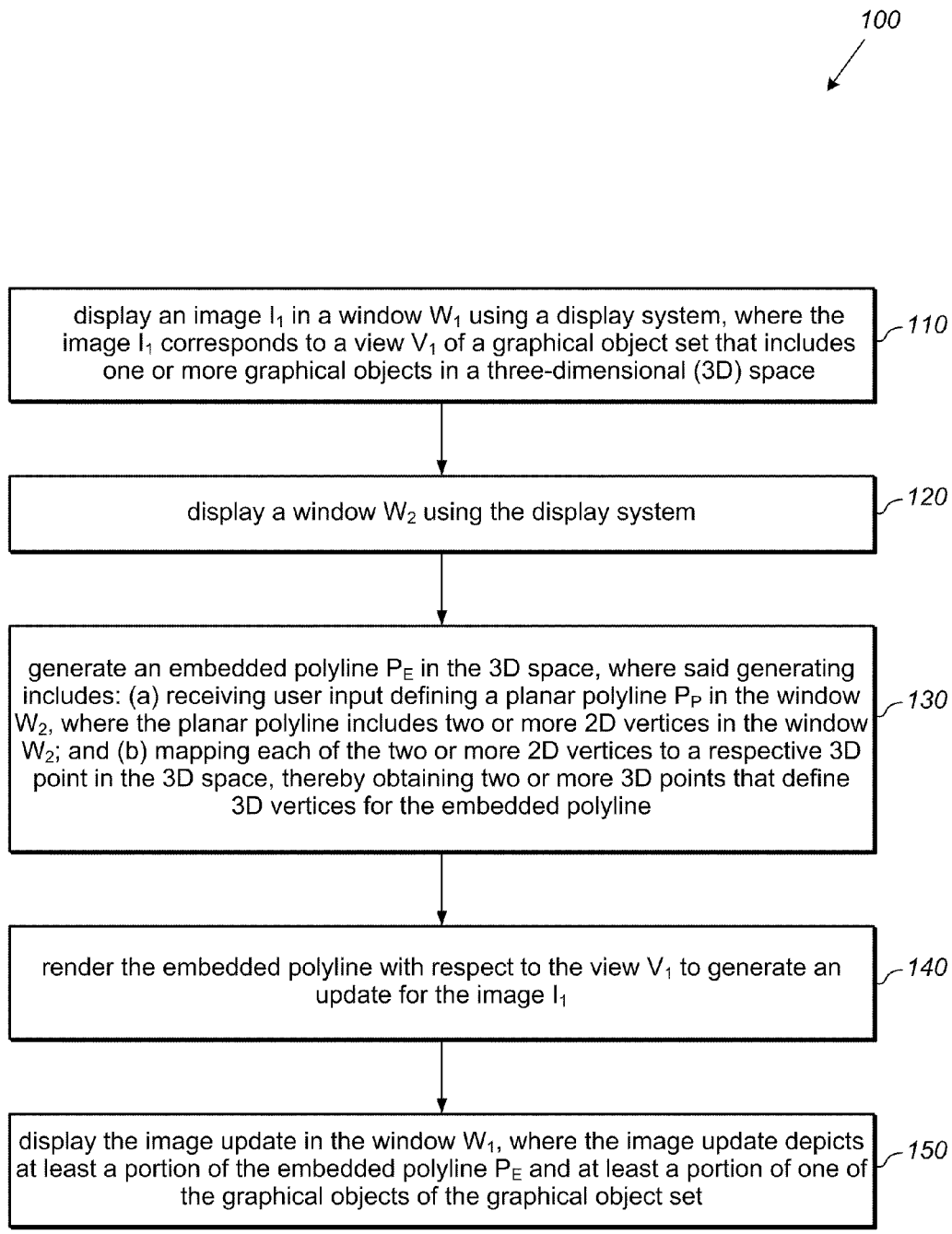
FIG. 1 illustrates one set of embodiments of a method for drawing a polyline in a 3D environment.

While the invention is susceptible to various modifications and alternative forms, specific embodiments thereof are shown by way of example in the drawings and are herein described in detail. It should be understood, however, that the drawings and detailed description thereto are not intended to limit the invention to the particular forms disclosed, but on the contrary, the intention is to cover all modifications, equivalents and alternatives falling within the spirit and scope of the invention as defined by the appended claims.

DETAILED DESCRIPTION OF THE EMBODIMENTS

Incorporation by Reference: U.S. patent application Ser. No. 12/397,416 titled "Three-Dimensional Visualization of Images in the Earth's Subsurface", filed on Mar. 4, 2009, invented by Donald Murray and Stuart Smith, is hereby incorporated by reference in its entirety as though fully and completely set forth herein.

Embodiments of the present invention may be realized in any of various forms. For example, in some embodiments, the present invention may be realized as a computer-implemented method, a computer-accessible memory medium, or a computer system. In other embodiments, the present invention may be realized using one or more custom-designed hardware devices such as ASICs or FPGA's.

A memory medium is a medium configured for the storage and retrieval of information. Examples of memory media include: various kinds of semiconductor memory such as RAM and ROM; various kinds of magnetic media such as magnetic disk, tape, strip and film; various kinds of optical media such as CD-ROM and DVD-ROM; various media based on the storage of electrical charge and/or other physical quantities; media fabricated using various lithographic techniques; etc.

A computer-accessible memory medium is a memory medium that stores program instructions and/or data, where the program instructions are executable by a computer system to implement a method, e.g., any of a method embodiments described herein, or, any combination of the method embodiments described herein, or, any subset of any of the method embodiments described herein.

In some embodiments, a computer system may be configured to include a processor (or a set of processors) and a memory medium. The memory medium stores program instructions. The processor is configured to read and execute the program instructions from the memory medium. The program instructions are executable to implement any of the various method embodiments described herein (or, any combination of the method embodiments described herein, or, any subset of any of the method embodiments described herein). The computer system may be realized in any of various forms. For example, the computer system may be a personal computer (in any of its various realizations), a workstation, a computer on a card, a server computer, a client computer, a hand-held device, a wearable computer, etc.

In some embodiments, a set of computers distributed across a network may be configured to partition the effort of executing a computational method (e.g., any of the method embodiments disclosed herein). In some embodiments, a server computer may be configured to perform graphical services for client computers. The client computers may couple to the server computer through a computer network. The graphical services may include any of the method embodiments described herein, or, any combination of those method embodiments.

As used herein, the term "polyline" refers to a connected series of one or more line segments joined end-to-end. Equivalently, a polyline is a curve corresponding to a sequence of two or more points (called vertices), i.e., the curve obtained by joining each consecutive pair of points in the sequence with a line segment.

Generating a Polyline in 3D by Drawing in a 2D Window.

In one set of embodiments, a method 100 for drawing a polyline in a 3D environment may involve a number of operations, as shown in FIG. 1.

At 110, a computer system may display an image $I_1$ in a window $W_1$ using a display system. The image $I_1$ may correspond to a view $V_1$ of a graphical object set $S_G$ that includes one or more graphical objects in a three-dimensional (3D) space. In some embodiments, each of the one or more graphical objects represents a corresponding sub-surface geological structure. A coordinate system of the 3D space may include a vertical coordinate, a first horizontal coordinate and a second horizontal coordinate. In some embodiments, the coordinate system of the 3D space is a cartographic reference system that has been selected by a user. As used herein, the term "window" has the full breadth of its ordinary meaning, and refers to a portion or all of a display screen for displaying content, such as an image, text, etc. A window may be a graphical user interface (GUI) element for receiving user input and/or displaying output.

The view $V_1$ may be the view of a virtual camera situated in the 3D space. The view $V_1$ may have viewing parameters such as a view point and a view direction that are adjustable (e.g., dynamically controllable) by a user.

The graphical objects of the graphical object set may conform to any of a variety of types. For example, the graphical objects may include solids, surfaces, paths, points, particle clouds, etc. The graphical objects may include 1D, 2D and/or 3D manifolds or combinations thereof. The graphical objects may include objects such as seismic interpreted horizons, geomodeled surfaces, gridded surfaces, geocellular models, etc. (The geomodeled surfaces may be constructed from one or more of the following: well pick interpretation, seismic interpreted horizons, point sets, dots, seismic interpreted faults.) The graphical objects may also include subsurface data objects such as seismic volumes and well bore trajectories.

At 120, the computer system may display a window $W_2$ using the display system. The window $W_2$ may be configured to allow drawing inputs, e.g., drawing inputs that are supplied using one or more input devices such as a mouse, keyboard, touch sensitive screen, etc.

At 130, the computer system may generate a polyline $P_E$ in the 3D space based on user input. The polyline $P_E$ is referred to herein as the "embedded" polyline to indicate that it is resides in the 3D space. The operation of generating the embedded polyline $P_E$ may include: (a) receiving user input that defines (or specifies) a planar polyline $P_P$ in the window $W_2$, where the planar polyline includes two or more 2D vertices in the window $W_2$; and (b) mapping each of the two or more 2D vertices to a respective 3D point in the 3D space, thereby obtaining two or more 3D points that define 3D vertices for the embedded polyline. (The polyline $P_P$ is said to be a "planar" polyline because it resides within the two-dimensional space corresponding to the window $W_2$. In contrast, the embedded polyline resides in the 3D space and its vertices are 3-tuples.)

In some embodiments, the computer system allows the user generate a closed polyline $P_E$ (i.e., one that forms a closed circuit). To do so, the user specifies a closed planar polyline in the window $W_2$.

At 140, the computer system may render the embedded polyline $P_E$ with respect to the view $V_1$ in order to generate an update for the image $I_1$. (In some embodiments, the computer system may render one or more of the graphical objects of the graphical object set along with the embedded polyline.) The update $I_1^*$ may be similar or identical to the image $I_1$ over a large subset of the image pixels. However, the update $I_1^*$ may differ from the image $I_1$ over a subset of image pixels that correspond to the embedded polyline. The rendering of the embedded polyline $P_E$ may involve the use of graphical rendering infrastructure such as a graphics API and/or a graphics accelerator.

As used herein, the term "image" refers to a two-dimensional array of pixel values.

At 150, the computer system may display the update $I_1^*$ in the window $W_1$ using the display system. The update $I_1^*$ depicts at least a portion of the embedded polyline $P_E$ and at least a portion of one of the graphical objects of the graphical object set.

In some embodiments, the action 120 of displaying the window $W_2$ may include displaying an image $I_2$ in the window $W_2$, where the image $I_2$ corresponds to a second view $V_2$ of the graphical object set as seen from above in the 3D space. Furthermore, the above-described action of mapping each of the 2D vertices (of the planar polyline $P_P$) to a respective 3D point in the 3D space may include: (1) computing a 2D point based on the 2D vertex, where the 2D point includes a value for the first horizontal coordinate and a value for the second horizontal coordinate; and (2) assigning a value for the vertical coordinate to the 2D point to obtain the 3D point.

In one embodiment, each of the 2D vertices is represented by a coordinate pair (U,V) where U and V are pixel coordinates relative to an origin of the window $W_2$. The computer system may transform the coordinate pair (U,V) to determine the corresponding 2D point (X,Y), where X and Y represent the horizontal coordinates. In some embodiments, the relationship between (U,V) and (X,Y) may be user-adjustable.

In some embodiments, the method 100 of FIG. 1 may additionally include: rendering the embedded polyline with respect to a view $V_2$ in the 3D space in order to generate an image $I_2$, where the view $V_2$ represents a top-down view of the 3D space; and displaying the image $I_2$ in the window $W_2$. This rendering and display may be dynamically responsive to user drawing-inputs in the window $W_2$ (or any of the displayed windows), so that the user sees instantaneous changes on the screen as the user provides the drawing inputs.

Referencing the Vertical Coordinate Values to an Existing Object

Figure 2:
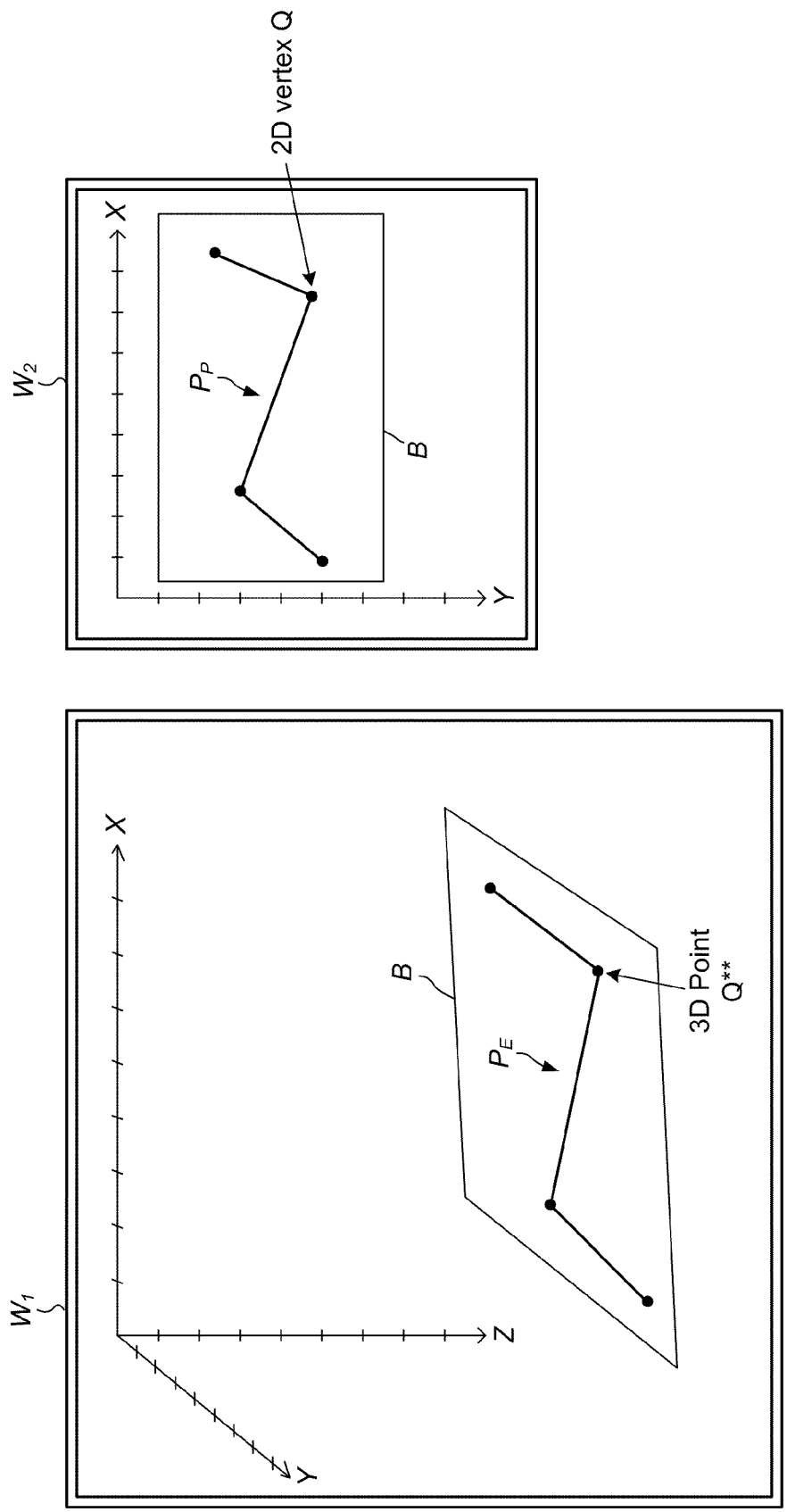
FIG. 2 illustrates one embodiment of a method for mapping vertices of a planar polyline onto the surface of an existing graphical object in the 3D space.

In one mode of operation, the above-described action of assigning a vertical coordinate value to the 2D point to obtain a 3D point may include vertically projecting the 2D point to determine a surface point on a surface of one of the graphical objects in the 3D space. FIG. 2 shows an example usage of this operational mode. Window $W_1$ shows a 3D perspective view into the 3D space while window $W_2$ shows a top-down view into the 3D space. The vertical coordinate is denoted Z. The embedded polyline $P_E$ has four vertices, two endpoints and two intermediate "knee" points. The graphical object B is a rectangular surface. The user may draw the planar polyline $P_P$ in the window $W_2$, e.g., using mouse actions applied inside the window $W_2$. The computer system responsively generates the embedded polyline $P_E$ in the 3D space. (In one embodiment, the state of embedded polyline dynamically follows the instantaneous state of the planar polyline as the user creates or modifies the planar polyline in the window $W_2$.) The planar polyline includes 2D vertices such as Q. The computer system operates on the 2D vertex Q, e.g., by performing an affine transformation on Q, to determine the 2D point $Q^*=(X,Y)$. The 2D point $Q^*$ is then vertically projected onto the rectangular surface B to determine a surface point $Q^{}$. That surface point $Q^{}$ is used as one of the 3D vertices of the embedded polyline. Because surface B is flat and because the 3D vertices of the embedded polyline reside on the surface B, the embedded polyline will itself reside on the surface B. However, if the surface B had been curved or non-flat, the embedded polyline would not necessarily reside on the surface B. For example, if the surface B were a hemi-spherical bowl, the embedded polyline would touch the bowl only at the 3D vertices of the embedded polyline.

While FIG. 2 shows all the 2D vertices of the planar polyline $P_P$ being mapped onto a single graphical object, the computer system imposes no such constraint. Different ones of the 2D vertices may be mapped onto different graphical objects if the user so desires. For example, the user may wish to draw a polyline connecting a feature on the surface of one graphical object to a feature on the surface of another graphical object, to establish a conceptual identification of the two features.

In FIG. 2, the graphical object B appears in both windows $W_1$ and $W_2$. However, there is no requirement that all graphical objects of the graphical object set $S_G$ be visible in all windows. An object may be occluded (or partially occluded) by one or more other objects. Some objects may be outside (or partially outside) of the view frustum of a given view. Some objects may be temporarily made invisible by the user in order to more clearly view other objects.

Figure 3:
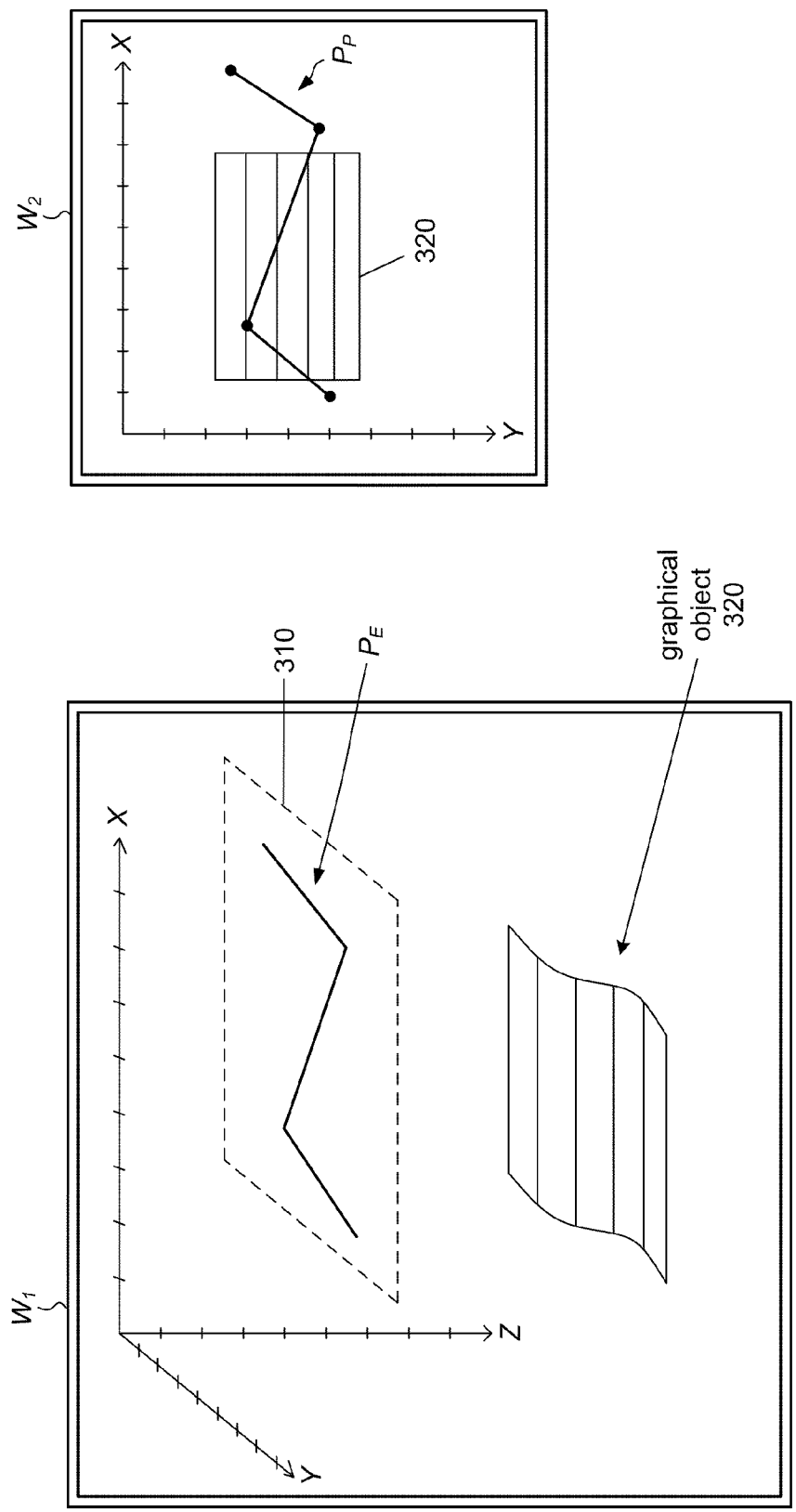
FIG. 3 illustrates one embodiment of a method for mapping vertices of a planar polyline onto a horizontal plane in the 3D space.

As an alternative to the project-onto-object method for assigning the vertical coordinate values, the 2D points corresponding to the two or more 2D vertices (of the planar polyline) may be assigned the same value for the vertical coordinate so that the 3D vertices of the embedded polyline $P_E$ reside in a horizontal plane of the 3D space. An example of this alternative embodiment is illustrated in FIG. 3. As the user draws the planar polyline $P_P$ in the window $W_2$, the computer system generates the embedded polyline $P_E$ on a horizontal plane 310 that corresponds to the vertical coordinate value Z. The vertical coordinate value Z may be determined by user input or by system default. (The horizontal plane 310 is shown in FIG. 3 for the sake of discussion. However, it is not necessarily displayed in any of the windows.)

After a first embedded polyline has been generated, the user may want the computer system to generate another embedded polyline in the same horizontal plane or perhaps in a different horizontal plane. In the former case, the user would simply draw a second planar polyline in the window $W_2$. In the latter case, the user would specify a different value for the vertical coordinate before drawing the second planar polyline in the window $W_2$.

Window $W_2$ Representing a Horizontal Planar Slice

Figure 4:
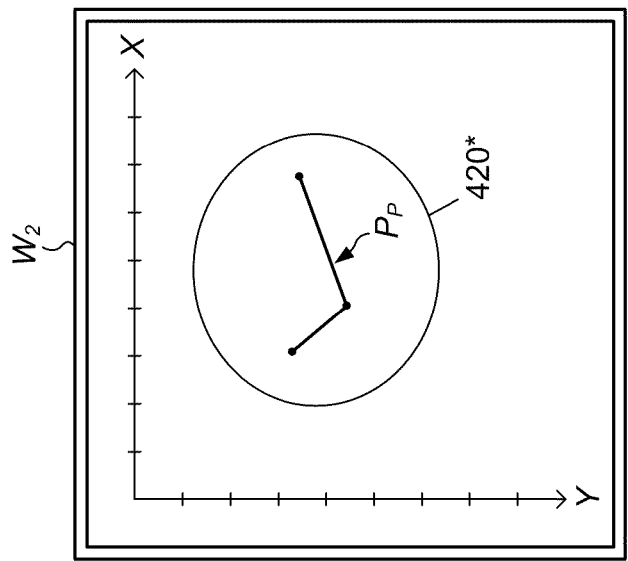
FIG. 4 illustrates one embodiment of a method for mapping vertices of a planar polyline onto a horizontal cross section in the 3D space.
Figure 4:
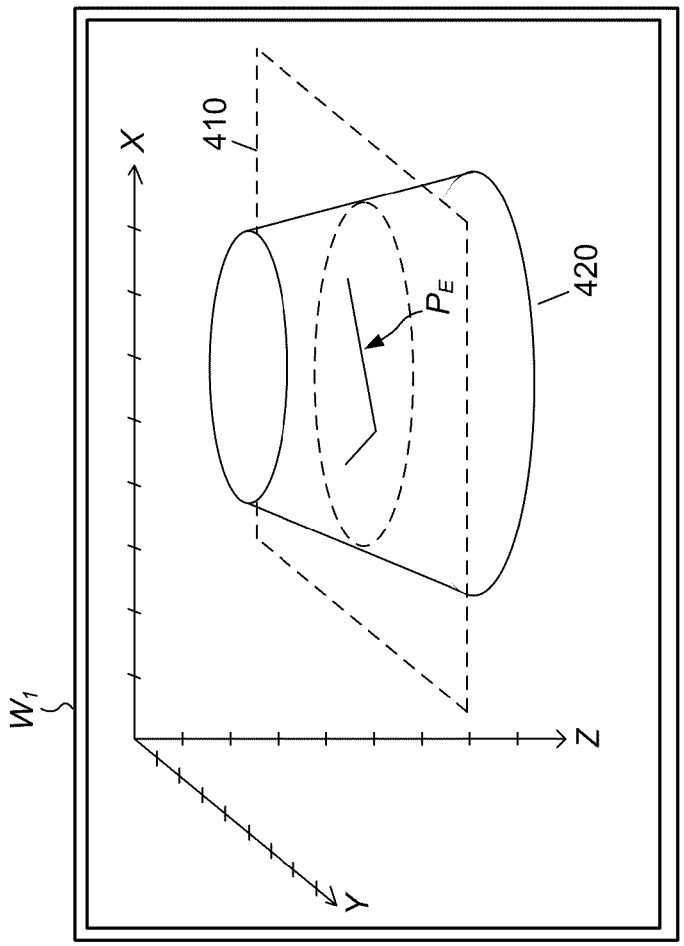

In another embodiment, the action 120 of displaying the window $W_2$ includes displaying an image $I_{CS}$ in the window $W_2$, where the image $I_{CS}$ represents a horizontal planar slice of the 3D space corresponding to a horizontal plane at a given value of the vertical coordinate, where the two or more 3D points obtained by the above-described mapping operation reside in the horizontal plane. The given vertical coordinate value may be specified by user input. The horizontal planar slice may slice through one or more graphical objects. The intersection of any such objects with the horizontal plane may be shown in the window $W_2$ as part of the image $I_{CS}$, e.g., as shown in FIG. 4. In the figure, window $W_2$ depicts a horizontal planar slice corresponding to horizontal plane 410. The horizontal plane 410 intersects the solid object 420, which is shaped like a truncated solid cone. Window $W_2$ shows the cross section 420* of the solid object 420 with the plane 410. The user draws the planar polyline $P_P$ in the window $W_2$, and the computer system responsively generates the embedded polyline $P_E$ on the horizontal plane 410 in the 3D space. The user may draw the planar polyline in an attempt to interpret some feature visible in the cross section 420*.

Remapping of Embedded Polyline Using the Same 2D Vertices

After an embedded polyline is created, it may be modified in a number of different ways. In some embodiments, the computer system may update the embedded polyline $P_E$ in the 3D space in response to user input, where the updating action includes mapping each of the two or more 2D vertices (of the corresponding planar polyline $P_P$) to a new 3D point in the 3D space, thereby obtaining two or more new 3D points that define the 3D vertices for an updated version $P_E^*$ of the embedded polyline. (In one implementation of the updating action, the computer system may assign new values for the vertical coordinate to the 3D vertices of the embedded polyline to obtain the updated version $P_E^*$.) The computer system may render the updated polyline version $P_E^*$ with respect to the view $V_1$ to generate a second update $I_1^{}$ for the image $I_1$. The second update $I_1^{}$ may be displayed in the window $W_1$ using the display system. The second update $I_1^{**}$ may depict at least a portion of the updated version $P_E^*$.

Figure 5:
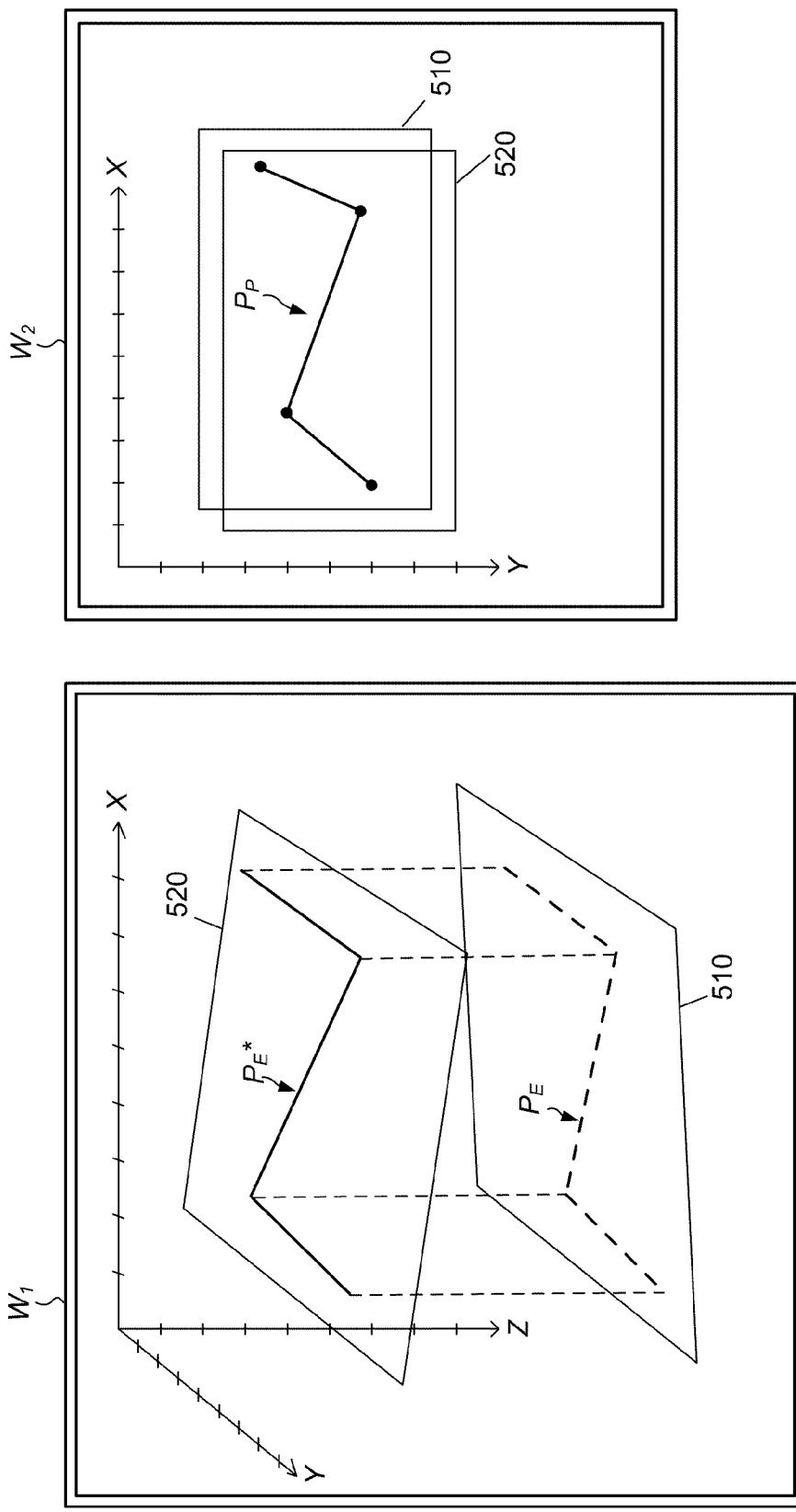
FIG. 5 illustrates one embodiment of a method for remapping a polyline from one graphical object to another in the 3D space.

In one embodiment, the updating action may re-map an embedded polyline from one graphical object to another. In other words, the two or more 3D points of the embedded polyline $P_E$ may reside on a surface of a first graphical object in the 3D space, while the two or more new 3D points (resulting from the updating action) may reside on a surface of a second graphical object in the 3D space. The second graphical object may be identified (or selected) by a user prior to the updating action. FIG. 5 illustrates an example of remapping an embedded polyline from one object to another. The embedded polyline $P_E$ resides on a first surface 510 and then is updated so that the updated version $P_E^*$ resides on second surface 520. In window $W_1$, the user sees the embedded polyline $P_E$ disappearing from surface 510 and the updated version $P_E^*$ appearing on surface 520.

In another embodiment, the updating action may re-map an embedded polyline from one horizontal level to another. In other words, the two or more 3D points of the embedded polyline $P_E$ may reside on a first horizontal plane in the 3D space, while the two or more new 3D points (resulting from the updating action) may reside on a second horizontal plane in the 3D space. The second horizontal plane may correspond to a user-specified value of the vertical coordinate. In other embodiments, the updating action may re-map an embedded polyline from a horizontal plane to the surface of an object, or, from the surface of an object to a horizontal plane.

Figure 6:
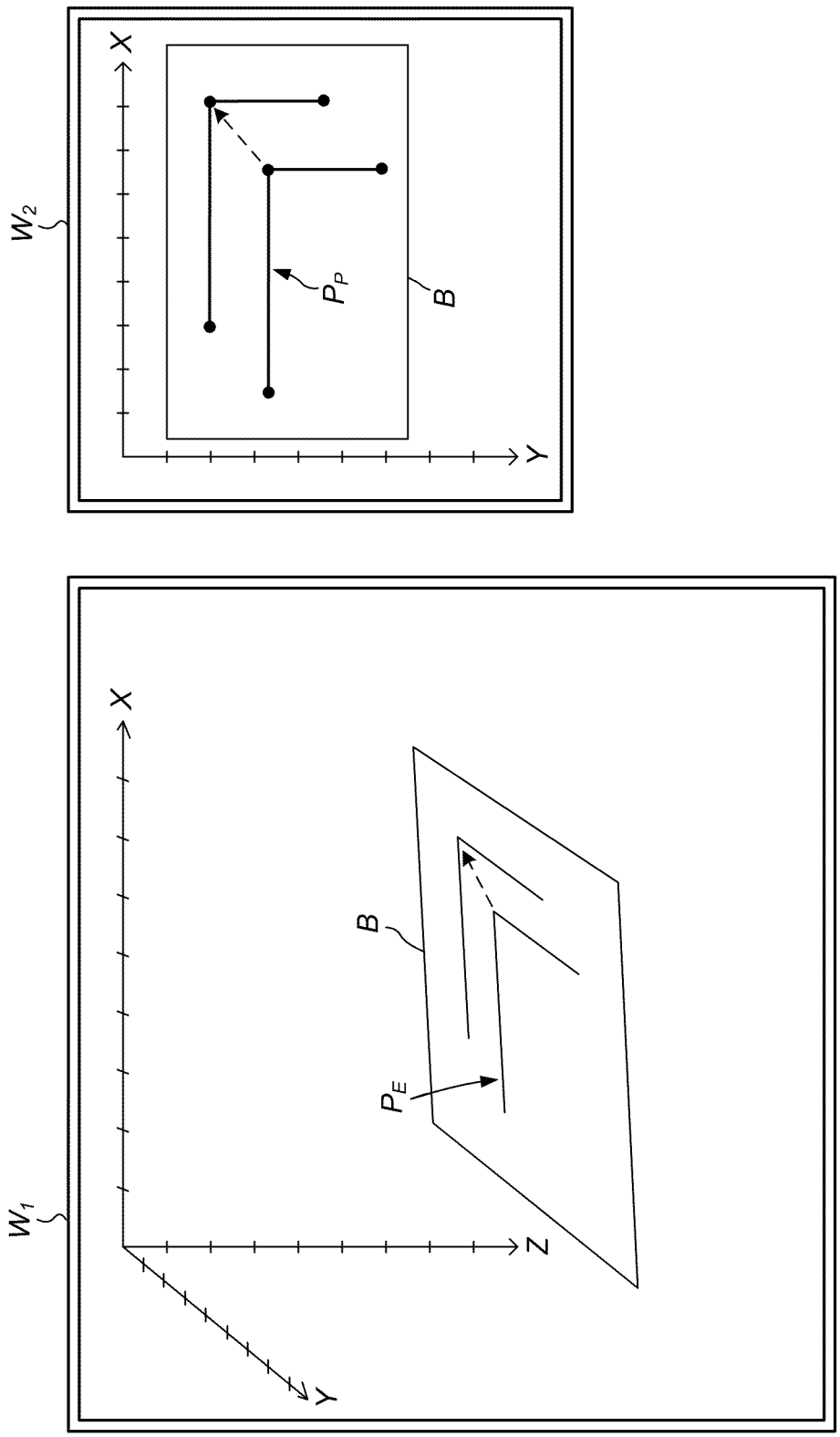
FIG. 6 illustrates one embodiment of a method for translating a polyline on the surface of a graphical object in the 3D space.
Figure 7:
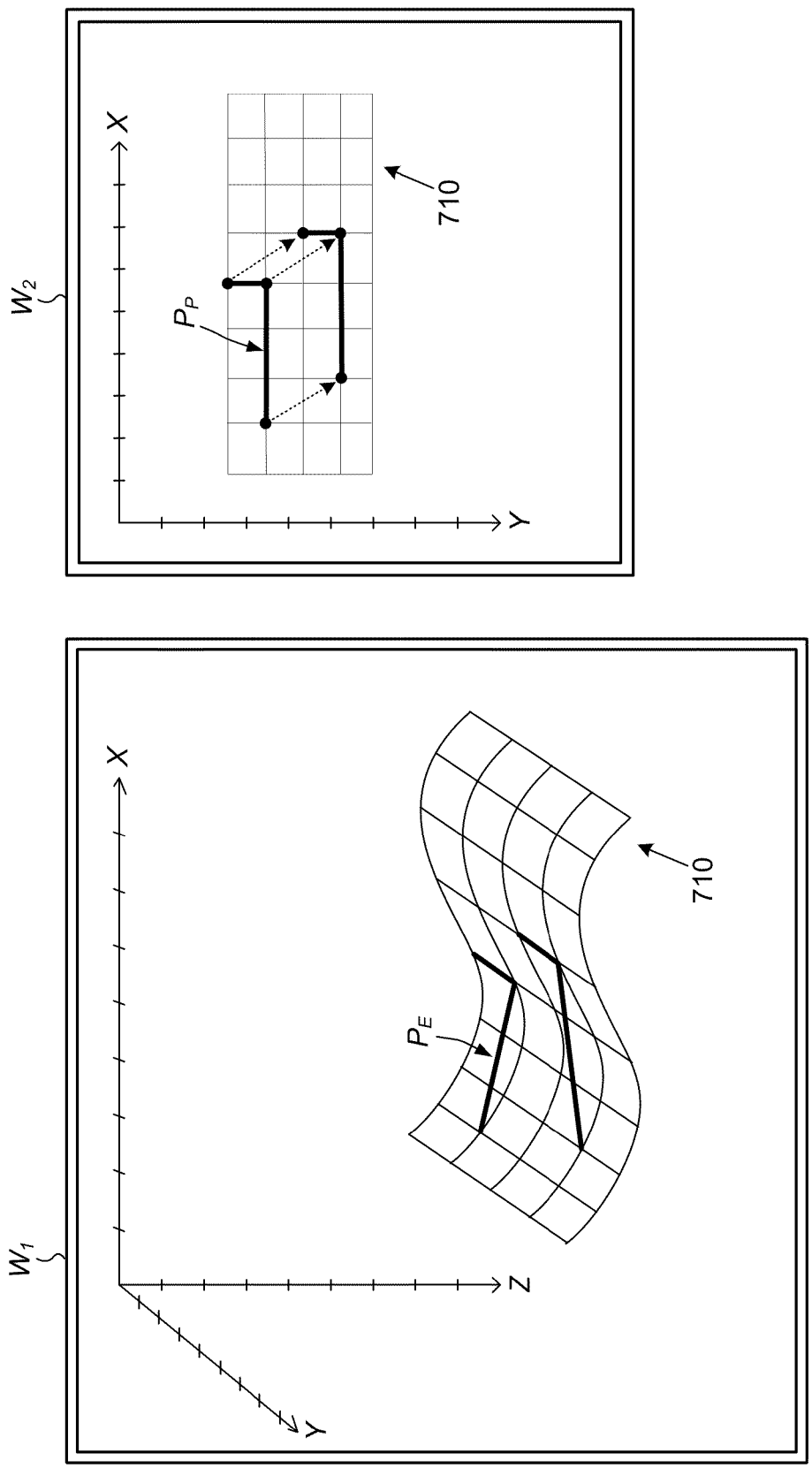
FIG. 7 illustrates one embodiment of a method for modifying a polyline on a curved surface object in the 3D space.

In one embodiment, the method 100 may further include: receiving user input specifying a 2D translation of the planar polyline $P_P$ in the window $W_2$; computing new 2D vertices (to define a translated planar polyline) by applying the 2D translation to the two or more 2D vertices of the planar polyline $P_P$; and mapping each of the new 2D vertices to new 3D points in the 3D space, where the new 3D points define new 3D vertices for the embedded polyline $P_E$. The mapping may be an object-based mapping or a horizontal-plane-based mapping as described above. The computer system may render the embedded polyline based on the new 3D vertices to obtain a second update $I_1^{}$ for the image $I_1$; and display the second update $I_1^{}$ in the window $W_1$. The second update may depict at least a portion of the embedded polyline (i.e., the new state of the embedded polyline based on the new 3D vertices). FIG. 6 shows an example of this embodiment, where the embedded polyline $P_E$ resides on the surface of a flat surface object B. In response to the user's action of translating the planar polyline $P_P$, e.g., by dragging the planar polyline with the mouse, the computer system generates new 2D vertices for the planar polyline, and maps those new 2D vertices to new 3D points on the surface object B, effecting a movement of the embedded polyline $P_E$ on the surface object B. FIG. 7 shows another example, where the embedded polyline $P_E$ resides on a curved surface 710. Again, the user provides inputs to translate the planar polyline $P_P$ in the window $W_2$. However, because the surface 710 is not flat, the corresponding update to the embedded polyline $P_E$ is not simply a rigid-body translation in 3D.

In some embodiments, the method 100 may also include: receiving user input specifying a modification to the planar polyline $P_P$ in the window $W_2$; updating the embedded polyline based on the specified modification to the planar polyline (or based on the input data); and rendering the updated embedded polyline to generate a second update for the image $I_1$. The second update may be displayed using the display system. The second update may depict at least a portion of the updated embedded polyline. In one embodiment, the modification to the planar polyline may include a movement of one of the 2D vertices (of the planar polyline) in the window $W_2$. For example, the user may grab a 2D vertex and drag it within the window $W_2$. In another embodiment, the modification may include an addition of a new 2D vertex to the planar polyline in the window $W_2$. The new vertex may be added at the beginning, at the end, or along any of the edges of the planar polyline. In yet another embodiment, the modification may include scaling (e.g., linearly scaling) the size of the planar polyline as a whole. Such scaling may be used to expand or contract the planar polyline. In yet another embodiment, the modification may include translating (or rotating or reflecting) the planar polyline in the window $W_2$.

Figure 8:
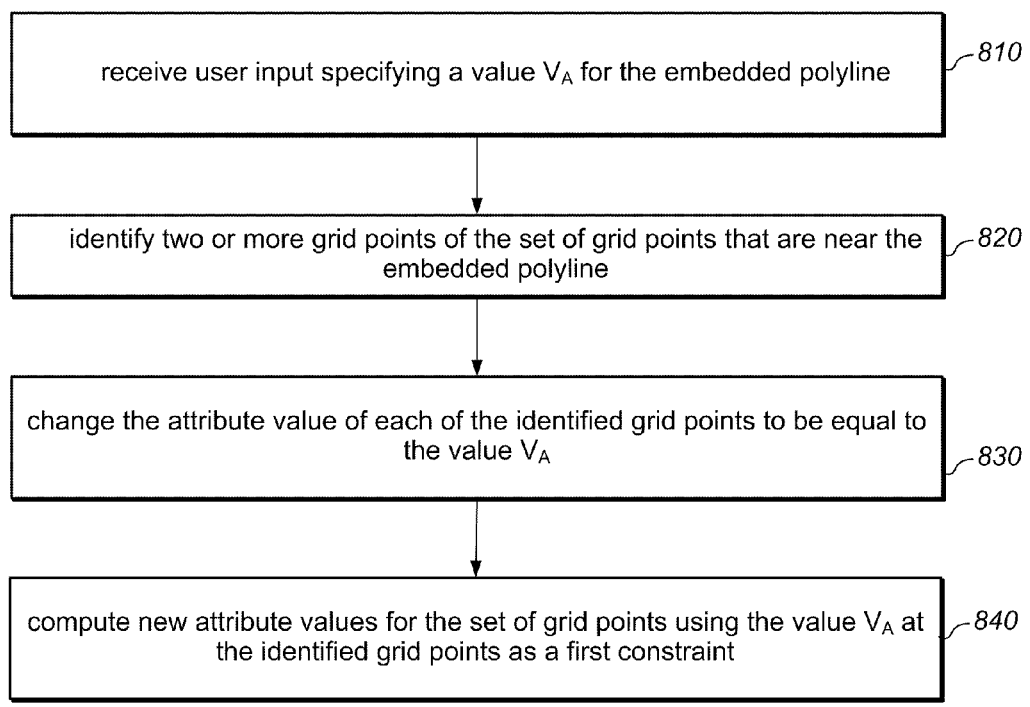
FIG. 8 illustrates one embodiment of a method for modifying the attribute values of a gridded surface in the 3D space.

In some embodiments, a graphical object (such as a geological model) may include a set of grid points that cover a surface in the 3D space. Each of the grid points may have an associated attribute value. More generally, each of the grid points may have an associated set of attribute values. For example, a reservoir model may include values for pressure, temperature, oil and water saturation, and porosity at each grid point. As described above, an embedded polyline may be generated so that it (or, at least its 3D vertices) resides on the surface. In one set of embodiments, the embedded polyline may be used as a mechanism for modifying the attribute values of at least a subset of the grid points. Thus, the method 100 of FIG. 1 may include the following additional operations as shown in FIG. 8.

At 810, the computer system may receive user input specifying a value $V_A$ of the attribute for the embedded polyline $P_E$. For example, in one embodiment, the user may right click on the embedded polyline (in any of the displayed windows) to access a data entry dialog for specifying the value $V_A$. Any of various user interface mechanisms are contemplated for specifying the value $V_A$.

Figure 9:
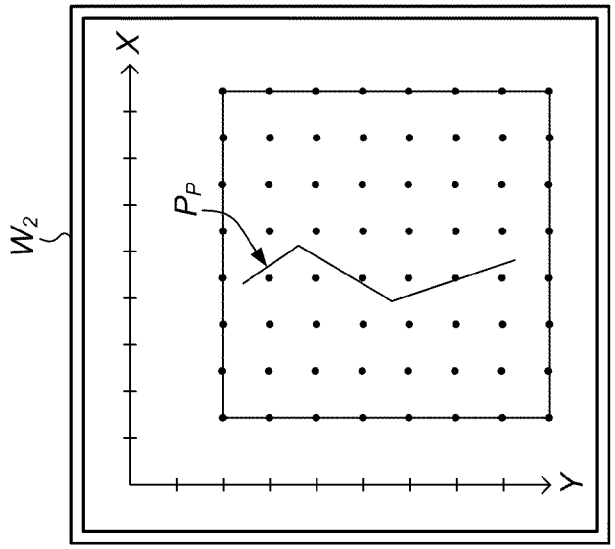
FIG. 9 illustrates an example of the method embodiment of FIG. 8.
Figure 9:
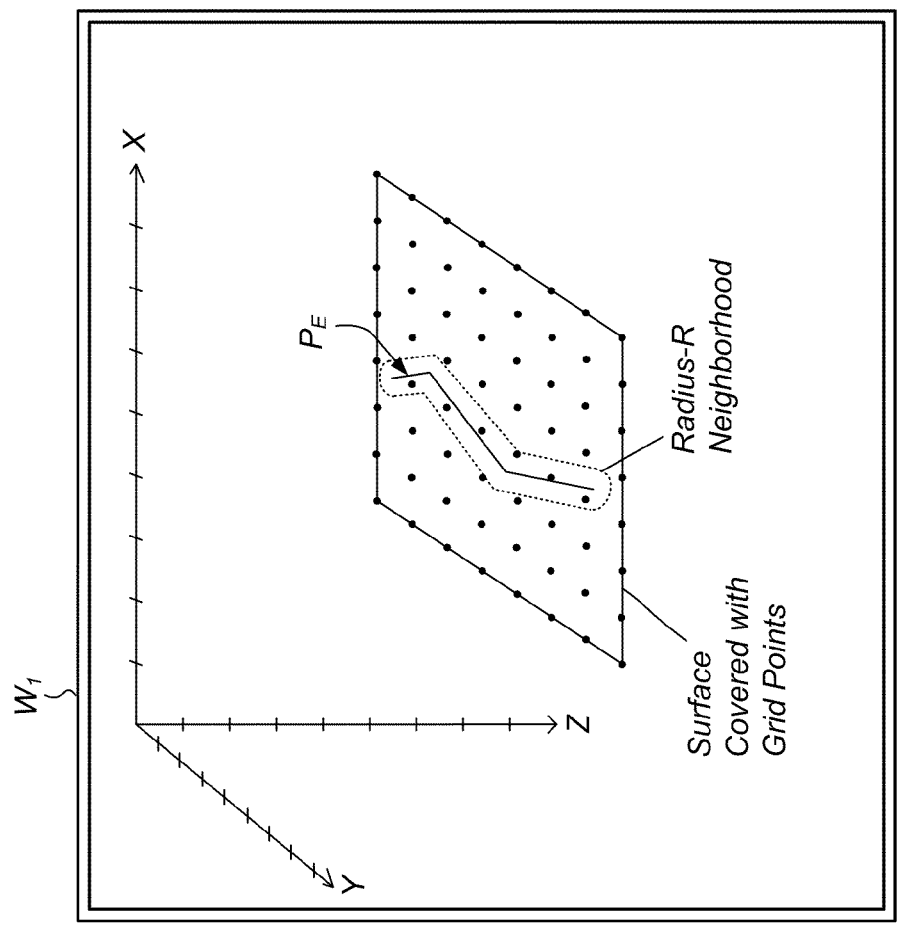

At 820, the computer system may identify two or more of the grid points (of the graphical object) that are near the embedded polyline. For example, the computer system may identify grid points that are within a radius-R neighborhood of the embedded polyline as shown in FIG. 9. The radius-R neighborhood may be defined as the union of radius-R balls (i.e., solid balls of radius R) centered on every point of the embedded polyline. In one embodiment, the radius R may be subject to user control.

At 830, the computer system may change the attribute value of each of the identified grid points to be equal to the value $V_A$.

At 840, the computer system may compute new attribute values of at least a subset of the grid points using the value $V_A$ at the identified grid points as a first constraint. In one embodiment, the computer system may generate the new attribute values by iteratively applying a diffusion kernel to the attribute values over the set of grid points (or the subset of grid points). The diffusion kernel models the process of diffusion, e.g., heat diffusion. Thus, information regarding the first constraint (and any other existing constraints) gets diffused throughout the grid.

The computation of the new attribute values may use one or more constraints in addition to the first constraint. For example, there may be an already-existing set of one or more constraints on the attribute values at grid points along the boundary of the surface and/or along previously-defined embedded polylines. (In some embodiments, the constraints may also include constraints on spatial derivatives of the attribute value.)

In one embodiment, the computer system may execute a simulation (e.g., a reservoir flow simulation) based on the set of grid points and the new attribute values. The results of the simulation may be displayed in one or more of the displayed windows. For example, the computer system may display the time evolution of the attribute values over the grid, e.g., by rendering the attribute values with a visual property such as color, grayscale, reflectance, luminosity, etc.

In one embodiment, the attribute value of a grid point may represent the value of a spatial coordinate, e.g., the vertical coordinate Z or a displacement coordinate in a direction normal to the surface at that grid point. Thus, the embedded polyline may be used to modify geometric/spatial information associated with a grid.

In some embodiments, the computer system may allow the user to select (or specify) an attribute value function to be assigned to the embedded polyline, e.g., a function of arc length along the embedded polyline. For example, the function may be a linear, affine, polynomial or sinusoidal function of arc length.

In some embodiments, one or more of the graphical objects of the graphical object set $S_G$ may be solid objects that occupy volume. For example, a 3D reservoir model may include a 3D mesh of volume cells that covers a 3D region of the 3D space.

As mentioned above, the coordinate system of the 3D space may include a vertical coordinate, a first horizontal coordinate and a second horizontal coordinate. The vertical coordinate may have a user-specified interpretation. In some embodiments, the method 100 (discussed above and illustrated in FIG. 1) may include receiving user input selecting a physical interpretation to be associated with the vertical coordinate, where the physical interpretation is selected from a set of supported interpretations. The set of supported interpretations may include time and one or more depth interpretations. For example, the supported depth interpretations may include depth relative to the earth's surface, depth relative to the sea floor, and depth relative to the sea surface. In one embodiment, the user may elect to have the vertical coordinate represent a Z attribute (e.g., a depth attribute) of a selected one the graphical objects In some situations, the user may wish to create an arrow in the 3D space. Thus, in one embodiment, the computer system may employ the method 100 described above to generate a line segment (i.e., an embedded polyline with two vertices) in the 3D space. The line segment represents the shaft of the arrow. The computer system may then render a structure representing a head of the arrow. The structure is appended to a head end of the line segment.

As noted above, the set of viewing parameters that define the view $V_1$ may be adjustable by a user. The viewing parameters may include a view point and a view direction in the 3D space. The view point and/or the view direction may be dynamically adjustable in response to user input. In other words, the computer system continuously renders and displays according to the instantaneous state of the view parameters as those parameters are being changed. In one embodiment, the viewing parameters may include a parameter that indicates a projection type from a set of supported projection types, where the set of supported projection types includes perspective and orthographic.

In some embodiments, the method 100 of FIG. 1 may also include: rendering the embedded polyline with respect to a view $V_3$ in the 3D space in order to generate an image $I_3$; and displaying the image $I_3$ in a third window $W_3$ using the display system. The view $V_3$ may correspond to a separate virtual camera in the 3D space that has its own set of viewing parameters. Those viewing parameters may be controllable (e.g., dynamically adjustable) by the user. More generally, the user may deploy any desired number of simultaneous views, each having its own window and its own set of viewing parameters.

Generating a Polyline in 3D via the 2D Section View.

Figure 10:
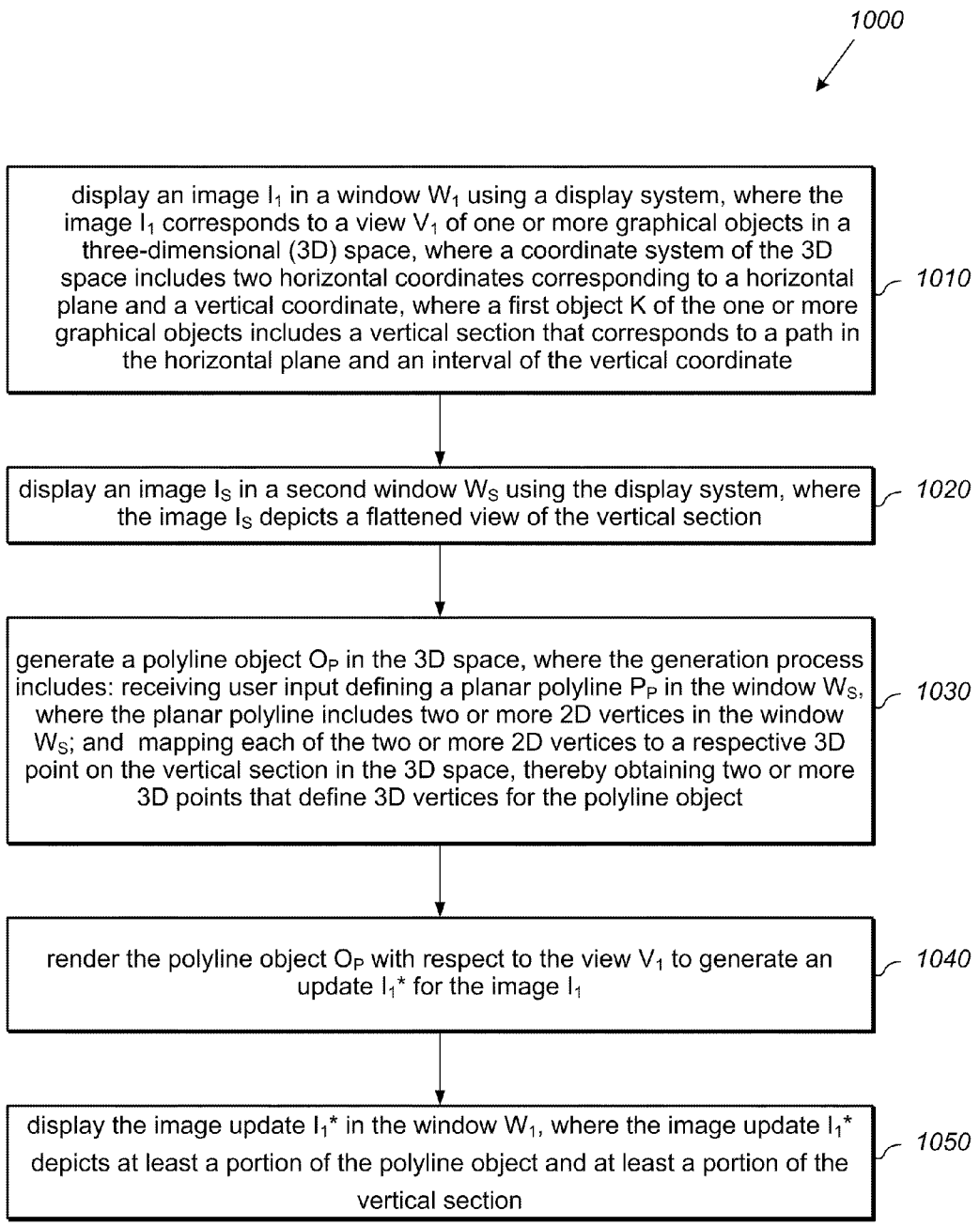
FIG. 10 illustrates one embodiment of a method for drawing a polyline on a vertical section in a 3D environment.

In one set of embodiments, a method 1000 for drawing a polyline in a 3D environment may involve a number of operations, as shown in FIG. 10.

At 1010, a computer system may display an image $I_1$ in a window $W_1$ using a display system, where the image $I_1$ corresponds to a view $V_1$ of one or more graphical objects in a three-dimensional (3D) space. The one or more graphical objects may represent corresponding sub-surface geological structures. A coordinate system of the 3D space may include: two horizontal coordinates corresponding to a horizontal plane, and a vertical coordinate. A first object K of the one or more graphical objects may include a vertical section that corresponds to a path $P_K$ in the horizontal plane and an interval of the vertical coordinate. The vertical section may be interpreted as the Cartesian product of the path and the interval. The interval may be a closed interval [a,b], where a and b are values of the vertical coordinate.

At 1020, the computer system may display an image $I_S$ in a window $W_S$ using the display system, where the image $I_S$ depicts a flattened view (or representation) of the vertical section.

At 1030, the computer system may generate a polyline object $O_P$ in the 3D space, where the generation process includes: receiving user input defining a planar polyline $P_P$ in the window $W_S$, where the planar polyline includes two or more 2D vertices in the window $W_S$; and mapping each of the two or more 2D vertices to a respective 3D point on the vertical section in the 3D space, thereby obtaining two or more 3D points that define 3D vertices for the polyline object. The computer system may dynamically draw the planar polyline $P_P$ in the window $W_S$ in response to the user input. The computer system may draw the planar polyline so that it is superimposed on the image $I_S$ (e.g., as suggested in FIGS. 12 and 13).

At 1040, the computer system may render the polyline object $O_P$ with respect to the view $V_1$ to generate an update $I_1^*$ for the image $I_1$. In some embodiments, the computer system may render some or all of the graphical objects along with the polyline object.

At 1050, the computer system may display the image update $I_1^*$ in the window $W_1$, where the image update $I_1^*$ depicts at least a portion of the polyline object and at least a portion of the vertical section.

Figure 11:
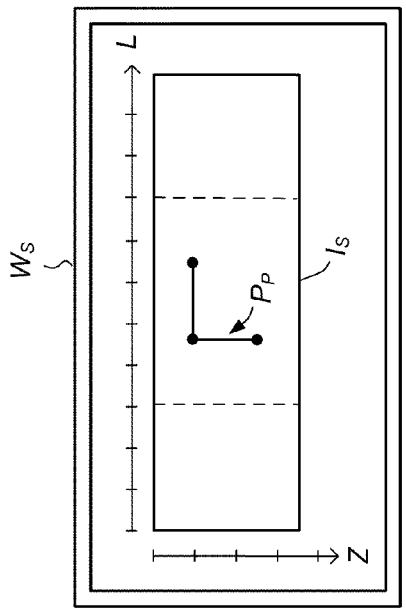
FIG. 11 illustrates an example of the method embodiment of FIG. 10.
Figure 11:
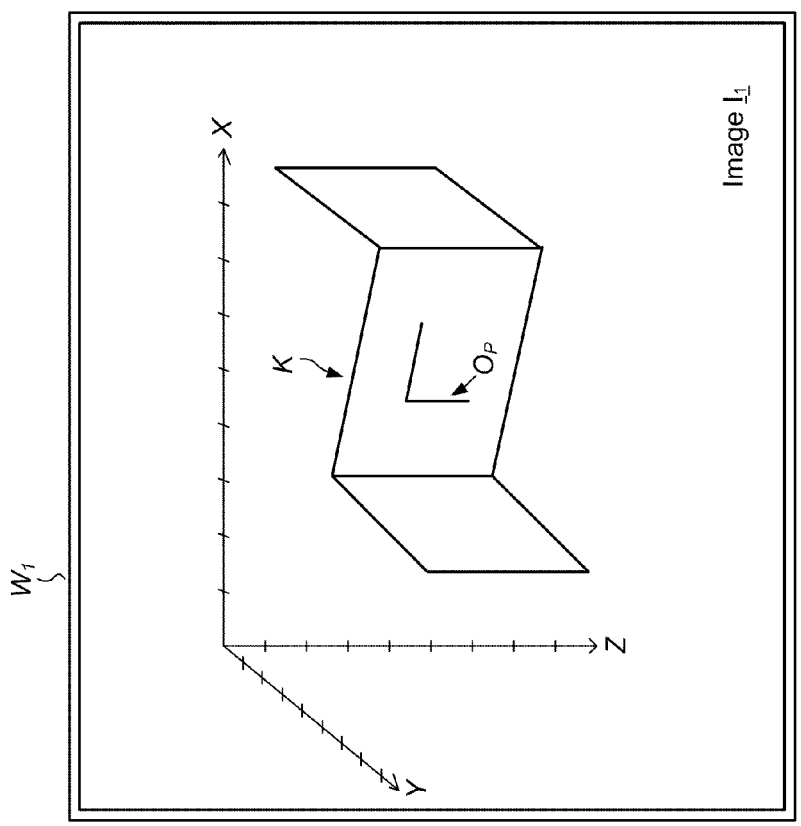

FIG. 11 illustrates an example of the method 1000 in action. The vertical section K resides in the 3D space. The vertical section is defined by a path (composed of three line segments) and an interval of the vertical coordinate. The image $I_S$ displayed in window $W_S$ depicts a flattened version of the vertical section. The user draws the planar polyline $P_P$ in the window $W_S$, e.g., by means of click-and-drag motions of the mouse. In response to the user's drawing inputs, the computer system generates the polyline object $O_P$ on the vertical section K in the 3D space. In particular, the user may draw on the image $I_S$. (While the vertical section shown in FIG. 11 has two folds, more generally, a vertical section may have any number of folds, including zero folds.)

As noted above, a vertical section is determined by a path in the horizontal plane and an interval of the vertical coordinate. The path and the interval may be specified by a user. For example, the user may specify the path by drawing the path in a window such as window $W_2$ of FIG. 2 (that corresponds to a top-down view of the 3D space). The user may specify the interval [a,b], e.g., by entering the vertical coordinate values a and b through a data entry dialog, or by clicking on two distinct points in a displayed representation of the vertical coordinate axis.

In some embodiments, the computer system allows the user to specify (or draw) a closed planar polyline in the window $W_S$. Thus, the polyline object generated in the 3D space will also be closed.

Figure 12:
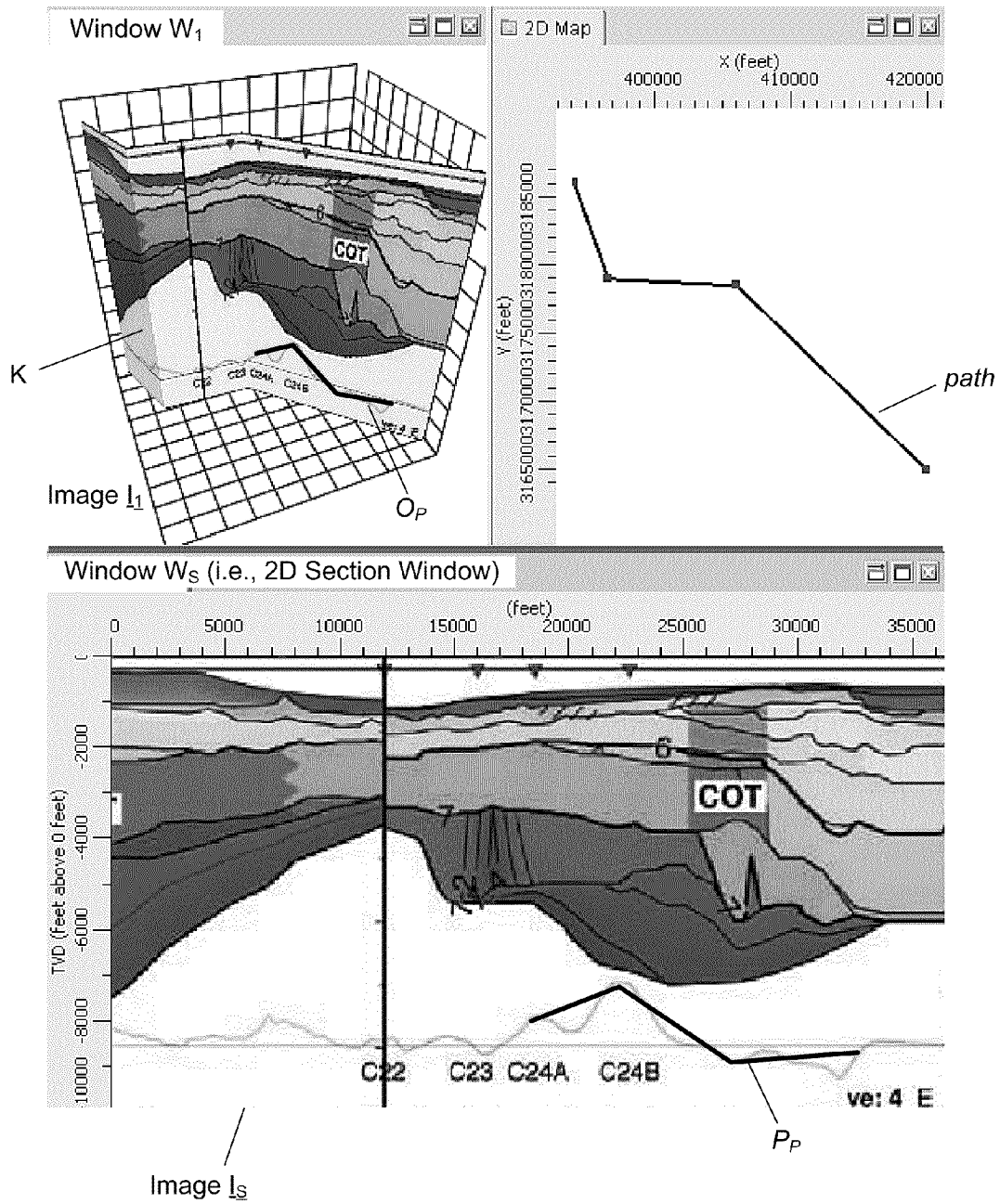
FIG. 12 illustrates a second example of the method embodiment of FIG. 10, where an image is painted on the surface of the vertical section.

FIG. 12 illustrates another example of the method 1000 in action. In this example, the vertical section K is shown as being covered with an image that depicts multiple geological layers. The computer system may be configured to receive user input that associates an image $I_K$ with the vertical section K, and to apply the image $I_K$ as a texture to the vertical section when rendering the vertical section. The image $I_S$ shown in the window $W_S$ may be based on the image $I_K$. FIG. 12 also shows a 2D map window that may be used to generate (or modify) the path associated with the vertical section K. Changes to the path may be dynamically reflected in changes to the state of the vertical section in the 3D space. For example, the user may provide user input to the 2D map window specifying: a translation (or rotation or scaling or reflection) of the path; an addition of a vertex to the path; a removal of a vertex from the path; or a translation of a vertex of the path.

It is noted that the planar polyline $P_P$ drawn in the window $W_S$ may traverse one or more fold lines corresponding to folds in the vertical section. In some embodiments, the computer system may be configured to inject an extra 2D vertex in the planar polyline at each such traversal. The extra vertices ensure that the polyline object $O_P$ derived from the planar polyline will conform to the vertical section, i.e., reside on the vertical section. For example, in FIG. 13, the planar polyline $P_P$ as specified by the user has three vertices. However, because the planar polyline crosses the fold line 1310, an extra 2D vertex $V_E$ may be added to the planar polyline at the point of intersection of the planar polyline and the fold line 1310. The extra vertex gets mapped onto the vertical section K along with the three user-specified vertices. The extra vertex ensures that the polyline object $O_P$ lives on the vertical section.

Figure 13A:
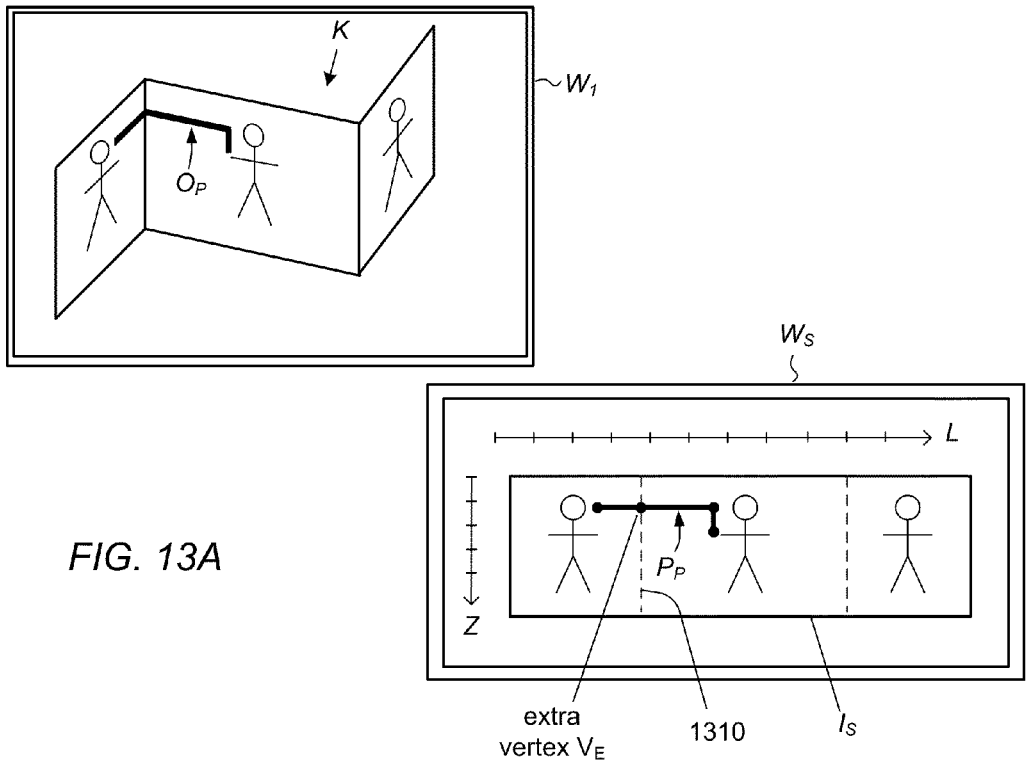
FIG. 13A illustrates an example of drawing a polyline on a vertical section, where an extra point is injected into the polyline so that the polyline will stick to (follow the folds of) the vertical section.

In FIG. 13A, the image $I_K$ that is painted onto the vertical section K comprises a simple configuration of three stick men. That simple image is used only for the sake of discussion and it not meant to be limiting. Any image may be used as the image $I_K$.

In some embodiments, the first graphical object K may include (or be associated with) an image $I_K$ in addition to the vertical section. The image $I_K$ may be applied as texture to the vertical section (e.g., as illustrated in FIG. 12). The image $I_K$ may be derived from an analysis of seismic data. The image $I_S$ displayed in the window $W_S$ may be determined based on the image $I_S$ or on data including the image $I_S$.

In some embodiments, a horizontal dimension of the window $W_S$ corresponds to arc length L along the path (i.e., the path that is used to define the vertical section), and a vertical dimension of the window $W_S$ corresponds to the vertical coordinate of the 3D space. See, e.g., FIG. 11. Thus, each point in the window $W_S$ corresponds to a unique point on the vertical section.

In some embodiments, the computer system may render one or more graphical objects including the first graphical object K with respect to a top-down view in the 3D space to obtain a map image, and display the map image in a 2D map window using the display system. The map image may depict at least a portion of the path (used to determine the vertical section K). See, e.g., the 2D map window in FIG. 12.

In some embodiments, method 1000 of FIG. 10 may also include: identifying one or more graphical objects as residing within a spatial neighborhood (e.g., a neighborhood of normal distance R) of the vertical section K; projecting the one or more graphical objects onto the vertical section in the 3D space to obtain one or more projected objects; and rendering the one or more projected objects into the window $W_S$. The one or more projected objects may be superimposed on the image $I_S$ in the window $W_S$. Thus, the user may view objects that are near a vertical section along with the vertical section itself.

In some embodiments, the method 1000 of FIG. 10 may further include: receiving user input specifying a modification to the planar polyline $P_P$ in the window $W_S$; updating the polyline object $O_P$ based on the modification to the planar polyline (or based on the user input); and rendering the updated polyline object to generate a second update $I_1^{}$ for the image $I_1$. The second update $I_1^{}$ may be displayed in the window $W_1$. The second update may depict at least a portion of the updated polyline object. The modification to the planar polyline may take any of a variety of forms. For example, the modification may include moving one of the 2D vertices (of the planar polyline) in the window $W_S$. As another example, the modification may include adding a new 2D vertex to (or deleting an existing 2D vertex from) the planar polyline in the window $W_S$. As yet another example, the modification may include translating (or scaling or rotating or reflecting) the planar polyline in the window $W_S$.

Figure 13B:
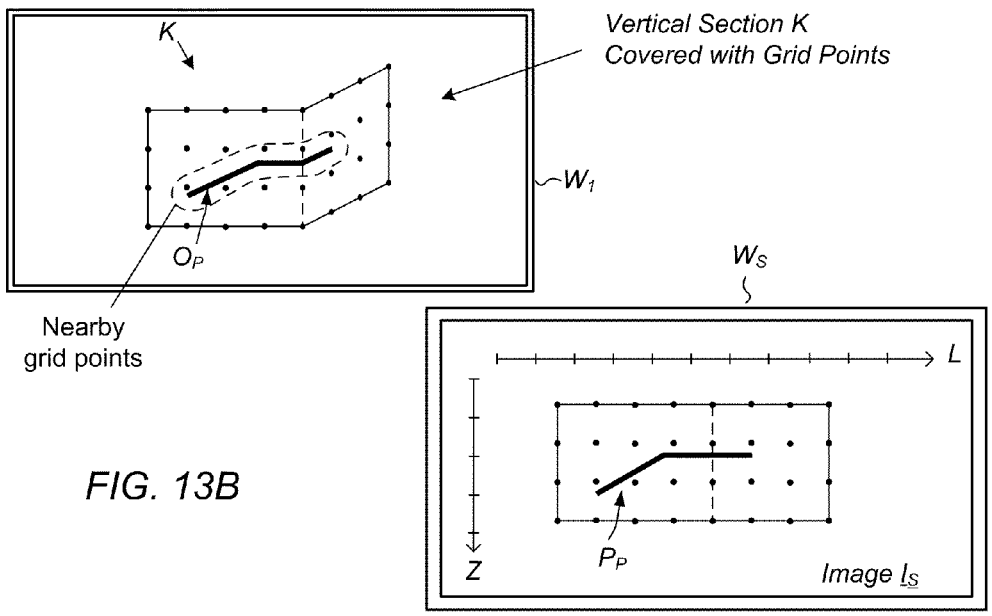
FIG. 13B illustrates one embodiment of a method for modifying attribute values of a gridded surface using a polyline that is constructed as described in FIG. 10.

In some embodiments, the vertical section K may include a set of grid points in the 3D space, where each of the grid points has an associated attribute value (or an associated set of attribute values). As described above, the method 1000 may be used to draw a polyline object $O_P$ on the vertical section, e.g., a polyline object that resides entirely on the vertical section. The polyline object $O_B$ may be used to change the attribute values of at least a subset of the grid points. Thus, the method 1000 of FIG. 10 may additionally include: receiving user input specifying an attribute value $V_E$ for the polyline object; identifying two or more of the grid points that are near the polyline object; changing the attribute value of each of the two or more grid points to be equal to the value $V_E$; and computing new attribute values for at least a subset of the set of grid points using the value $V_E$ at the two or more grid points as a first constraint. FIG. 13B illustrates an example of a polyline object $O_P$ being used to modify attribute values on a grid.

The action of computing new attribute values may use one or more additional constraints on the new attribute values, e.g., constraints along the boundary of the vertical section and/or along previously-defined polyline objects.

In some embodiments, the computer system allows the user to invoke the execution of a reservoir flow simulation based on the set of grid points and the new attribute values.

In some embodiments, the attribute value of each grid point represents a value of a spatial coordinate such as a normal displacement from the vertical section.

Generating a Polygonal Object by Specifying a Closed Polyline in a Window.

Figure 14:
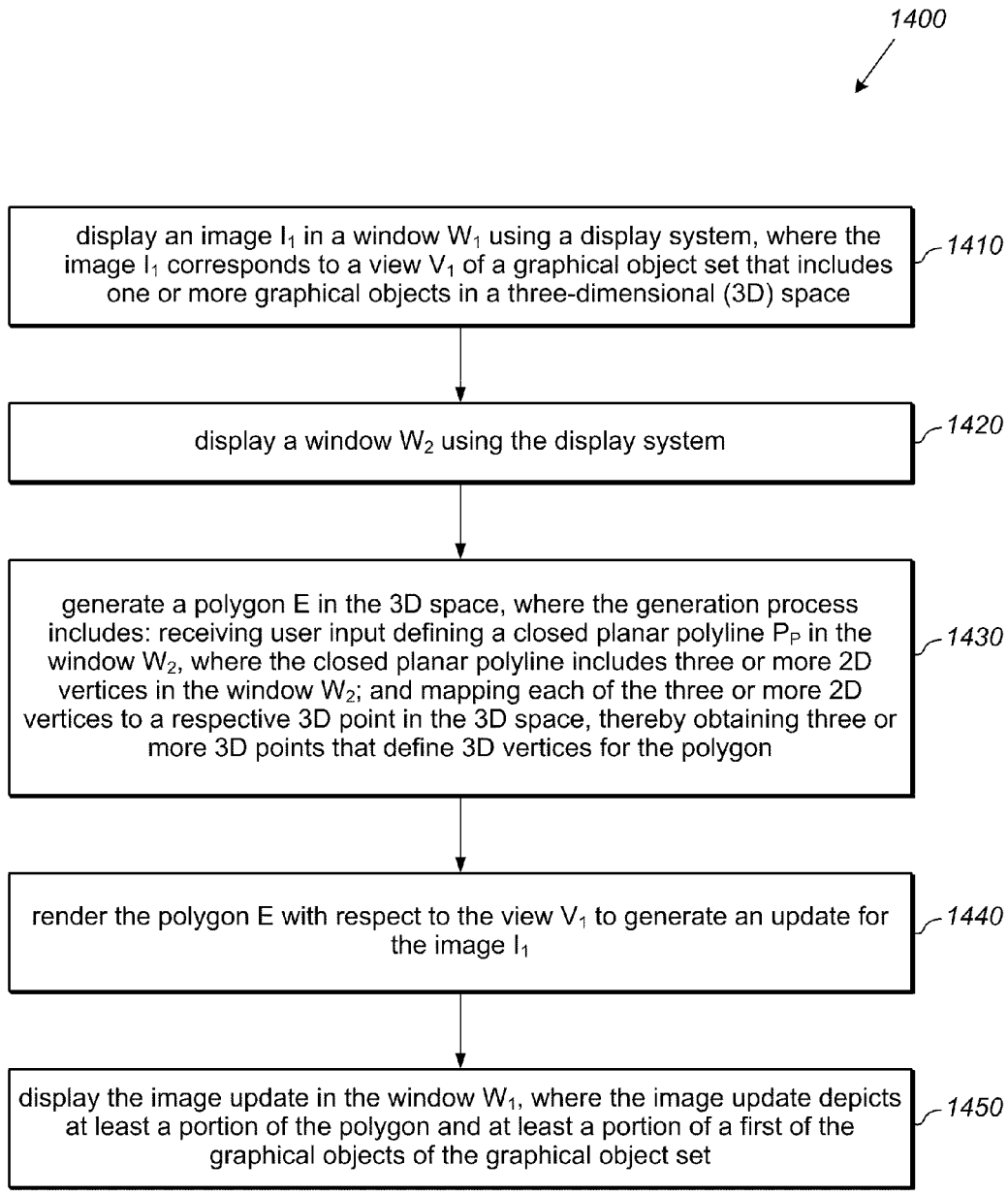
FIG. 14 illustrates one embodiment of a method for drawing a polyline in a 3D environment.

In one set of embodiments, a method 1400 for drawing a polygon in a 3D environment may involve the following operations, e.g., as shown in FIG. 14.

At 1410, a computer system may display an image $I_1$ in a window $W_1$ using a display system, where the image $I_1$ corresponds to a view $V_1$ of a graphical object set that includes one or more graphical objects in a three-dimensional (3D) space. Each of the one or more graphical objects may represent a corresponding sub-surface geological structure. A coordinate system of the 3D space may include a vertical coordinate, a first horizontal coordinate and a second horizontal coordinate.

At 1420, the computer system may display a window $W_2$ using the display system.

At 1430, the computer system may generate a polygon E in the 3D space, where the generation process includes: receiving user input defining a closed planar polyline $P_P$ in the window $W_2$, where the closed planar polyline includes three or more 2D vertices in the window $W_2$; and mapping each of the three or more 2D vertices to a respective 3D point in the 3D space, thereby obtaining three or more 3D points that define 3D vertices for the polygon. The polygon E may have any desired number of sides.

At 1440, the computer system may render the polygon E with respect to the view $V_1$ to generate an update for the image $I_1$. In one embodiment, the computer system may render one or more objects of the graphical object set in addition to the polygon E.

At 1450, the computer system may display the image update in the window $W_1$, where the image update depicts at least a portion of the polygon and at least a portion of one of the graphical objects of the graphical object set.

Second Window Representing a 2D Map View.

In some embodiments, the action 1420 of displaying the window $W_2$ may include displaying an image $I_2$ in the window $W_2$, where the image $I_2$ corresponds to a second view $V_2$ of the graphical object set as seen from above in the 3D space. Furthermore, the action of mapping each of the 2D vertices to a respective 3D point in the 3D space may include: computing a 2D point based on the 2D vertex, where the 2D point includes a value for the first horizontal coordinate and a value for the second horizontal coordinate; and assigning a value for the vertical coordinate to the 2D point to obtain the 3D point.

In some embodiments, the method 1400 of FIG. 14 may further include: rendering the polygon E with respect to the second view $V_2$ to generate an update for the image $I_2$; and displaying the image update $I_2^*$ in the window $W_2$.

Figure 15A:
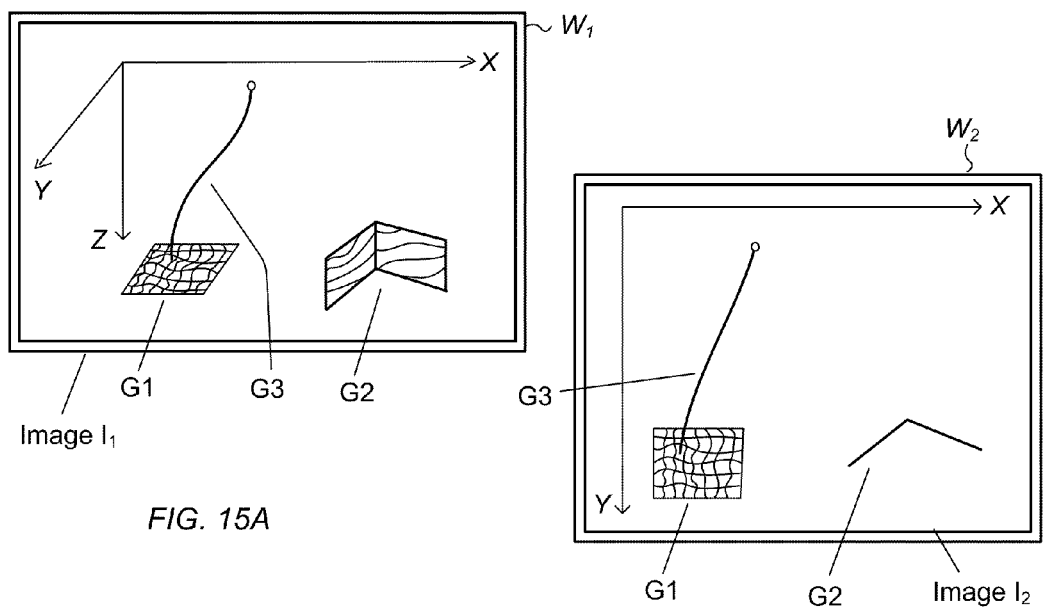
FIG. 15A illustrates a set of graphical objects in the 3D space being displayed in a 3D view and top-down view.
Figure 15B:
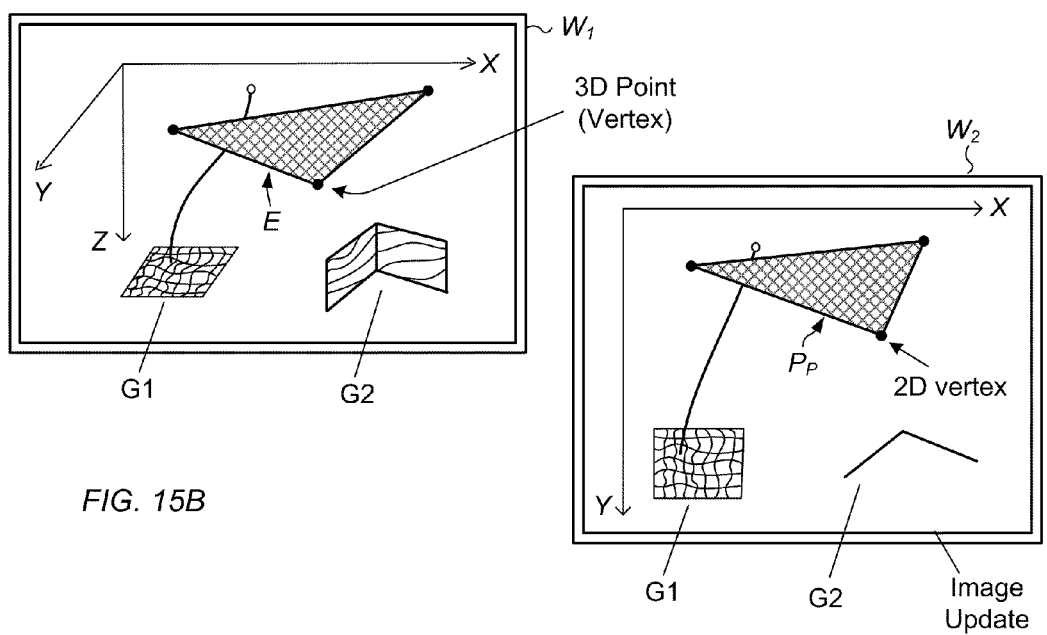
FIG. 15B illustrates updates for the views shown in FIG. 15A, after a user-specified polygon has been drawn in the 3D space.

FIG. 15A shows a graphical object set including a surface object G1, a vertical section G2 and a well bore G3. Window $W_1$ shows the graphical objects in a 3D context. Image $I_2$ in window $W_2$ depicts the graphical objects as seen from above. The user draws the closed planar polyline $P_P$ in the window $W_2$, e.g., by a succession of click-and-drag motions of the mouse. As described above, the computer system maps the 2D vertices of the closed planar polyline to 3D vertices in the 3D space. Those 3D vertices are used to generate the polygon E. FIG. 15B shows the windows $W_1$ and $W_2$ after the closed planar polyline $P_P$ and the polygon E have been generated.

Figure 16:
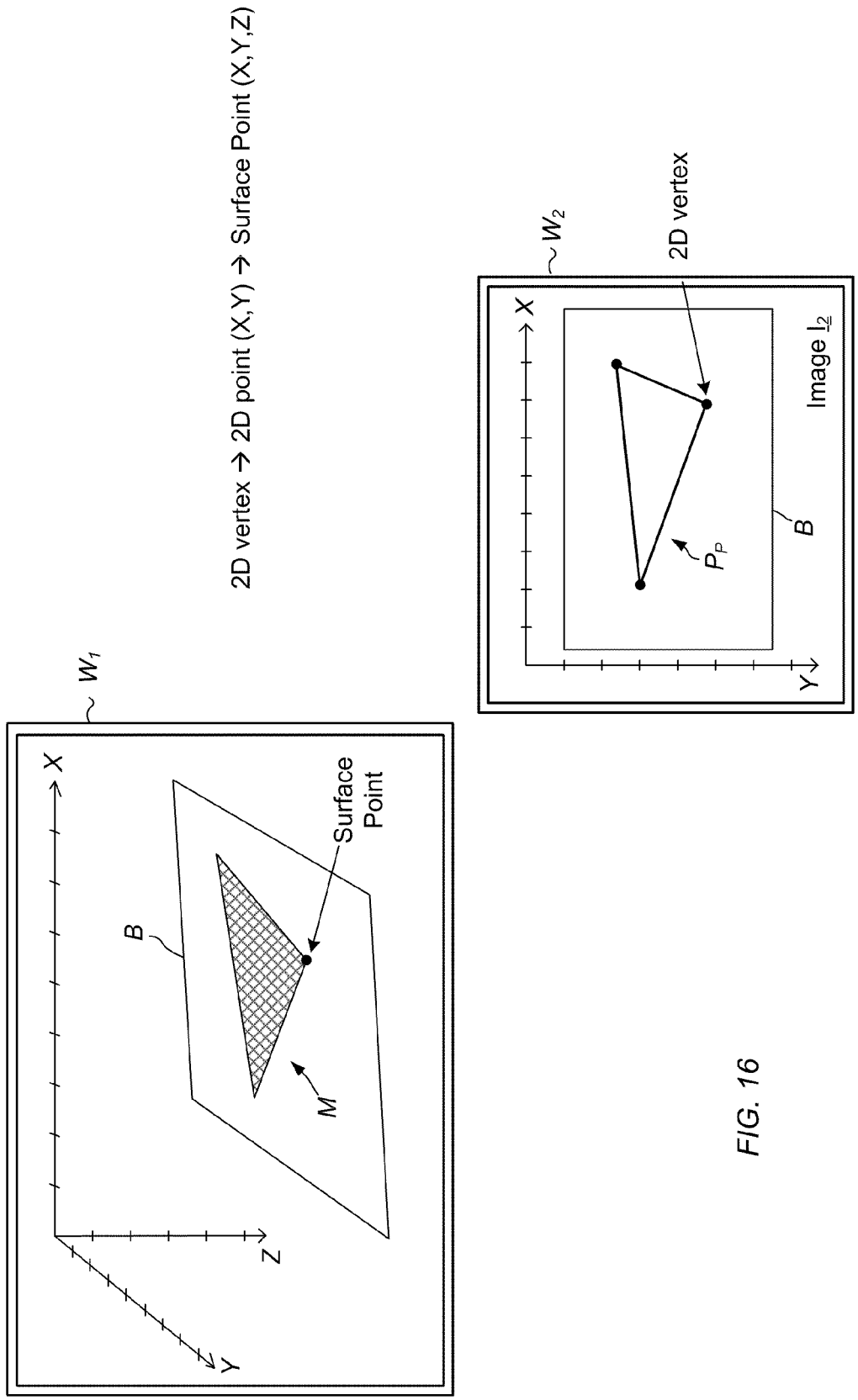
FIG. 16 illustrates one embodiment of a method for mapping vertices of a planar polygon onto the surface of an existing graphical object in the 3D space.

In some embodiments, the action of assigning a vertical coordinate value to a 2D point (derived from a 2D vertex) includes: vertically projecting the 2D point to determine a surface point on a surface of a graphical object; and assigning the vertical coordinate value of the surface point to the 2D point to obtain the 3D point. FIG. 16 shows an example of this scheme of assignment for a graphical surface object B. Because the window $W_2$ is configured in top-down map mode, the user can see a top-down view of the surface object B (and any other objects that happen to be within view), and thus, can draw the closed planar polyline on the surface object B as desired.

In some embodiments, the action of assigning vertical coordinate values to the 2D points (derived from the 2D vertices of the closed planar polyline) may include assigning the same user-specified vertical coordinate value to all of the three or more 2D points so that the generated polygon E will reside in a horizontal plane corresponding to the user-specified vertical coordinate value. If any graphical object happens intersect that horizontal plane, it is possible for the polygon E to interpenetrate the graphical object.

Second Window Representing a Horizontal Planar Slice.

In some embodiments, the action of displaying the window $W_2$ may include displaying an image $I_{CS}$ in the window $W_2$, where the image $I_{CS}$ represents a horizontal planar slice of the 3D space corresponding to a horizontal plane at a given value of the vertical coordinate. In that case, the above-described mapping operation will map the 2D vertices of the closed planar polyline onto the horizontal plane. Thus, the 3D points obtained by the mapping action reside in the horizontal plane.

In some embodiments, the computer system may receive user input selecting a texture pattern from a set of supported texture patterns, where the set of supported texture patterns includes texture patterns that represent a number of different rock types. The action 1440 of rendering the polygon E may include applying the selected texture pattern to the polygon.

In some embodiments, the computer system may receive user input selecting a color from a set of supported colors. The action 1440 of rendering the polygon may include applying the selected color to the polygon E.

In some embodiments, the polygon is rendered with a user-specified graphical property such as opacity, luminosity, reflectivity, surface roughness, etc.

In some embodiments, the computer system may maintain a list of fill patterns that have been previously selected by a user, where each of the fill patterns includes a texture pattern and/or a color. The computer system may display a window $W_P$ that graphically depicts the fill patterns in the list, or at least a subset of the fill patterns in the list. The list may be scrollable. The computer system may receive user input selecting one of the fill patterns that are displayed in the window $W_P$. The action 1440 of rendering the polygon may include applying the selected fill pattern to the polygon.

In one embodiment, the computer system may: estimate a surface integral of a user-selected function over the polygon surface in the 3D space; and display the estimate via the display system. Any of a variety of known numerical methods may be employed for estimating the surface integral. The surface integral value may be superimposed on the polygon E, for easy viewing.

In one embodiment, the computer system may estimate an area of the polygon E in the 3D space; and display an indication of the estimated area using the display system. For example, the area value may be superimposed on the polygon E.

In some embodiments, a graphical object may include a mesh that covers (or defines) a surface in the 3D space. For example, the graphical object may be a layer in a multi-layer geological reservoir model. The method 1400 described above may be used to generate a polygon E whose 3D vertices reside on the surface. Given such a polygon, the computer system may receive user input indicating that the polyline boundary of the polygon represents a boundary (e.g., an unconformity) between a first facies and a second facies. In one embodiment, the user may select the first and second facies from a set of supported facies. Alternatively, the user may define the first and second facies by specifying their respective properties.

The computer system may generate a new mesh for the surface, where the new mesh includes a first submesh and a second submesh that interface along the polygon boundary. The first submesh is the portion of the new mesh that is exterior to the polygon, and the second submesh is the portion of the new mesh that is interior to the polygon. The first submesh (or at least a portion of the first submesh along the polygon boundary) may be assigned to the first facies; and the second submesh may be assigned to the second facies. In other words, the first submesh may be assigned properties consistent with the first facies, while the second submesh may be assigned properties consistent with the second facies. For example, grid points in the first submesh may be assigned property values consistent with the first facies, and grid points in the second submesh may be assigned property values consistent with the second facies. Thus, there may be an abrupt discontinuity in one or more properties/attributes across the polygon boundary.

FIG. 17A illustrates a polygon E that has been generated on a surface that is covered with a mesh in the 3D space. The polygon E is generated in response to user input specifying the closed planar polyline $P_P$ in the window $W_2$. FIG. 17B illustrates the new mesh that is generated for the surface based on the polygon. In the illustrated example, the new mesh is generated from the existing mesh by adding points along the boundary of the polygon and by adding a number of new edges. However, other methods for generating the new mesh may be used. The first submesh corresponds to the area cells of the new mesh that are outside the polygon. The second submesh corresponds to the area cells of the new mesh that are inside of the polygon.

In some embodiments, the computer system may be configured to execute a reservoir flow simulation based on the new mesh and the property values that have been assigned to the points of the new mesh. The execution may be invoked in response to user input.

Generating a Polygon Using a 2D Section View.

Figure 18:
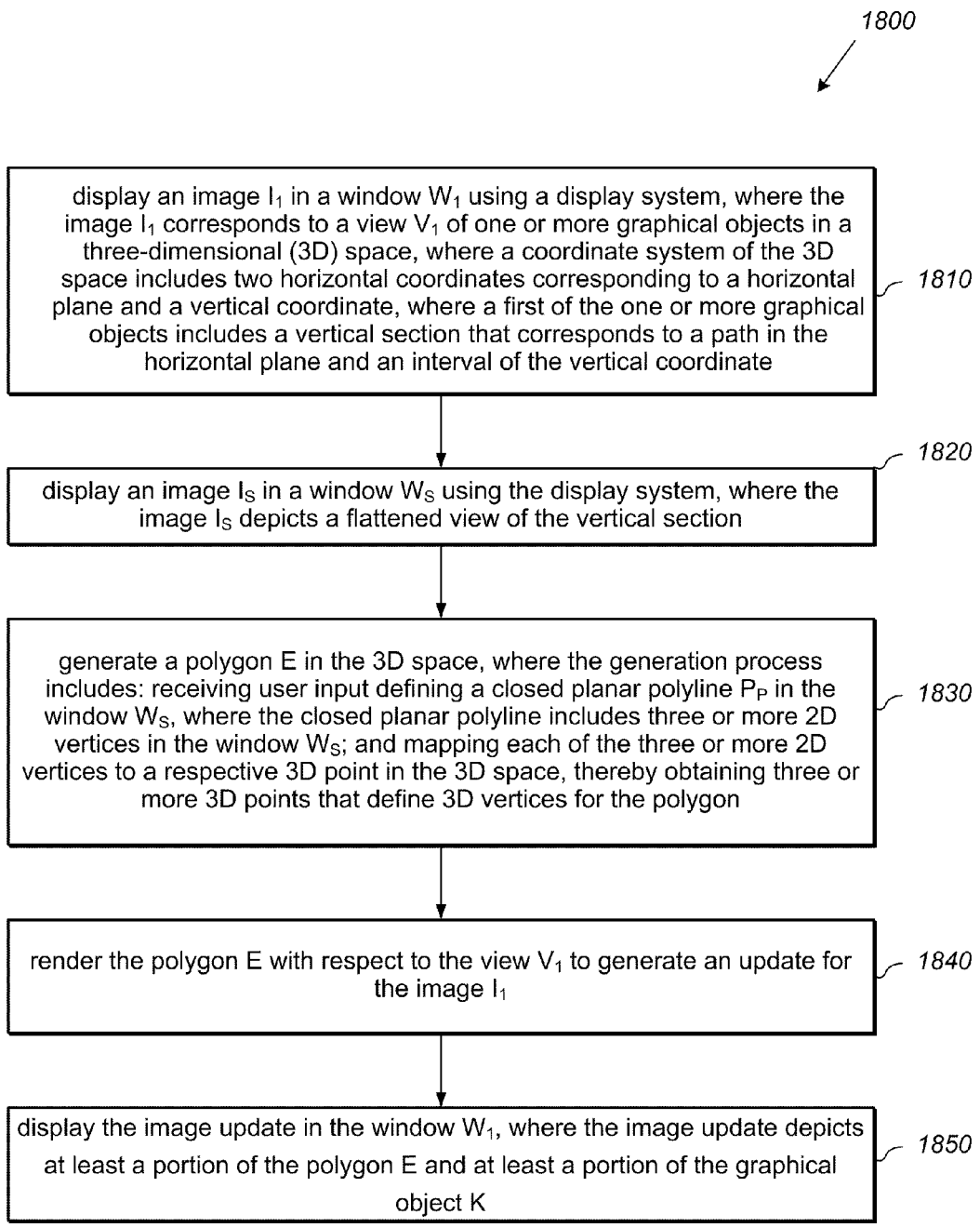
FIG. 18 illustrates one embodiment of a method for drawing a polygon on a vertical section in a 3D environment.

In one set of embodiments, a method for drawing a polygon in the 3D environment may involve the following actions, e.g., as illustrated in FIG. 18.

At 1810, a computer system may display an image $I_1$ in a window $W_1$ using a display system, where the image $I_1$ corresponds to a view $V_1$ of one or more graphical objects in a three-dimensional (3D) space. The one or more graphical objects may represent sub-surface geological structures. A coordinate system of the 3D space may include: two horizontal coordinates corresponding to a horizontal plane, and a vertical coordinate. A graphical object K of the one or more graphical objects includes a vertical section that corresponds to a path $P_K$ in the horizontal plane and an interval of the vertical coordinate.

At 1820, the computer system may display an image $I_S$ in a window $W_S$ using the display system, where the image $I_S$ depicts a flattened view of the vertical section. The horizontal dimension of the image $I_S$ may correspond to arc length along path $P_K$. The vertical dimension of the image $I_S$ may correspond to the vertical coordinate.

At 1830, the computer system may generate a polygon E in the 3D space in response to user input, where the generation process includes: receiving user input defining a closed planar polyline $P_P$ in the window $W_S$, where the closed planar polyline includes three or more 2D vertices in the window $W_S$; and mapping each of the three or more 2D vertices to a respective 3D point in the 3D space, thereby obtaining three or more 3D points that define 3D vertices for the polygon.

At 1840, the computer system may render the polygon E with respect to the view $V_1$ to generate an update for the image $I_1$. The action of rendering the polygon E may involve breaking the polygon E into a set of triangles and then rendering the set of triangles.

At 1850, the computer system may display the image update in the window $W_1$, where the image update depicts at least a portion of the polygon and at least a portion of the graphical object K.

In some embodiments, the graphical object K may also include an image $I_K$ that is applied as a texture to the vertical section. The polygon E may represent a user's interpretation of a feature in the image $I_K$. The image $I_K$ may represent/depict the geological structure of the vertical section. In one embodiment, the image $I_K$ may be derived from an analysis of seismic data (e.g., 2D seismic data gathered along a surface track corresponding to the path $P_K$). The image $I_S$ displayed in the window $W_S$ may be derived from (or at least partially derived from) the image $I_S$.

Figure 19:
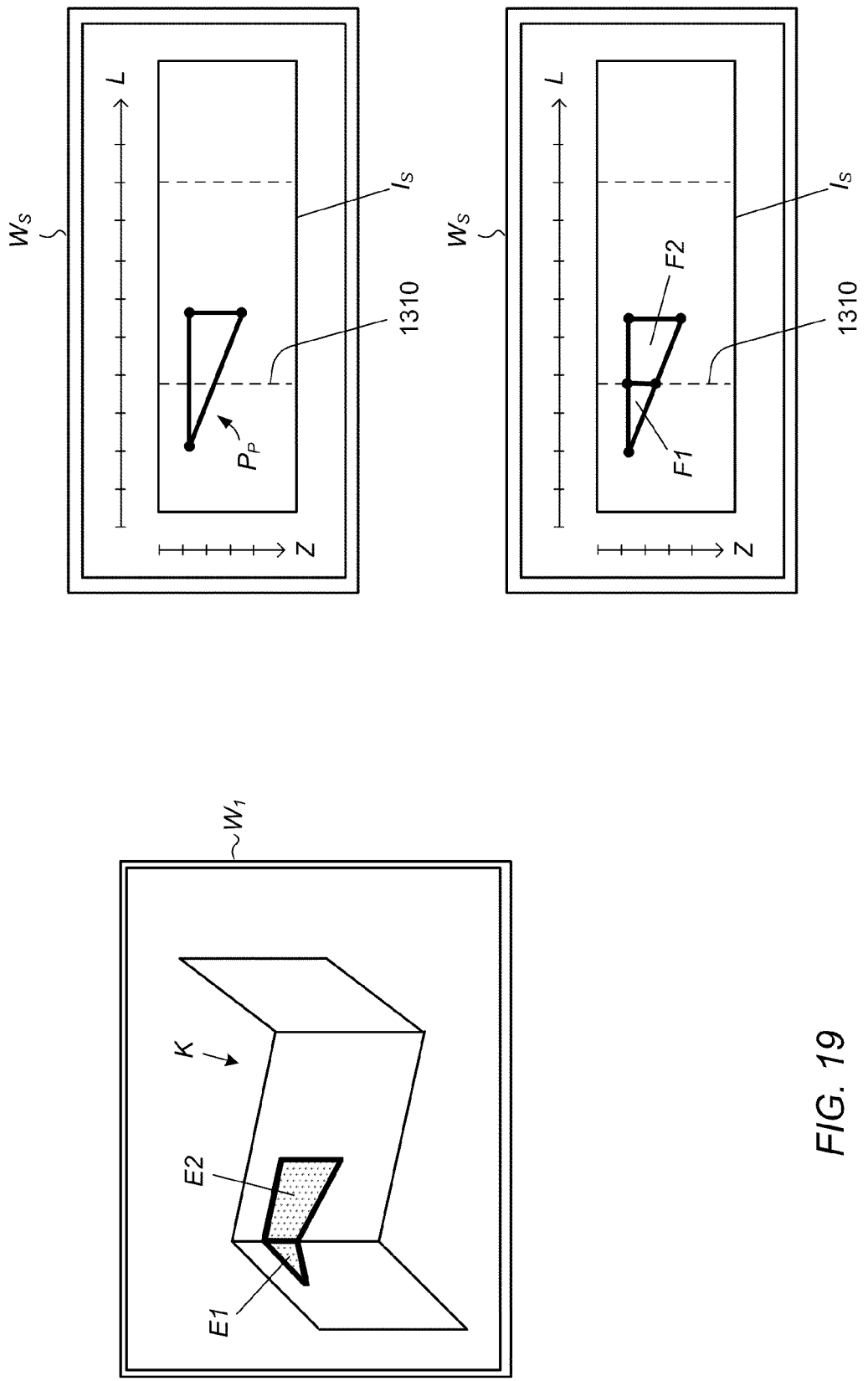
FIG. 19 illustrates one embodiment of a method for operating on a user-specified polygon so that it maps entirely onto the vertical section.

In some embodiments, if an edge of the closed planar polyline $P_P$ traverses one or more fold lines of the vertical section K, the computer system may fragment (i.e., break) the planar polygon $T_P$ defined by the closed planar polyline into a number of polygonal fragments $F_i$ along the fold lines, where each of the polygonal fragments resides in one of the flat panels of the vertical section. In other words, none of the polygonal fragments traverses a fold line. Each of the polygonal fragments may be mapped onto the vertical section K to generate corresponding polygonal fragments $E_i$ in the 3D space. Thus, the union of the polygonal fragments $E_i$ forms a surface in the 3D space that conforms to (lives on) the vertical section K. An example of this fragmentation and mapping process is shown FIG. 19. Two versions of window $W_S$ are shown. The upper version shows the closed planar polyline $P_P$ specified by the user. The lower version shows the polygonal fragments F1 and F2 generated by the computer system based on the closed planar polyline $P_P$. (In some embodiments, the computer system may fragment the polygon $T_P$ into triangles, since triangles are the common currency of many graphics APIs.) The computer system may then map the polygonal fragments F1 and F2 onto the vertical section K to generate polygonal fragments E1 and E2 on the vertical section in the 3D space.

In some embodiments, the computer system may dynamically draw the planar polyline $P_P$ in the window $W_S$ as the user provides drawing inputs to the window $W_S$. The planar polyline may be drawn in the window $W_S$ so that the planar polyline is superimposed on the image $I_S$ (i.e., the image that shows the flattened view of the vertical section).

Figure 20:
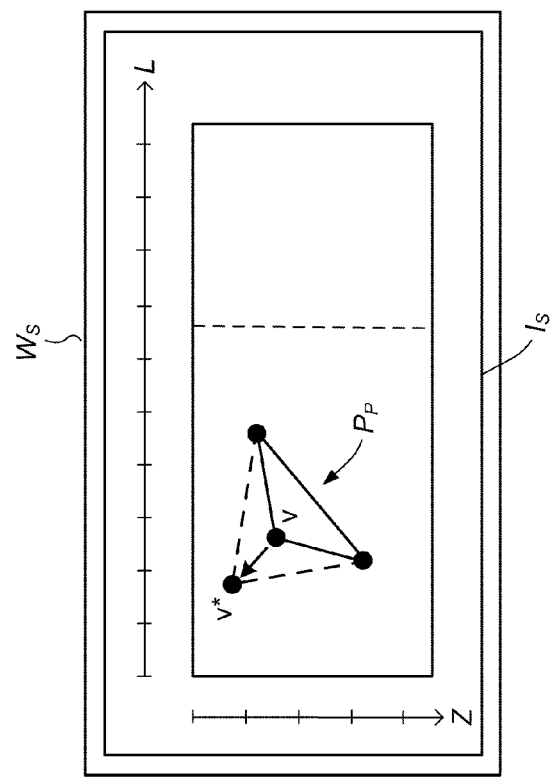
FIG. 20 illustrates one example of a modification made to a polygon on a vertical section.
Figure 20:
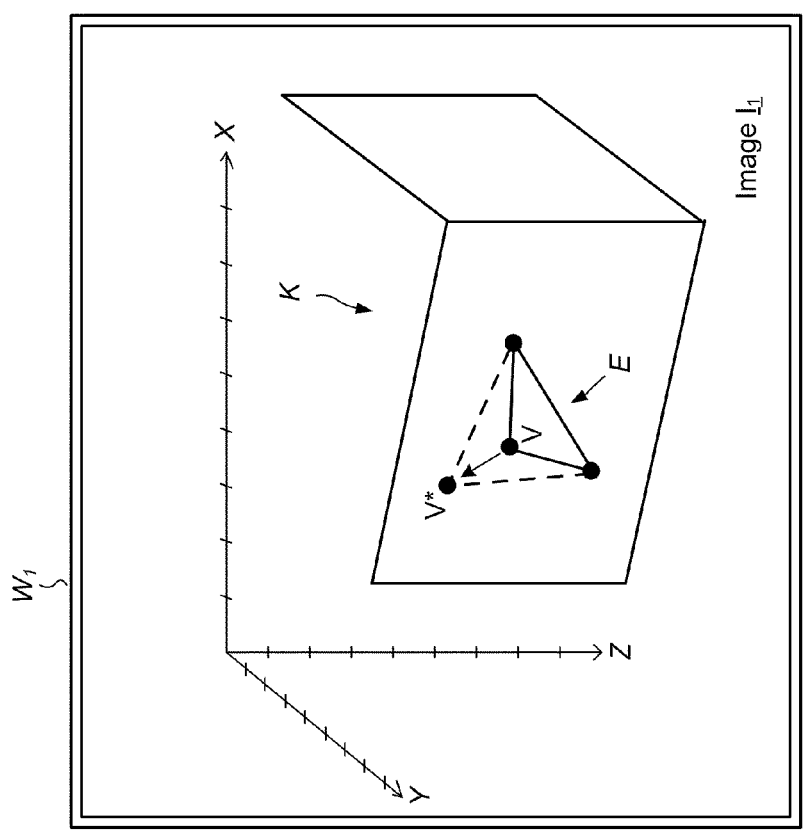

In some embodiments, method 1800 of FIG. 18 may also include: receiving user input specifying a modification to the closed planar polyline in the window $W_S$; updating the polygon E based on the modification to the closed planar polyline $P_P$; and rendering the updated polygon with respect to the view $V_1$ to generate a second update for the image $I_1$. The second update depicts at least a portion of the updated polygon. The computer system may display the second update in the window $W_1$. The modification to the closed planar polyline may take a number of different forms. For example, the modification may be a movement of one of the 2D vertices (of the closed planar polyline) in the window $W_S$. FIG. 20 illustrates such a movement. As the user moves the vertex v of the closed planar polyline in the window $W_S$, the computer system moves the vertex V of the polygon E on the vertical section K. The updated states of v and V are denoted by v* and V* respectively. As another example, the modification may include an addition of a new 2D vertex to (or a deletion of an existing 2D vertex from) the closed planar polyline in the window $W_S$. As yet another example, the modification may include a translation (or rotation or scaling or reflection) of the closed planar polyline in the window $W_S$.

In some embodiments, the graphical object K may include a mesh (e.g., a polygonal mesh) that covers the vertical section in the 3D space, e.g., as suggested in FIG. 21A. In that case, the polygon E generated on the vertical section as described above may be used to create an interface (i.e., boundary) between two facies on the vertical section. In particular, the computer system may receive user input indicating that a boundary of the polygon represents an unconformity between a first facies and a second facies. The computer system may then generate a new mesh for the vertical section, where the new mesh includes a first submesh and a second submesh that interface along the polygon boundary, e.g., as suggested in FIG. 21B. The first submesh corresponds to the exterior of the polygon, and the second submesh corresponds to the interior of the polygon.

The first submesh may be assigned properties consistent with the first facies, while the second submesh may be assigned properties consistent with the second facies. For example, grid points in the first submesh mesh may be assigned property values consistent with the first facies, and grid points in the second submesh may be assigned property values consistent with the second facies.

In some embodiments, the computer system may be configured to execute a reservoir flow simulation based on the new mesh and the assigned property values. The execution may be invoked in response to user input.

Specifying a GeoBody by Specifying Successive Polylines in a 2D Window.

Figure 22:
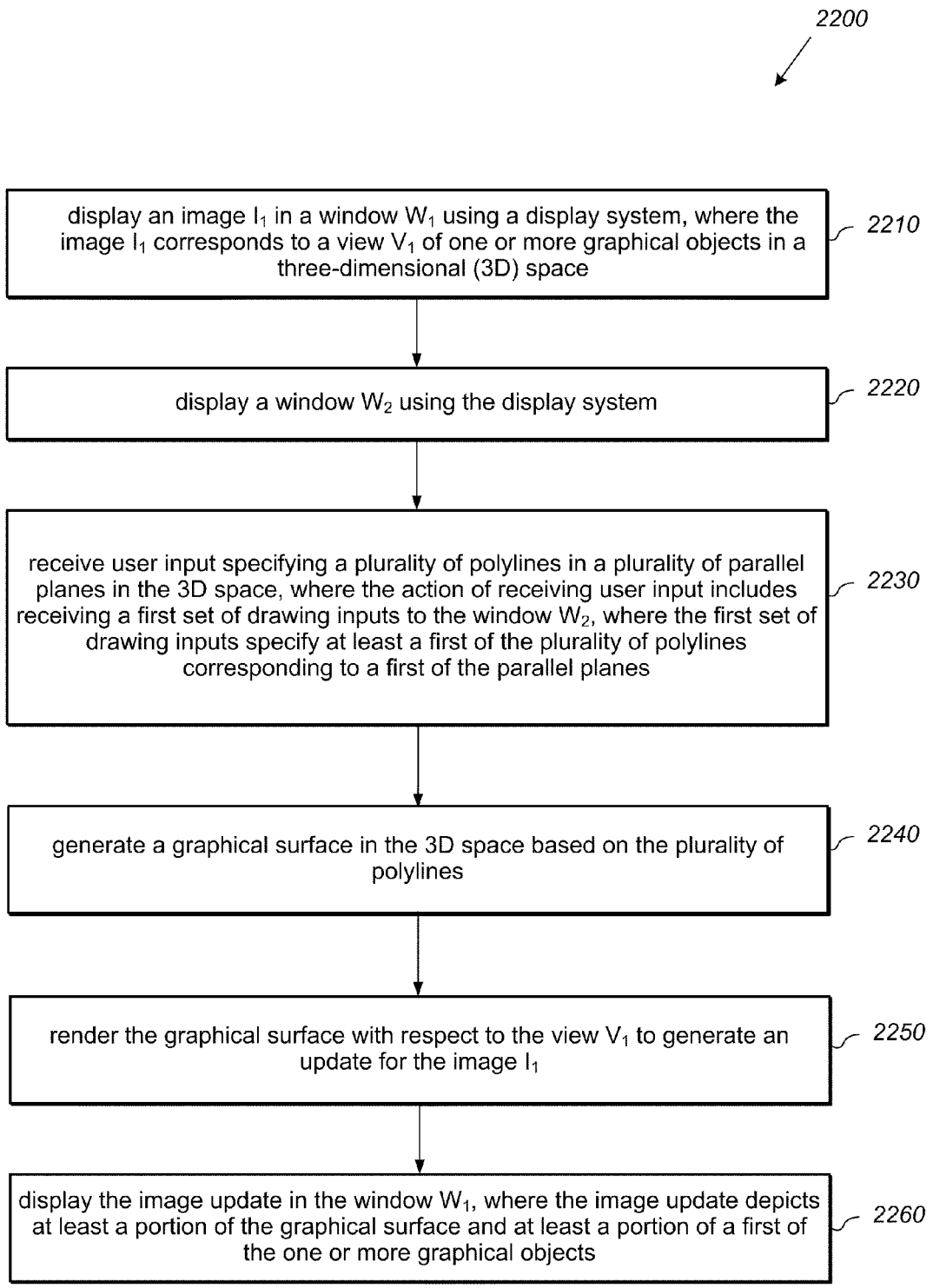
FIG. 22 illustrates one embodiment of a method for drawing a surface in a 3D environment.

In one set of embodiments, a method 2200 for drawing a surface in the 3D environment may involve the following operations, e.g., as suggested in FIG. 22.

At 2210, a computer system may display an image $I_1$ in a window $W_1$ using a display system, where the image $I_1$ corresponds to a view $V_1$ of one or more graphical objects in a three-dimensional (3D) space. Each of the one or more graphical objects may represent a corresponding sub-surface geological structure.

At 2220, the computer system may display a window $W_2$ using the display system.

At 2230, the computer system may receive user input specifying a plurality of polylines in a plurality of parallel planes in the 3D space, where the action of receiving user input includes receiving a first set of drawing inputs to the window $W_2$, where the first set of drawing inputs specify at least a first of the plurality of polylines corresponding to a first of the parallel planes. The polylines may be open or closed polylines.

At 2240, the computer system may generate a graphical surface in the 3D space based on the plurality of polylines.

At 2250, the computer system may render the graphical surface with respect to the view $V_1$ to generate an update for the image $I_1$.

At 2260, the computer system may display the image update in the window $W_1$ using the display system, where the image update depicts at least a portion of the graphical surface and at least a portion of one of the graphical objects.

In some embodiments, a coordinate system of the 3D space may include a vertical coordinate, a first horizontal coordinate and a second horizontal coordinate. In one embodiment, the above-mentioned parallel planes are horizontal planes corresponding to user-specified values of the vertical coordinate.

In some embodiments, the action 2230 of receiving user input may include receiving a second set of drawing inputs to the window $W_2$, where the second set of drawing inputs specifies a second of the plurality of polylines corresponding to a second of the parallel planes.

Figure 23:
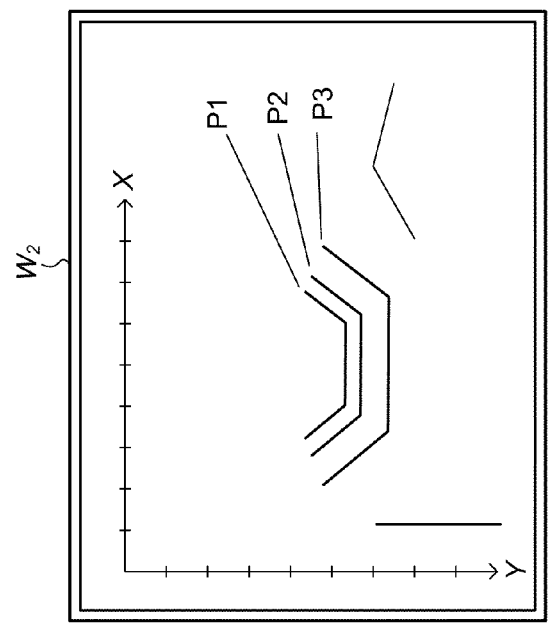
FIG. 23 illustrates an example of the method embodiment shown in FIG. 22.
Figure 23:
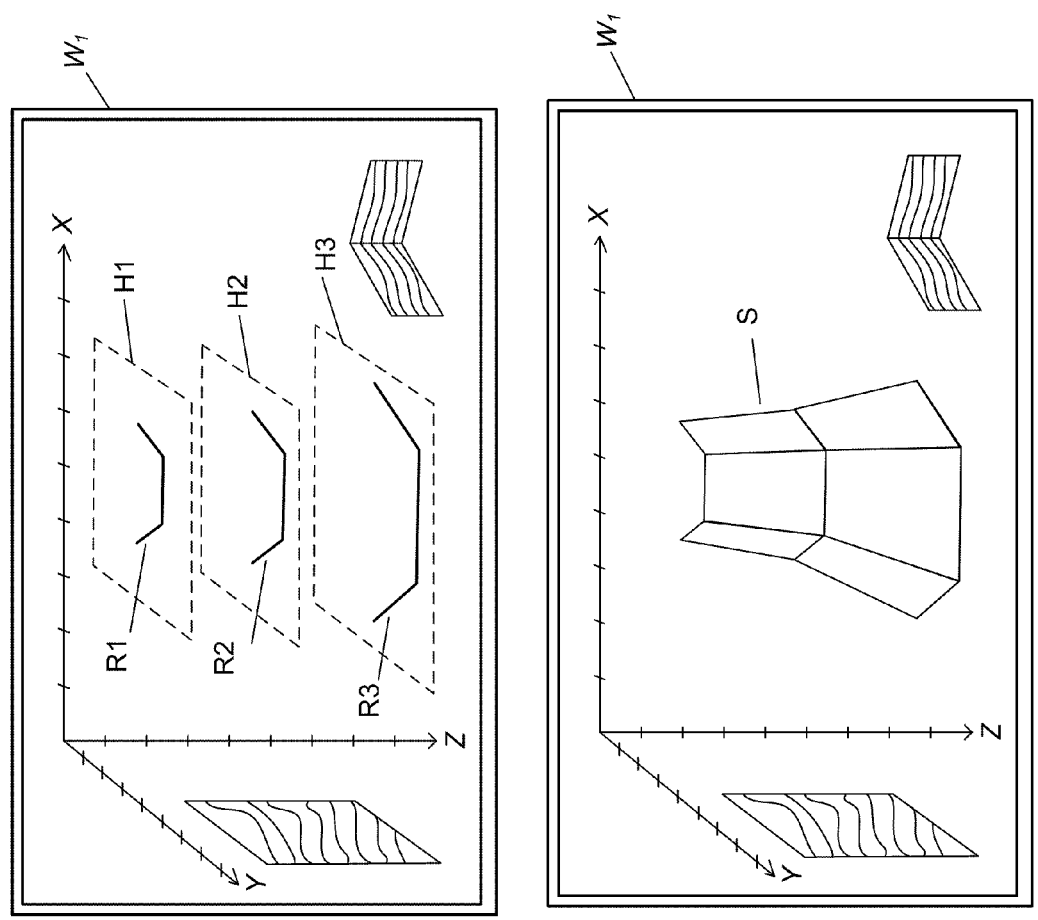

FIG. 23 illustrates an example of method 2200 in action, where the parallel planes are horizontal planes. The user provides inputs specifying the polylines R1, R2 and R3 in horizontal planes H1, H2 and H3, respectively. For example, the user may specify or select the vertical coordinate value of the first horizontal plane H1 and provide drawing inputs in the window $W_2$ that specify a planar polyline P1. The computer system maps the planar polyline P1 onto the horizontal plane H1 in the 3D space to determine the polyline R1, as illustrated by the first state of window $W_1$ at the upper left of FIG. 23. The polylines R2 and R3 may be similarly specified in horizontal planes H2 and H3, respectively. Window $W_2$ is shown after the user has drawn all three polylines P1, P2 and P3. (The horizontal planes H1, H2 and H3 are shown in the figure for the sake of the reader. However, they are not necessarily displayed in any of the windows.)

The computer system generates a graphical surface S based on the polylines R1, R2 and R3, as shown in the second state of window $W_2$ at the lower left of FIG. 23. The graphical surface S may be a polygonal mesh. In one embodiment, the polygonal mesh may be composed of triangles. The polylines R1, R2 and R3 may serve as ribs of the graphical surface S. Thus, the computer system may generate the graphical surface S by connecting the polyline ribs with mesh cells (e.g., polygons).

While the user may specify each of the plurality of polylines by drawing in window $W_2$, there are other methods for specifying the polylines. For example, the user may draw a first polyline in a first horizontal plane, copy the first polyline, paste the first polyline into a second horizontal plane, and modify the pasted polyline to achieve the desired polyline configuration in the second horizontal plane, and so forth in the remaining horizontal planes. Thus, the user need not separately draw each of the polylines, especially when they are similar in form.

Figure 24:
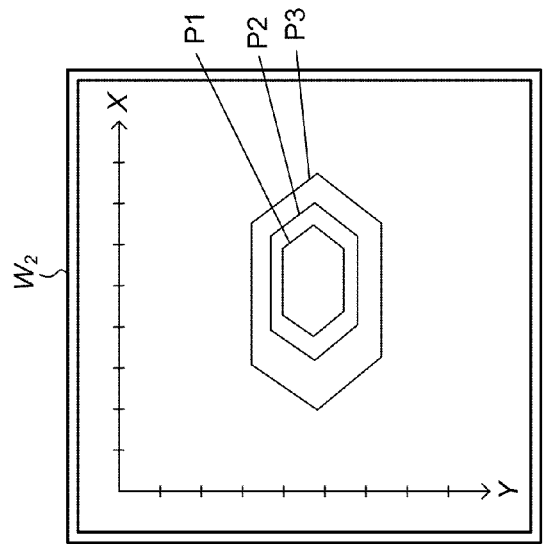
FIG. 24 illustrates a second example of the method embodiment shown in FIG. 22, where the polylines specified by the user are closed polylines.
Figure 24:
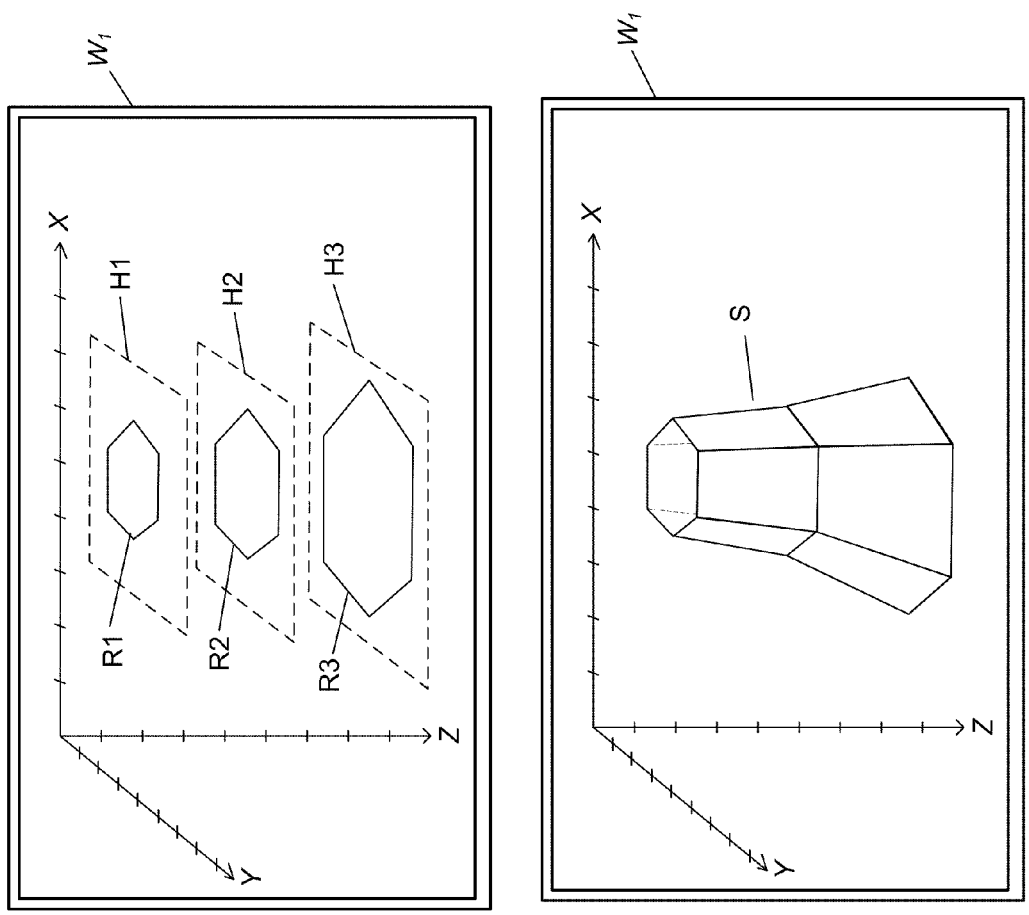
Figure 25:
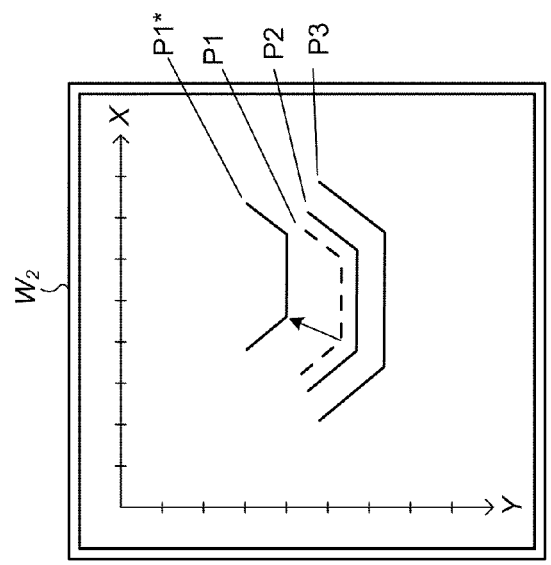
FIG. 25 illustrates an example of a modification to a graphical surface, where one of the polyline ribs of the surface is translated in response to user input through the window $W_2$.
Figure 25:
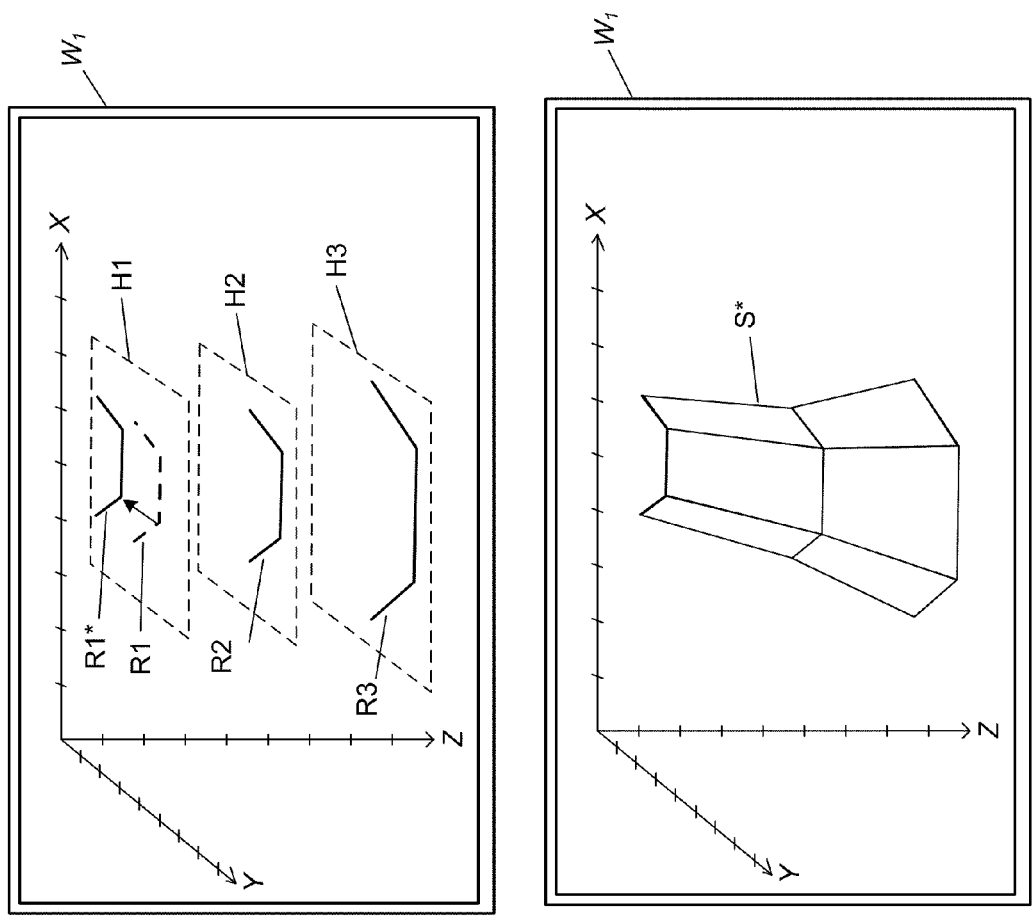

FIG. 24 shows another example of the method 2200 in action. In this example, the polylines R1, R2 and R3 specified by the user are closed polylines. Thus, the graphical surface S generated by the computer system has a cylindrical topology. In one alternative embodiment, the computer system allows the user to elect whether or not to close the ends of the topological cylinder to form a closed surface.

While FIGS. 23 and 24 show the polylines being specified in a set of horizontal planes, in some embodiments, the computer system may allow the user to specify polylines in any set of parallel planes. For example, in one embodiment, the computer system allows the user to specify an arbitrary viewing direction in the 3D space and to specify polylines in planes perpendicular to that viewing direction.

In some embodiments, the action 2220 of displaying the window $W_2$ may include displaying an image $I_2$ in the window $W_2$, where the image $I_2$ corresponds to a view $V_2$ of the one or more graphical objects as seen from above in the 3D space. Thus, the image $I_2$ provides a map view of any graphical objects that happen to reside within the frustum of the view $V_2$. After the computer system generates the graphical surface S as described above, the computer system may render the graphical surface with respect to the view $V_2$ to generate an update for the image $I_2$; and display the update in the window $W_2$. Thus, the user will be able to see (or, at least partially see) the graphical surface S from above.

In one embodiment, the method 2200 may also include estimating a surface integral of a function (e.g., a user-specified function) over the graphical surface.

In one embodiment, the method 2200 may also include receiving user input specifying a fill pattern for the graphical surface S, where the action 2250 of rendering the graphical surface includes applying the fill pattern as a texture to the graphical surface.

In some embodiments, the method 2200 may also include generating a 3D solid body based on the graphical surface; and storing the 3D solid body in a memory. For example, in the situation where the user specifies closed polylines (in receiving operation 2230), the computer system may (a) generate an open surface having a cylindrical topology by connecting the closed polylines with polygons such as triangles, (b) generate a closed surface by appending end polygons to the open surface, and (c) generate a 3D solid mesh for the 3D solid body based on the closed surface. The closed surface defines the boundary of the 3D solid body. The 3D solid mesh may be composed of 3D elements such as polyhedra.

In some embodiments, the method 2200 may also include receiving user input specifying one or more light sources in the 3D space, where the action 2250 of rendering the graphical surface includes performing lighting computations based on the one or more light sources.

Figure 26:
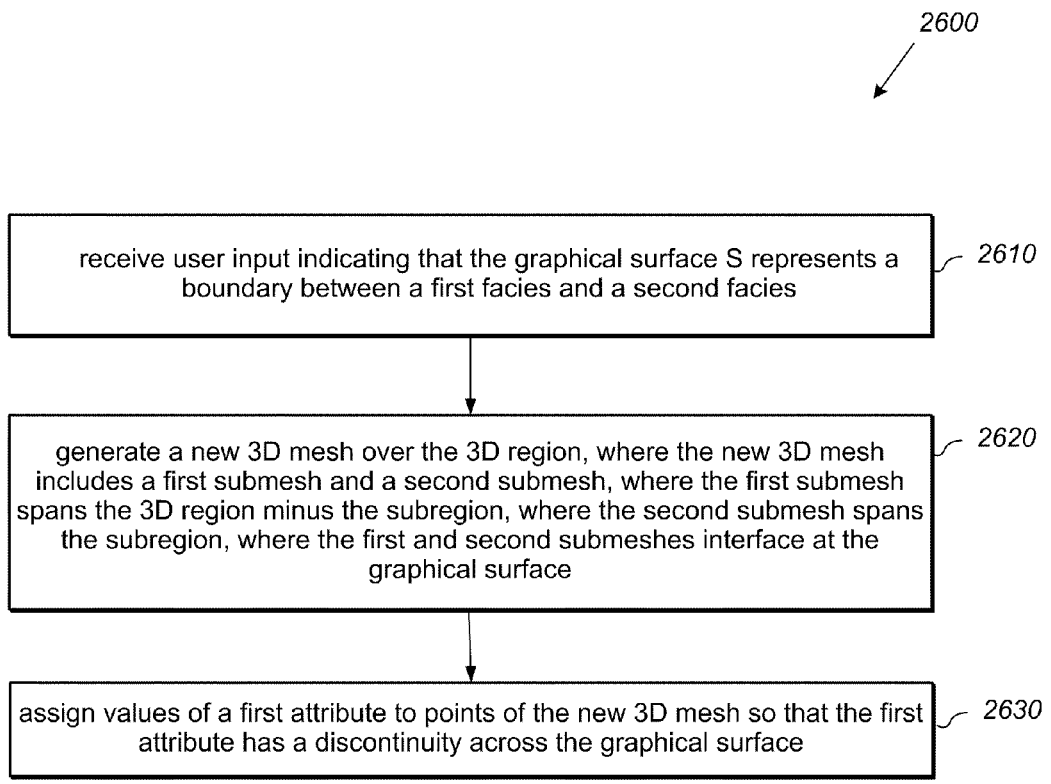
FIG. 26 illustrates one embodiment of a method for generating a boundary between two facies in a 3D region.

In some embodiments, the computer system may receive user input specifying in the window $W_2$ a modification to a selected one of the polylines; updating the graphical surface S based on the modification; and rendering the updated graphical surface to generate a second update for the image $I_1$. The second update may be displayed in the window $W_1$ using the display system. The second update depicts at least a portion of the updated graphical surface. For example, the modification may include moving one or more vertices of the selected polyline in the window $W_2$. As another example, the modification may include adding a new vertex to (or removing an existing vertex from) the selected polyline in the window $W_2$. As yet another example, the modification may include translating the selected polyline in the window $W_2$. FIG. 26 illustrates an example where the modification includes translating the polyline P1 in window $W_2$ to new state P1*. The computer system correspondingly translates the polyline R1 on the horizontal plane H1 in the 3D space, and then, updates the graphical surface based on that translation. The updated state of the graphical surface is denoted S*. (Compare to FIG. 23.)

In some embodiments, a graphical object (such as a reservoir model) may include a 3D mesh that spans a 3D region in the 3D space. The graphical surface S described above may be used to identify a boundary (e.g., a discontinuous boundary such as an unconformity) between two facies in the 3D region. The graphical surface S may be a closed surface that encloses a subregion within the 3D region. In one embodiment, the computer system may perform the perform operations as indicated in FIG. 26.

At 2610, the computer system may receive user input indicating that the graphical surface S represents a boundary between a first facies and a second facies.

At 2620, the computer system may generate a new 3D mesh over the 3D region, where the new 3D mesh includes a first submesh and a second submesh, where the first submesh spans the 3D region minus the subregion, where the second submesh spans the subregion, where the first and second submeshes interface at the graphical surface.

At 2630, the computer system may assign values of a first attribute (e.g., a physical property such as porosity, velocity, density, etc.) to points of the new 3D mesh so that the first attribute has a discontinuity across the graphical surface. In one embodiment, the computer system may assign attribute values consistent with the second facies to points of the second submesh. For example, the computer system may assign a user-specified constant value (of some property) to the grid points of the second submesh. The computer system may also assign property values consistent with the first facies to at least a portion of the first submesh (e.g., to the whole of the first submesh, or, to a portion of the first submesh that is in contact with the graphical surface.)

Figure 27:
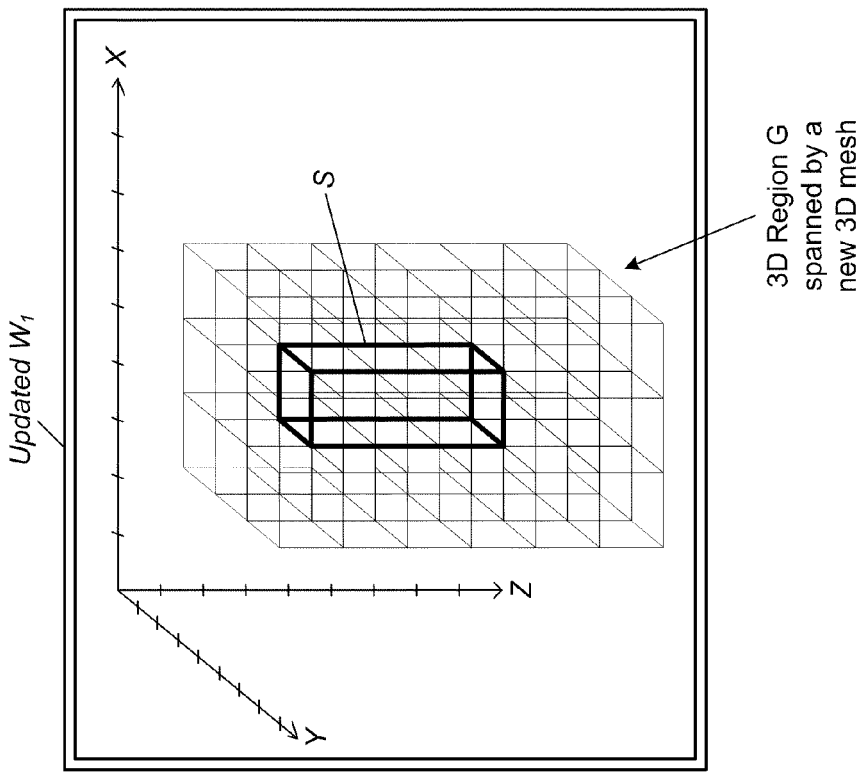
FIG. 27 illustrates an example of the method embodiment shown in FIG. 26.
Figure 27:
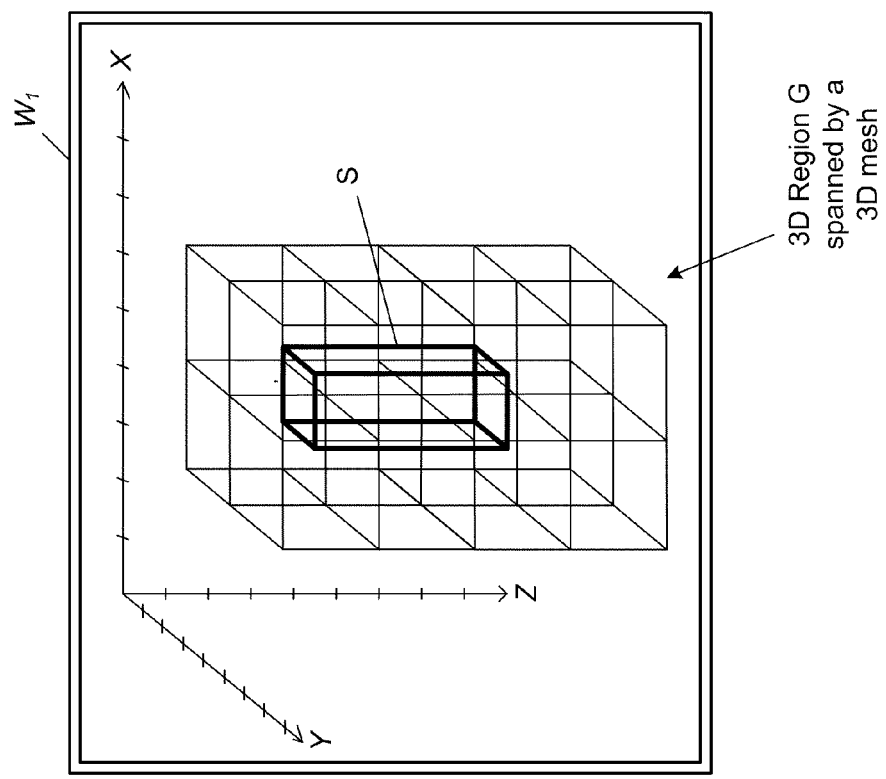

FIG. 27 illustrates an example of a 3D region G spanned by a 3D mesh of rectangular solid elements. See the window $W_1$ at the left side of the figure. The graphical surface S is a closed surface that defines a subregion in the region G. The computer system generates a new 3D mesh based on the graphical surface S, as shown in the updated window $W_2$ at the right of the figure.

Generating a Surface in 3D by Specifying Successive Polylines in a 2D Section View.

Figure 28:
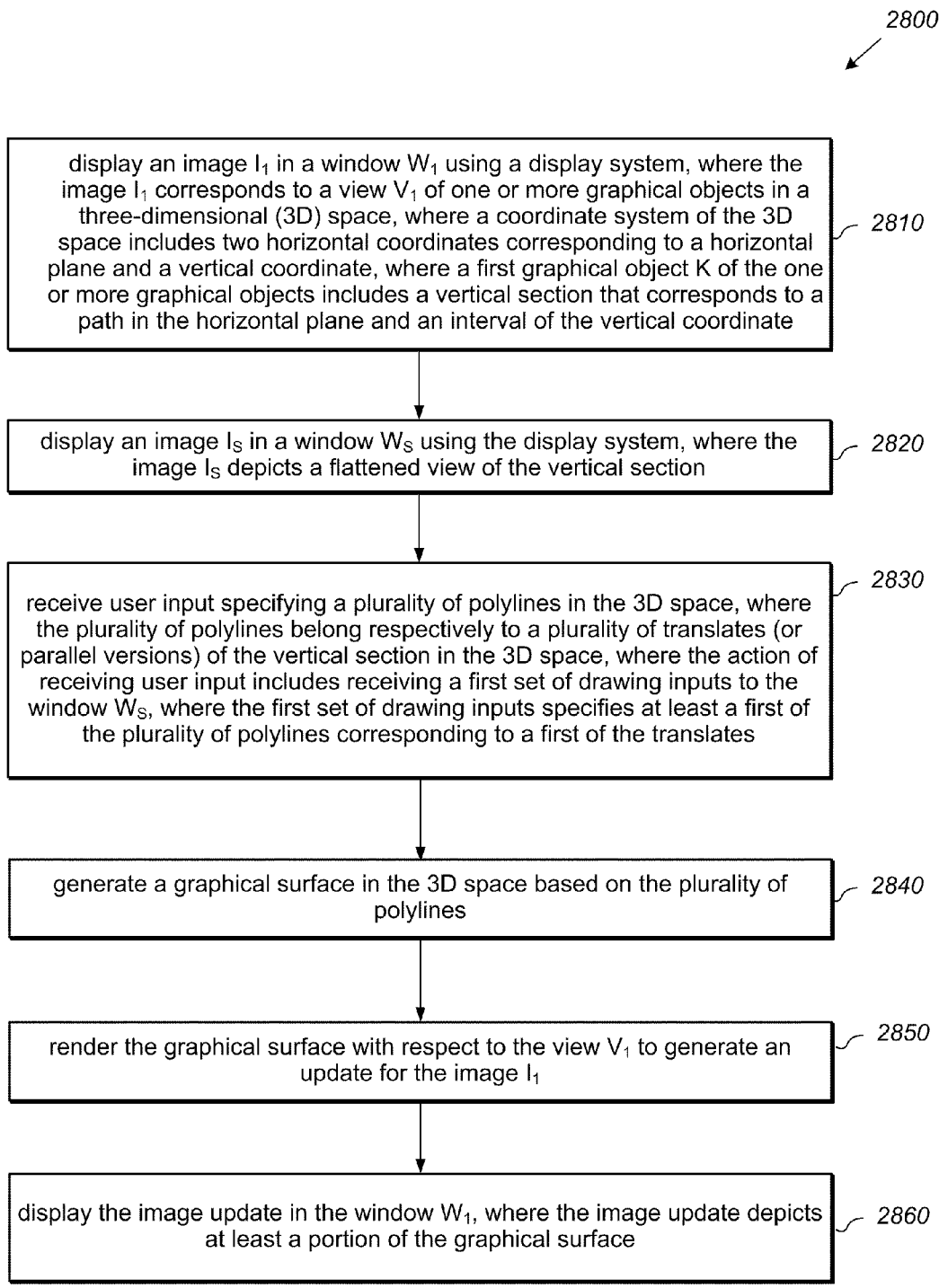
FIG. 28 illustrates one embodiment of a method for drawing a surface in the 3D environment.

In one set of embodiments, a method for drawing a surface in a 3D environment may involve the following operations, e.g., as shown in FIG. 28.

At 2810, a computer system may display an image $I_1$ in a window $W_1$ using a display system, where the image $I_1$ corresponds to a view $V_1$ of a graphical object set including one or more graphical objects in a three-dimensional (3D) space, where a coordinate system of the 3D space includes: two horizontal coordinates corresponding to a horizontal plane, and a vertical coordinate. A first graphical object K of the graphical object set includes a vertical section that corresponds to a path $P_K$ in the horizontal plane and an interval of the vertical coordinate. In some embodiments, the vertical section K is a rectangular surface corresponding to path $P_K$ that is a line segment. In other embodiments, the vertical section may be a folded surface corresponding to a more complex polyline path $P_K$. In other embodiments, the vertical section may be a smoothly curved surface corresponding to a smooth path $P_K$.

At 2820, the computer system may display an image $I_S$ in a window $W_S$ using the display system, where the image $I_S$ depicts a flattened view of the vertical section.

At 2830, the computer system may receive user input specifying a plurality of polylines in the 3D space, where the plurality of polylines belong respectively to a plurality of translates (or parallel versions) of the vertical section in the 3D space, where the action of receiving the user input includes receiving a first set of drawing inputs to the window $W_S$, where the first set of drawing inputs specifies at least a first of the plurality of polylines corresponding to a first of the translates. The plurality of translates may include the zero translate, i.e., the vertical section itself. The plurality of translates may be specified by the user. Thus, the computer system may receive user input specifying each of the translates of the vertical section in the 3D space. For example, in one embodiment, the computer system may display a top-down view of the 3D space in a map window $W_{map}$ as variously described above, and allow the user to provide input to the window $W_{map}$ that specifies a translate (or parallel version) of the vertical section.

At 2840, the computer system may generate a graphical surface in the 3D space based on the plurality of polylines. The graphical surface may be represented as a polygonal mesh (e.g., a triangular mesh). The polylines may define ribs for the graphical surface.

At 2850, the computer system may render the graphical surface with respect to the view $V_1$ to generate an update for the image $I_1$. In one embodiment, the computer system may render one or more graphical objects of the graphical object set in addition to the graphical surface.

At 2860, the computer system may display the image update in the window $W_1$. The image update may depict at least a portion of the graphical surface.

In some embodiments, the action 2830 of receiving user input includes receiving a second set of drawing inputs to the window $W_S$, where the second set of drawing inputs specifies a second of the plurality of polylines corresponding to a second of the translates of the vertical section.

In some embodiments, the horizontal dimension of the window $W_S$ corresponds to arc length L along the path $P_K$, and the vertical dimension of the window $W_S$ corresponds to the vertical coordinate of the 3D space.

Figure 29:
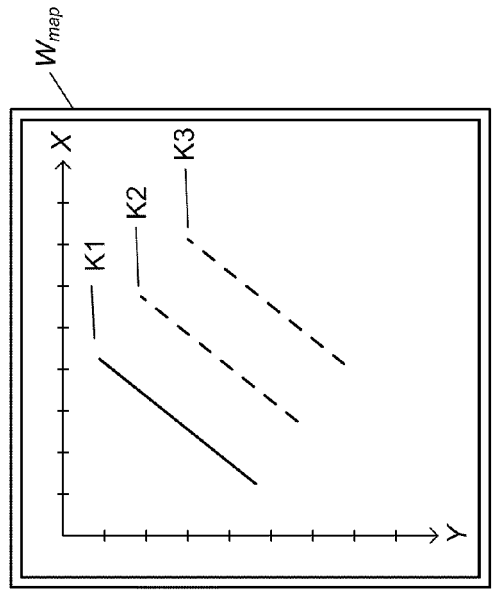
FIG. 29 illustrates an example of generating a graphical surface based on a set of user-specified polylines.
Figure 29:
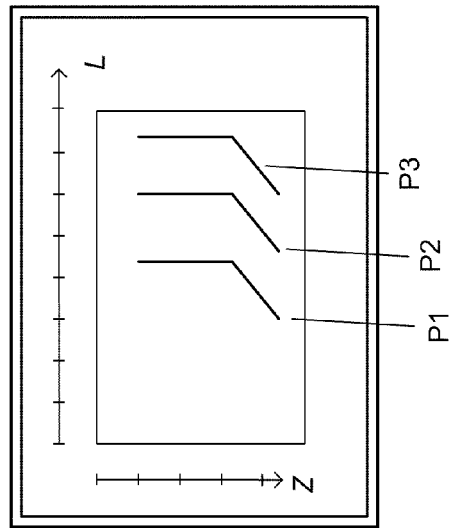
Figure 29:
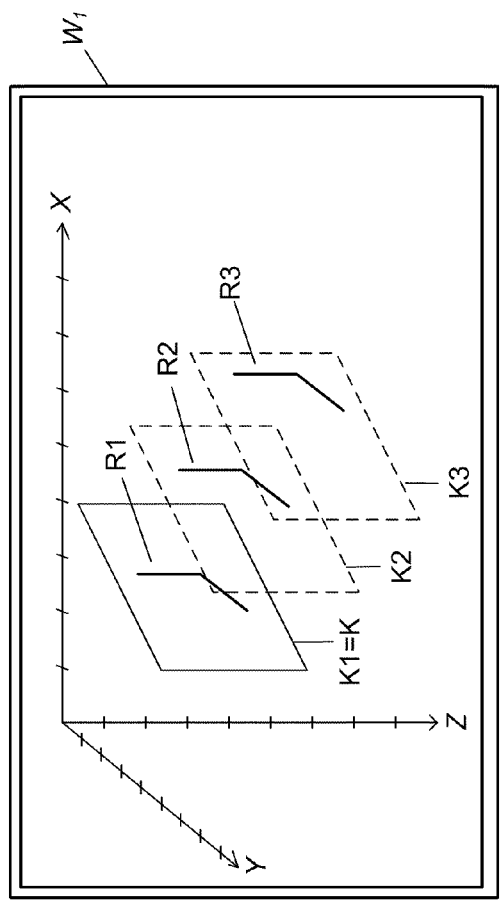
Figure 29:
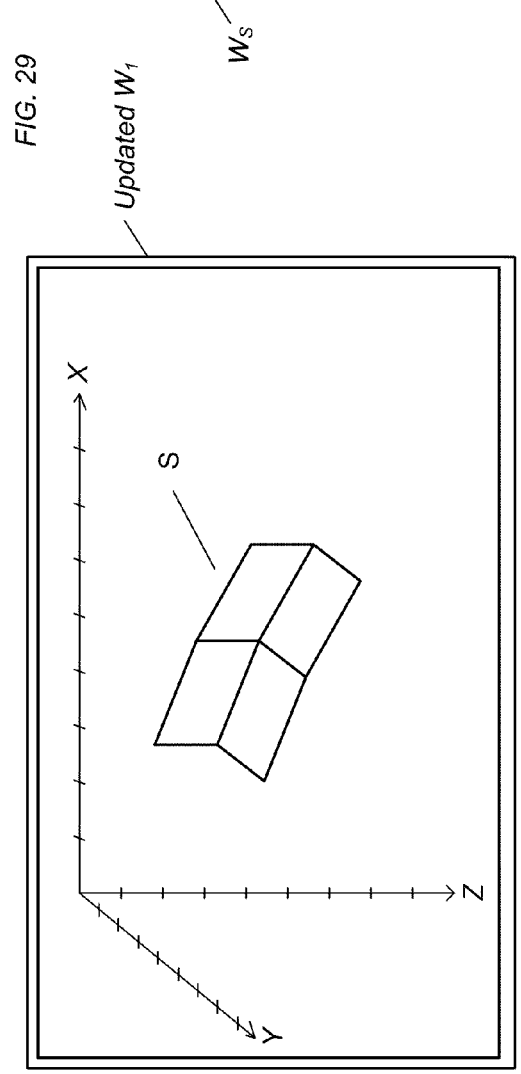
Figure 30:
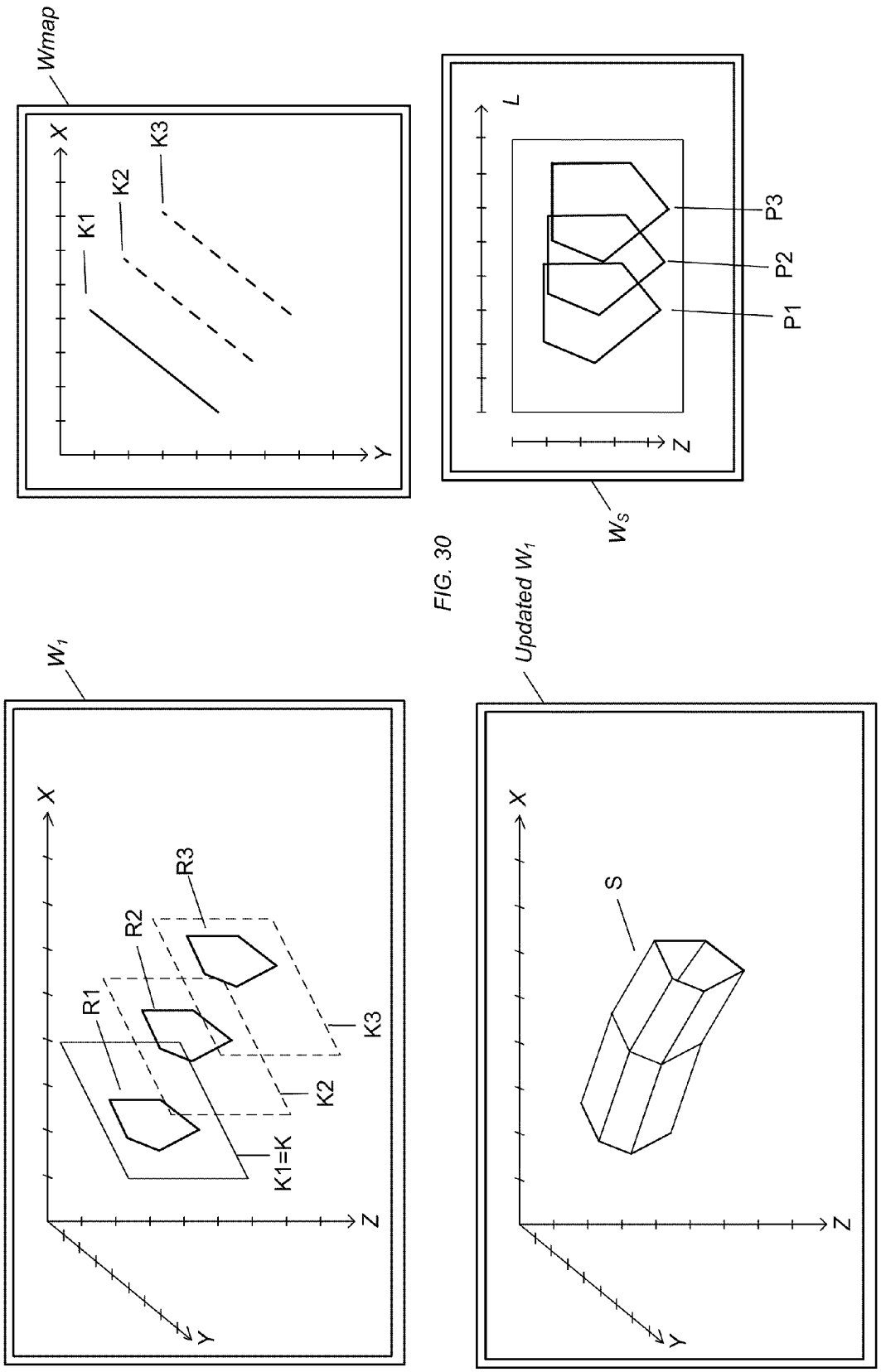
FIG. 30 illustrates an example of generating a graphical surface based on a set of closed polylines specified by a user.

FIG. 29 shows an example of method 2800 in action. The user provides input (e.g., mouse drawing input) that specifies the polyline P1 in the window $W_S$. The computer system maps the polyline P1 onto the vertical section K in the 3D space to generate the polyline R1 on the vertical section K. The user then provides input that specifies a translate K2 of the vertical section (or a temporary copy of the vertical section), e.g., by performing a click-and-drag mouse action on the vertical section K in the map window $W_{map}$. (In the map window $W_{map}$ the vertical section appears as a path since the map window $W_{map}$ corresponds to a view from above in the 3D space.) The user then provides input that specifies the polyline P2 in the window $W_S$. The computer system maps the polyline P2 onto the translated section K2 in the 3D space to generate the polyline R2. Similarly, the user specifies a third translate K3 of the vertical section and specifies a polyline P3, which is mapped onto the translated section K3, thereby generating polyline R3 in the 3D space. The computer system generates a graphical surface based on the polylines R1, R2 and R3, as shown in the updated state of window $W_1$, at the bottom-left of FIG. 29. The polylines R1, R2 and R3 serve as ribs for the graphical surface. While FIG. 29 shows polylines R1, R2 and R3 as being open polylines, the computer system allows the user to specify closed polylines as well, e.g., as suggested in FIG. 30. Thus, the graphical surface S generated from the closed polylines will have a cylindrical (tube-like) topology as indicated in the updated state of window $W_1$ at the lower-left of FIG. 30.

Figure 31:
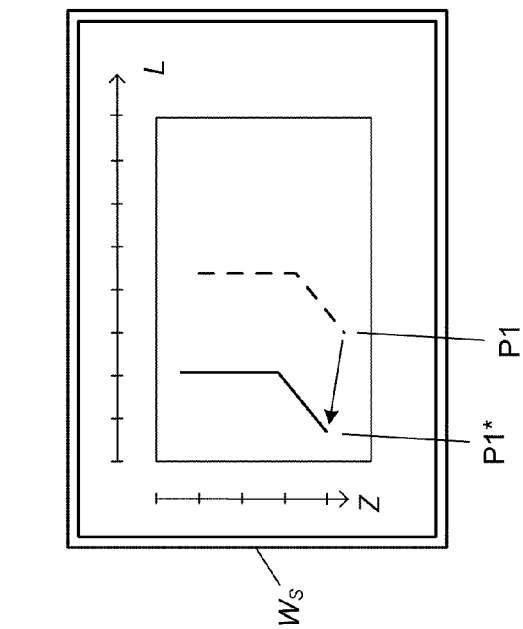
FIG. 31 illustrates an example of modifying a graphical surface in response to user input.
Figure 31:
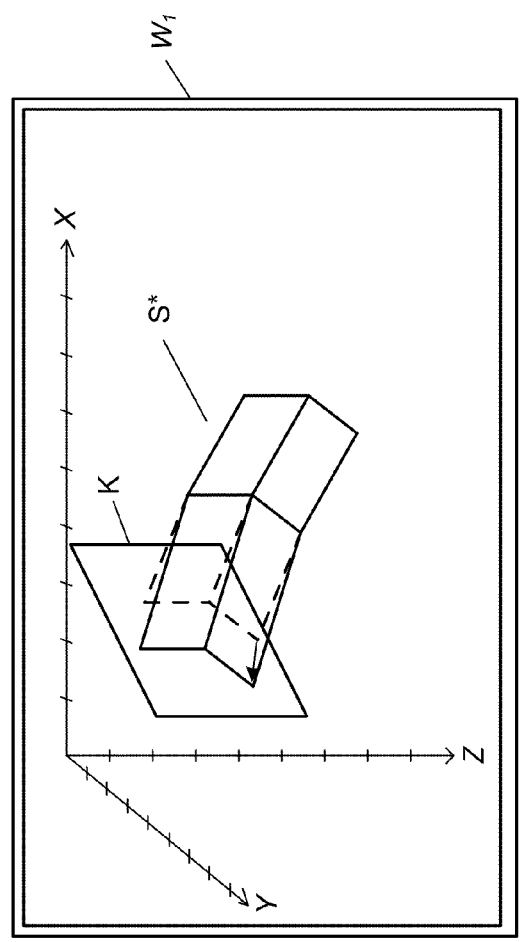

In some embodiments, the computer system may: receive user input specifying in the window $W_S$ a modification to a selected one of the polylines; update the graphical surface S based on the specified modification (or based on the user input); and render the updated graphical surface to generate a second update for the image $I_1$. The computer system may display the second update in the window $W_1$. The second update depicts at least a portion of the updated graphical surface. The modification to the selected polyline may take any of various forms. For example, the modification may include a movement of one (or more) of the vertices of the selected polyline in the window $W_S$. As another example, the modification may include an addition of a new vertex to (or a deletion of a vertex from) the selected polyline in the window $W_S$. As yet another example, the modification may include translation (or rotation or reflection or scaling) of the selected polyline in the window $W_S$. FIG. 31 shows an example where the modification includes a translation of the polyline in the vertical section K. The user may specify the translation by dragging the corresponding planar polyline P1 in the window $W_S$. The new state of the planar polyline P1 is denoted P1*. Based on the user input specifying the modification, the computer system updates the graphical surface S in the 3D space. The new state of the graphical surface is denoted S*. The computer system may dynamically (continuously) update the graphical surface S as the user is manipulating (operating on) the planar polyline P1.

Figure 32:
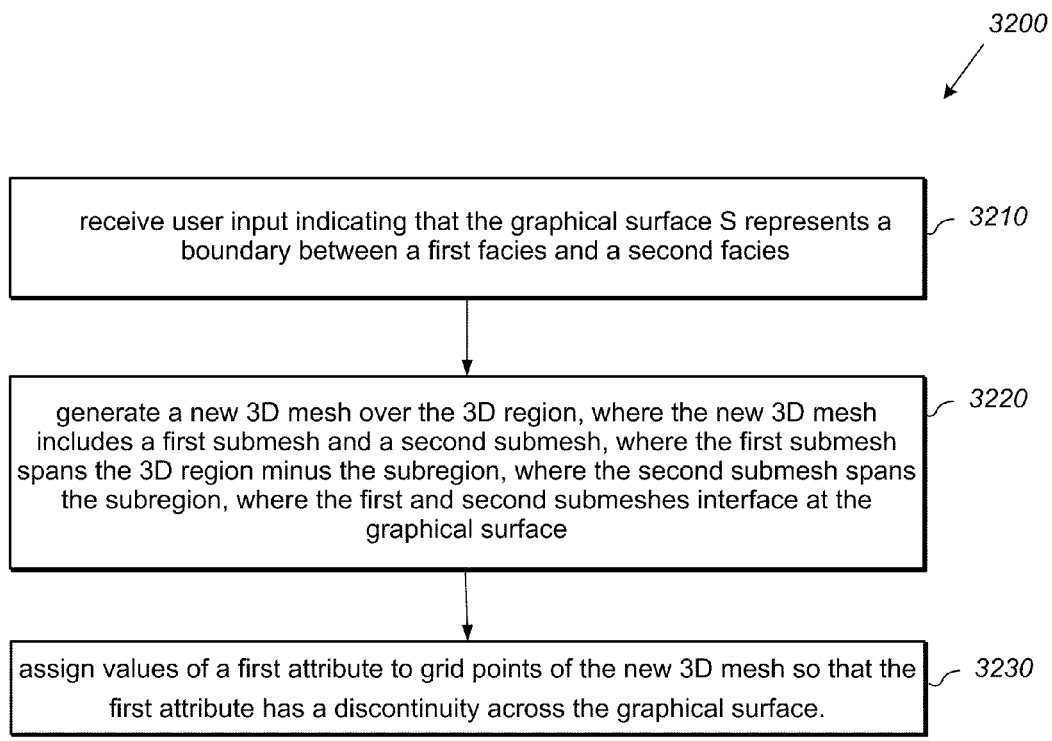
FIG. 32 illustrates one embodiment of a method for generating a boundary between two facies in a 3D region.

As described above the image $I_1$ displayed in window $W_1$ corresponds to a view $V_1$ of one or more graphical objects in a three-dimensional (3D) space. One (or more) of the graphical objects may include a 3D mesh that spans a 3D region R in the 3D space. The graphical surface S, generated as described above, may enclose a subregion within the region R. In some embodiments, the method 2800 may include the following additional actions as shown in FIG. 32.

At 3210, the computer system may receive user input indicating that the graphical surface S represents a boundary between a first facies and a second facies.

At 3220, the computer system may generate a new 3D mesh over the 3D region, where the new 3D mesh includes a first submesh and a second submesh, where the first submesh spans the 3D region minus the subregion, where the second submesh spans the subregion, where the first and second submeshes interface at the graphical surface. In one embodiment, the boundary of the second submesh coincides with the graphical surface S.

At 3230, the computer system may assign values of a first attribute to grid points of the new 3D mesh so that the first attribute has a discontinuity across the graphical surface.

In some embodiments, the computer system may execute a reservoir flow simulation based on the new 3D mesh and the assigned values of the first attribute.

Figure 33:
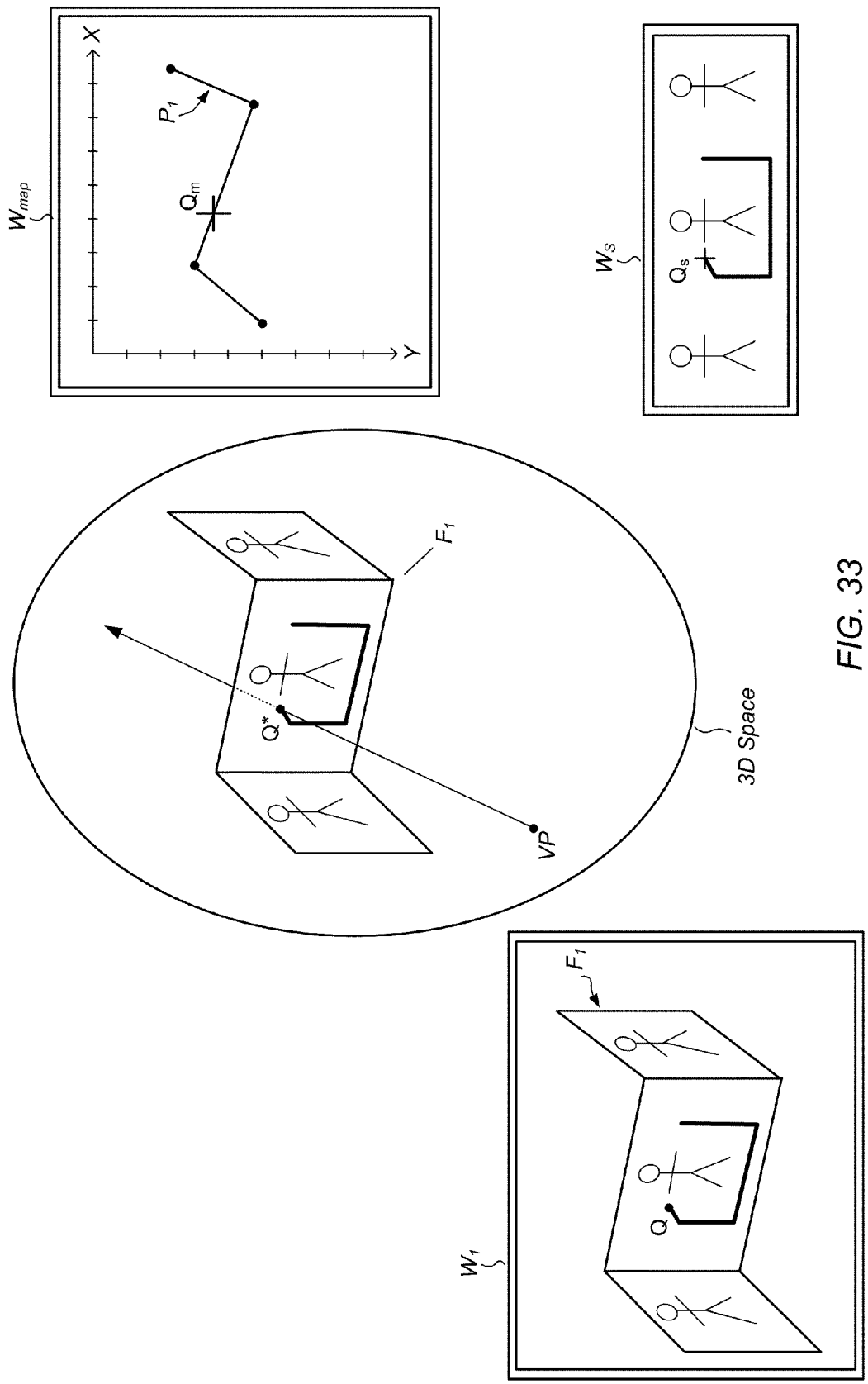
FIG. 33 illustrates one embodiment of a method for generating drawings in a 3D window by providing drawing inputs to a 3D window.

In one set of embodiments, the computer system may be configured to receive a set of drawing inputs in the window $W_1$. In one embodiment, the computer system may generate a polyline in the 3D space by: receiving user input that specifies a sequence of points in the window $W_1$, and mapping each of the specified points to a corresponding surface point on an object in the 3D space. For example, the computer system may cast a ray from the current viewpoint VP of the view $V_1$ into the 3D space, the direction of the ray being determined by the corresponding user-specified point Q in the window $W_1$, as illustrated in FIG. 33. (The point Q may be expressed in terms of horizontal and vertical coordinates relative to window $W_1$.) The computer system may compute a point of intersection Q* of the ray with a graphical object in the 3D space. The intersection point Q* may be used as one of the polyline vertices in the 3D space. Thus, the user may draw a polyline on the surface of a graphical object in the 3D space via drawing inputs supplied to the window $W_1$. Any of the various embodiments described herein may be augmented with this method for drawing in window $W_1$.

In one set of embodiments, changes in any of the windows are automatically and instantaneously reflected by corresponding changes in the other visible windows. For example, as suggested in FIG. 33, as the user draws the polyline on the surface of the vertical section $F_1$ in the window $W_1$, the computer system may continuously update cursor position $Q_m$ in map window $W_{map}$ and the state of the polyline shown in window $W_S$.

In one set of embodiments, the computer system is configured to generate smooth curves (e.g., splines) or apparently smooth curves in the 3D space in response to drawing inputs supplied by the user to any of the various windows. For example, in one embodiment, the user draws a curve in a given window using the mouse as a pen. The computer system collects samples of the mouse cursor position during the drawing action, e.g., while the user holds down the left mouse button. The computer system then generates parameters for a smooth curve (e.g., a spline) based on the collected samples. In one embodiment, the computer system generates an apparent curve by collecting position samples at a sufficiently high rate, and rendering a polyline using the position samples as vertices. The positions samples are sufficiently close together so that the polyline appears to be smooth to the user's eye.

Figure 34:
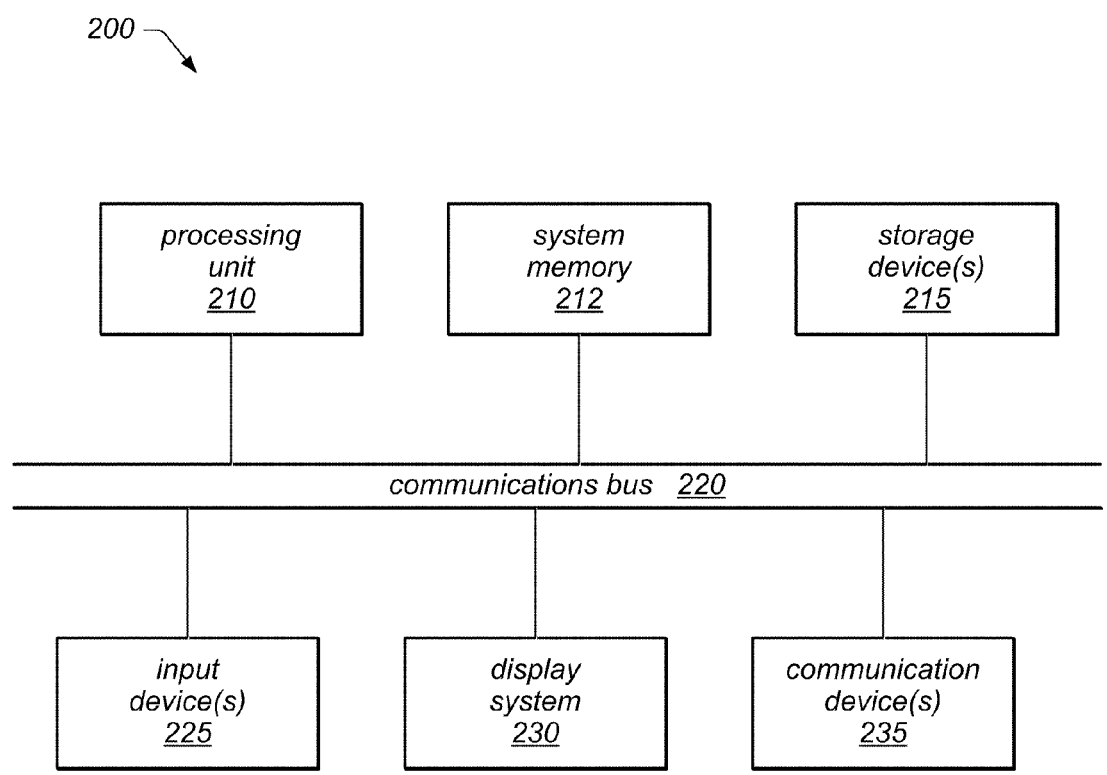
FIG. 34 illustrates one embodiment of a computer system capable of executing any of the method embodiments described herein, or any combination of the method embodiments described herein, or any subset of any of the method embodiments described herein, or any combination of such subsets.

FIG. 34 illustrates one embodiment of a computer system 200 that may be used to perform any of the method embodiments described herein, or, any combination of the method embodiments described herein. Computer system 200 may include a processing unit 210, a system memory 212, a set 215 of one or more storage devices, a communication bus 220, a set 225 of input devices, and a display system 230.

System memory 212 may include a set of semiconductor devices such as RAM devices (and perhaps also a set of ROM devices).

The set of storage devices 215 may include any of various storage devices such as one or more memory media and/or memory access devices. For example, storage devices 215 may include devices such as a CD/DVD-ROM drive, a hard disc, a magnetic disk drive, magnetic tape drives, etc.

Processing unit 210 is configured to read and execute program instructions, e.g., program instructions stored in system memory 212 and/or on one or more of the storage devices 215. Processing unit 210 may couple to system memory 212 through communication bus 220 (or through a system of interconnected busses). The program instructions configure the computer system 200 to implement a method, e.g., any of the method embodiments described herein, or, any combination of the method embodiments described herein, or, any subset of any of the method embodiments described herein, or any combination of such subsets.

Processing unit 210 may include one or more programmable processors (e.g., microprocessors).

One or more users may supply input to the computer system 200 through the set 225 of input devices. Input devices 225 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The user input-actions variously described above may be performed using one or more of the input devices 225.

The display system 230 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 200 may include other devices, e.g., devices such as one or more graphics accelerators, one or more speakers, a sound card, a video camera and a video card.

The various display actions described herein may be performed using the display system 230.

In one embodiment, computer system 200 may include one or more communication devices 235, e.g., a network interface card for interfacing with a computer network.

The computer system may be configured with a software infrastructure including an operating system and one or more graphics APIs (such as OpenGL®, Direct3D, Java 3D™). Thus, the various method embodiments described herein may be implemented in terms of programs that make function calls to the operating system and/or to one or more graphics APIs as needed. For example, the action of rendering a graphical object (or a 3D virtual world) may be implemented by a set of one or more calls to a graphics API.

In some embodiments, the computer system allows the user to create a dot in the 3D space, e.g., to mark a specific spot in the 3D space or on the surface of one of the graphical objects. The computer system may employ a method similar to method 100 (or method 1000) described above to generate the dot. To define the location of a dot, only a single vertex needs to be specified. Thus, operation 130 of method 100 would be modified to receive user input specifying a single vertex position in the window $W_2$. The computer system maps the vertex position into the 3D space to determine a 3D location for the dot. (Method 1000 may be similarly modified.) The computer system may also receive user input that specifies one or more properties of the dot, e.g., properties such as the radius, color and transparency of the dot.

In some embodiments, computer system 200 may be configured to serve a plurality of users, each with his/her own set of views into the 3D space. In one embodiment, computer system 200 may communicate with a plurality of clients over a network (e.g., a local area network, an intranet, a wide area network or the Internet). Each of the clients may have its own processor, display system and set of input devices. Thus, computer system 200 may receive user input from a client over the network, perform any of the method embodiments described herein in order to generate one or more rendered images, and send the generated image(s) to the client over the network. The computer system 200 may store the viewing parameters for the views being used by each of the clients. In some embodiments, one or more of the clients may have graphics rendering resources, e.g., rendering hardware and/or software. Thus, the computer system 200 may be configured to send higher-level graphics data (e.g., 3D geometry data and textures) to a client so the client can render the system-generated object (e.g., polyline, polygon, graphical surface, dot, etc.) itself.

In some embodiments, the computer system 200 is configured to support the collaborative effort of a plurality of users. For example, the computer system may maintain a database of graphical objects that are created in the 3D space by users. A user may login to the database to view graphical objects created by the community of users. Different members of the community may have different sets of specialized skills, and thus, the effort of building an interpretation of the subsurface environment may be partitioned among different users. A geologist may be delegated the task of interpreting seismic data on a given vertical section, e.g., by drawing polygons or curves on the vertical section that represent hypothesized layers and geological features. A reservoir engineer may be given the task of laying out the geometry of a 3D reservoir model and populating that model with property values.

The database may include a wide variety of graphical objects. Some of those objects may be objects that have been created by the various method embodiments described herein.

In some embodiments, the computer system allows one user to create a graphical object (e.g., a polyline, polygon or graphical surface), and another user to modify that object. The computer system may maintain a set of permissions for each graphical object, so that author of the graphical can selectively grant access rights to certain users or classes of users.

In some embodiments, the computer system is configured to receive user input that specifies a portion of the earth's surface to be visualized. For example, the user input may specify a point on the earth's surface. In response to the user input, the computer system may access a database to identify graphical objects that are located within a neighborhood of the specified point, and render the identified graphical objects for display in one or more windows. The dimensions of the neighborhood may be specified by the user as well.

It is noted that the methods described herein may be used to visualize and/or interpret structure (or hypothesized structure) in the earth's subsurface or in the subsurface of any satellite, planet or celestial body.

Any two or more of the embodiments described herein may be combined to form a more complex embodiment. Any two or more embodiments described herein may be interpreted as user-selectable modes or features of a more complex embodiment.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-readable memory medium that has program instructions stored thereon, wherein the program instructions are executable by a computer system to implement a method comprising:

displaying a first image in a first window using a display system, wherein the first image corresponds to a first view of a graphical object set that includes one or more graphical objects in a three-dimensional (3D) space, wherein each of the one or more graphical objects represents a corresponding sub-surface geological structure;

displaying a second window using the display system;

generating a polygon in the 3D space, wherein said generating includes:

receiving user input defining a closed planar polyline in the second window, wherein said user input is supplied by a user drawing the closed planar polyline in the second window and includes a first set of drawing inputs to the second window, wherein the closed planar polyline includes three or more 2D vertices in the second window; and mapping each of the three or more 2D vertices to a respective 3D point in the 3D space, thereby obtaining three or more 3D points that define 3D vertices for the polygon;

rendering the polygon with respect to the first view to generate an update for the first image;

displaying the updated first image in the first window, wherein the updated first image depicts at least a portion of the polygon and at least a portion of a first of the graphical objects of the graphical object set;

wherein the first graphical object includes a mesh that covers a surface in the 3D space, wherein the three or more 3D points reside on said surface, wherein the method further comprises:

receiving user input indicating that a boundary of the polygon represents an unconformity between a first facies and a second facies;

generating a new mesh for the surface, wherein the new mesh includes a first submesh and a second submesh that interface along the polygon boundary, wherein the first submesh corresponds to the exterior of the polygon, wherein the second submesh corresponds to the interior of the polygon, wherein at least a portion of the first submesh is assigned to the first facies, wherein the second submesh is assigned to the second facies; and assigning a property value consistent with the second facies to grid points of the second submesh.

2. The memory medium of claim 1, wherein a coordinate system of the 3D space includes a vertical coordinate, a first horizontal coordinate and a second horizontal coordinate, wherein said displaying the second window includes displaying a second image in the second window, wherein the second image corresponds to a second view of the graphical object set as seen from above in the 3D space, wherein said mapping each of the 2D vertices to a respective 3D point in the 3D space includes:

computing a 2D point based on the 2D vertex, wherein the 2D point includes a value for the first horizontal coordinate and a value for the second horizontal coordinate; and assigning a value for the vertical coordinate to the 2D point to obtain the 3D point.

3. The memory medium of claim 2, wherein said assigning a vertical coordinate value to the 2D point includes:

vertically projecting the 2D point to determine a surface point on a surface of the first graphical object; and assigning the vertical coordinate value of the surface point to the 2D point.

4. The memory medium of claim 2, wherein all of said three or more 2D points are assigned the same user-specified vertical coordinate value.

5. The memory medium of claim 1, wherein a coordinate system of the 3D space includes a vertical coordinate, a first horizontal coordinate and a second horizontal coordinate, wherein said displaying the second window includes displaying a second image in the second window, wherein the second image represents a horizontal planar slice of the 3D space corresponding to a horizontal plane at a given value of the vertical coordinate, wherein the three or more 3D points obtained by said mapping reside in the horizontal plane.

6. The memory medium of claim 1 further comprising:

receiving user input selecting a texture pattern from a set of supported texture patterns, wherein said set of supported texture patterns includes texture patterns that represent a number of different rock types, wherein said rendering the polygon includes applying the selected texture pattern to the polygon.

7. A non-transitory computer-readable memory medium that has program instructions stored thereon, wherein the program instructions are executable by a computer system to implement:

displaying a first image in a first window using a display system, wherein the first image corresponds to a first view of one or more graphical objects in a three-dimensional (3D) space, wherein a coordinate system of the 3D space includes two horizontal coordinates corresponding to a horizontal plane and a vertical coordinate, wherein a first of the one or more graphical objects includes a vertical section that corresponds to a path in the horizontal plane and an interval of the vertical coordinate;

displaying a second image in a second window using the display system, wherein the second image depicts a flattened view of the vertical section;

generating a polygon in the 3D space in response to user input, wherein said generating includes:

receiving user input defining a closed planar polyline in the second window, wherein said user input is supplied by a user drawing the closed planar polyline in the second window and includes a first set of drawing inputs to the second window, wherein the closed planar polyline includes three or more 2D vertices in the second window; and mapping each of the three or more 2D vertices to a respective 3D point in the 3D space, thereby obtaining three or more 3D points that define 3D vertices for the polygon;

rendering the polygon with respect to the first view to generate an update for the first image;

displaying the updated first image in the first window, wherein the updated first image depicts at least a portion of the polygon and at least a portion of the first graphical object;

wherein the first graphical object includes a mesh that covers the vertical section, wherein the polygon resides on the vertical section, wherein the program instructions are executable by the computer system to further implement:

receiving user input indicating that a boundary of the polygon represents an unconformity between a first facies and a second facies;

generating a new mesh for the vertical section, wherein the new mesh includes a first submesh and a second submesh that interface along the polygon boundary, wherein the first submesh corresponds to the exterior of the polygon, wherein the second submesh corresponds to the interior of the polygon; and assigning rock properties associated with the second facies to points of the second submesh.

8. The memory medium of claim 7, wherein each of the one or more graphical objects represents a corresponding sub-surface geological structure, wherein a horizontal dimension of the second image corresponds to arc length along said path, wherein a vertical dimension of the second image corresponds to the vertical coordinate.

9. The memory medium of claim 7, wherein the first graphical object also includes a third image derived from seismic data, wherein the third image is applied as a texture to the vertical section, wherein the polygon represents a feature in the third image, wherein the second image is at least partially derived from the third image.

10. The memory medium of claim 7, wherein the polygon resides on the vertical section in the 3D space.

11. The memory medium of claim 7, wherein the program instructions are executable by the computer system to further implement:

receiving user input specifying a modification to the closed planar polyline in the second window;

updating the polygon based on said modification to the closed planar polyline;

rendering the updated polygon to generate a second update for the first image.

12. The memory medium of claim 7, wherein the second submesh includes a plurality of grid points in the 3D space, wherein the program instructions are executable by the computer system to further implement:

assigning a common attribute value to each of the grid points.

13. A non-transitory computer-readable memory medium that has program instructions stored thereon, wherein the program instructions are executable by a computer system to implement:

displaying a first image in a first window using a display system, wherein the first image corresponds to a first view of one or more graphical objects in a three-dimensional (3D) space, wherein each of the one or more graphical objects represents a corresponding sub-surface geological structure;

displaying a second window using the display system;

receiving user input specifying a plurality of polylines in a plurality of parallel planes in the 3D space, wherein the user input includes a user drawing one or more of the polylines in the second window, wherein said receiving user input includes receiving a first set of drawing inputs to the second window, wherein the first set of drawing inputs specify at least a first of the plurality of polylines corresponding to a first of the parallel planes;

generating a graphical surface in the 3D space based on the plurality of polylines;

rendering the graphical surface with respect to the first view to generate an update for the first image;

displaying the updated first image in the first window, wherein the updated first image depicts at least a portion of the graphical surface and at least a portion of a first of the one or more graphical objects, wherein the first graphical object includes a 3D mesh that covers a 3D region in the 3D space, wherein the graphical surface encloses a subregion within said region, wherein the program instructions are executable by the computer system to further implement:

receiving user input indicating that the graphical surface represents a boundary between a first facies and a second facies;

generating a new 3D mesh over the 3D region, wherein said new 3D mesh includes a first submesh and a second submesh, wherein the first submesh covers the 3D region minus the subregion, wherein the second submesh covers the subregion, wherein the first and second submeshes interface at the graphical surface;

assigning values of a first attribute to points of the new 3D mesh so that the first attribute has a discontinuity across the graphical surface.

14. The memory medium of claim 13, wherein a coordinate system of the 3D space includes a vertical coordinate, a first horizontal coordinate and a second horizontal coordinate, wherein the parallel planes are horizontal planes corresponding to user-specified values of the vertical coordinate.

15. The memory medium of claim 13, wherein said displaying the second window includes displaying a second image in the second window, wherein said second image corresponds to a second view of the one or more graphical objects as seen from above in the 3D space.

16. The memory medium of claim 15, wherein the program instructions are executable by the computer system to further implement:

rendering the graphical surface with respect to the second view to generate an update for the second image; and displaying the updated second image in the second window.

17. The memory medium of claim 13, wherein each of the polylines is a closed polyline, wherein the surface is topologically equivalent to a cylinder.

18. The memory medium of claim 13, wherein the program instructions are executable by the computer system to further implement:

receiving user input specifying a fill pattern for the surface, wherein said rendering the graphical surface includes applying the fill pattern as a texture to the graphical surface.

19. The memory medium of claim 13, wherein the program instructions are executable by the computer system to further implement:

receiving user input specifying in the second window a modification to a selected one of the polylines;

updating the graphical surface based on said modification;

rendering the updated graphical surface to generate a second update for the first image.

20. A non-transitory computer-readable memory medium that has program instructions stored thereon, wherein the program instructions are executable by a computer system to implement:

displaying a first image in a first window using a display system, wherein the first image corresponds to a first view of one or more graphical objects in a three-dimensional (3D) space, wherein a coordinate system of the 3D space includes two horizontal coordinates corresponding to a horizontal plane and a vertical coordinate, wherein a first of the graphical objects includes a vertical section that corresponds to a path in the horizontal plane and an interval of the vertical coordinate;

displaying a second image in a second window using the display system, wherein the second image depicts a flattened view of the vertical section;

receiving user input specifying a plurality of polylines in the 3D space, wherein the plurality of polylines belong respectively to a plurality of translates of the vertical section in the 3D space, wherein the user input includes a user drawing one or more of the polylines in the second window, wherein said receiving user input includes receiving a first set of drawing inputs to the second window, wherein the first set of drawing inputs specifies a first of the plurality of polylines corresponding to a first of the translates;

generating a graphical surface in the 3D space based on the plurality of polylines;

rendering the graphical surface with respect to the first view to generate an update for the first image;

displaying the updated first image in the first window, wherein the updated first image depicts at least a portion of the graphical surface and at least a portion of the first graphical object;

wherein the first graphical object includes a 3D mesh that covers a 3D region in the 3D space, wherein the graphical surface encloses a subregion within said region, wherein the program instructions are executable by the computer system to further implement:

receiving user input indicating that the graphical surface represents a boundary between a first facies and a second facies;

generating a new 3D mesh over the 3D region, wherein said new 3D mesh includes a first submesh and a second submesh, wherein the first submesh covers the 3D region minus the subregion, wherein the second submesh covers the subregion, wherein the first and second submeshes interface at the graphical surface;

assigning values of a first attribute to points of the new 3D mesh so that the first attribute has a discontinuity across the graphical surface.

21. The memory medium of claim 20, wherein a horizontal dimension of the second window corresponds to arc length along said path, wherein a vertical dimension of the second window corresponds to the vertical coordinate.

22. The memory medium of claim 20, wherein the program instructions are executable by the computer system to further implement:

receiving user input specifying each of the translates of the vertical section in the 3D space.

23. The memory medium of claim 20, wherein one of the plurality of translates is a null translate of the vertical section.

24. The memory medium of claim 20, wherein the vertical section is a rectangular surface.

25. The memory medium of claim 20, wherein said receiving user input includes receiving a second set of drawing inputs to the second window, wherein the second set of drawing inputs specifies a second of the plurality of polylines corresponding to a second of the translates.

26. The memory medium of claim 20, wherein the program instructions are executable by the computer system to further implement:

receiving user input specifying in the second window a modification to a selected one of the polylines;
updating the graphical surface based on said modification;
rendering the updated graphical surface to generate a second update for the first image.

* * * * *